(12) United States Patent
Daniels et al.

(10) Patent No.: US 12,458,408 B2
(45) Date of Patent: Nov. 4, 2025

(54) APPARATUS AND METHODS FOR SPOOLED VERTEBRAL ANCHORS

(71) Applicant: OrthoPediatrics Corp., Warsaw, IN (US)

(72) Inventors: David W. Daniels, Winona Lake, IN (US); Matthew Prygoski, North Liberty, IN (US); Richard Detlefsen, Warsaw, IN (US); Evangelos Tozakoglou, Warsaw, IN (US)

(73) Assignee: OrthoPediatrics Corp., Warsaw, IN (US)

( * ) Notice: Subject to any disclaimer, the term of this patent is extended or adjusted under 35 U.S.C. 154(b) by 397 days.

(21) Appl. No.: 17/267,417

(22) PCT Filed: Aug. 9, 2019

(86) PCT No.: PCT/US2019/045968
§ 371 (c)(1),
(2) Date: Feb. 9, 2021

(87) PCT Pub. No.: WO2020/033870
PCT Pub. Date: Feb. 13, 2020

(65) Prior Publication Data
US 2021/0290271 A1    Sep. 23, 2021

Related U.S. Application Data

(60) Provisional application No. 62/873,526, filed on Jul. 12, 2019, provisional application No. 62/716,550, filed on Aug. 9, 2018.

(51) Int. Cl.
*A61B 17/70* (2006.01)
*A61B 17/00* (2006.01)

(52) U.S. Cl.
CPC ...... *A61B 17/7022* (2013.01); *A61B 17/7019* (2013.01); *A61B 17/7026* (2013.01);
(Continued)

(58) Field of Classification Search
CPC ............ A61B 17/7022; A61B 17/7026; A61B 17/7029; A61B 17/7031; A61B 17/7053; A61B 17/7005; A61B 17/7014
See application file for complete search history.

(56) References Cited

U.S. PATENT DOCUMENTS 6,302,888 B1   10/2001  Mellinger et al.
7,458,981 B2   12/2008  Fielding et al.
(Continued)

FOREIGN PATENT DOCUMENTS

| CA | 3023593 | 11/2017 |
|---|---|---|
| WO | 2008061802 | 5/2008 |
| WO | 2017201437 | 11/2017 |

OTHER PUBLICATIONS

PCT/US2019/045968, Search Report and Written Opinion, 18 pgs Jan. 9, 2020.
(Continued)

*Primary Examiner* — Julianna N Harvey
(74) *Attorney, Agent, or Firm* — Gerald W. Roberts; John V. Daniluck; Dentons Bingham Greenebaum LLP

(57) ABSTRACT

Apparatus and method for dynamic connection between adjacent bones. Various embodiments pertain to a bone anchor that includes a rotatable spool, the spool being configured to place tension on a flexible member, such as a tether, suture, cable, or other. Still further embodiments pertain to tools for interconnecting two bone anchors with a tether.

14 Claims, 46 Drawing Sheets

(52) U.S. Cl.
CPC ............ *A61B 17/7049* (2013.01); *A61B 2017/00367* (2013.01); *A61B 17/7044* (2013.01)

(56) References Cited

U.S. PATENT DOCUMENTS

| | | | |
|---|---|---|---|
| 7,645,294 B2 | 1/2010 | Kalfas et al. |
| 7,901,413 B1 | 3/2011 | Lewis |
| 8,034,085 B2 | 10/2011 | Slivka et al. |
| 8,114,135 B2 | 2/2012 | Malandain |
| 8,162,979 B2 | 4/2012 | Sachs et al. |
| 8,182,514 B2 | 5/2012 | Gimbel et al. |
| 8,192,468 B2 | 6/2012 | Biedermann et al. |
| 8,292,925 B2 | 10/2012 | Hestad et al. |
| 8,292,927 B2 | 10/2012 | Rouleau et al. |
| 8,357,182 B2 | 1/2013 | Seme |
| 8,361,123 B2 | 1/2013 | Fanger et al. |
| 8,465,526 B2 | 6/2013 | Friedrich et al. |
| 8,523,911 B2 | 9/2013 | Jani et al. |
| 8,876,867 B2 | 11/2014 | Hestad |
| 8,920,472 B2 | 12/2014 | Seme et al. |
| 8,974,497 B2 | 3/2015 | Cho et al. |
| 8,992,579 B1 | 3/2015 | Gustine et al. |
| 9,149,298 B2 | 10/2015 | Frediger |
| 9,339,303 B2 | 5/2016 | Calvosa et al. |
| 9,433,442 B2 | 9/2016 | Lindemann et al. |
| 9,451,991 B2 | 9/2016 | Raju et al. |
| 9,510,866 B2 | 12/2016 | Hammer |
| 9,980,752 B2 | 5/2018 | Smith |
| 2011/0313421 A1 | 12/2011 | Sidebotham et al. |
| 2013/0261747 A1 | 10/2013 | Geiser |
| 2015/0142058 A1 | 5/2015 | Hodgson et al. |
| 2015/0201970 A1 | 7/2015 | Aferzon |
| 2015/0201973 A1* | 7/2015 | Lindemann ........ A61B 17/7053 606/279 |
| 2016/0143669 A1 | 5/2016 | Kroll et al. |
| 2016/0324547 A1* | 11/2016 | Miller ................ A61B 17/7032 |
| 2016/0354118 A1 | 12/2016 | Belliard et al. |
| 2018/0064469 A1 | 3/2018 | Blakemore et al. |
| 2018/0098799 A1 | 4/2018 | Songer |
| 2018/0125537 A1* | 5/2018 | Seme ................. A61B 17/7002 |
| 2019/0059959 A1 | 2/2019 | Serra et al. |
| 2020/0170696 A1* | 6/2020 | Haber ................ A61B 17/809 |
| 2020/0352610 A1* | 11/2020 | McClintock ......... A61B 17/842 |

OTHER PUBLICATIONS

PCT/US2019/045968, Response to Written Opinion, 27 pgs Jun. 9, 2020.

PCT/US2019/045968, International Preliminary Report on Patentability, 8 pgs Dec. 1, 2020.

* cited by examiner

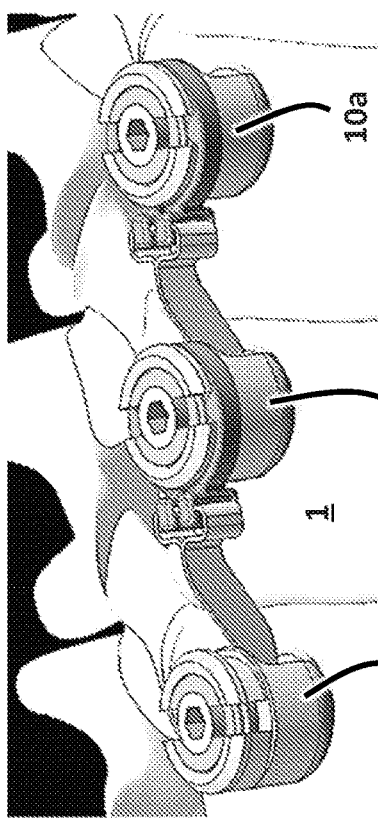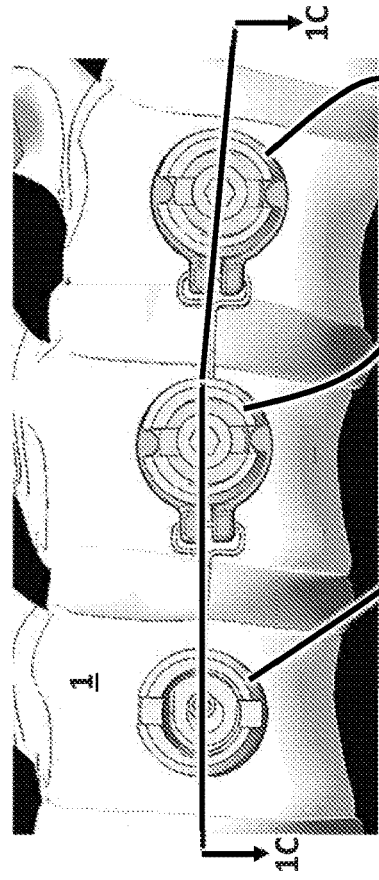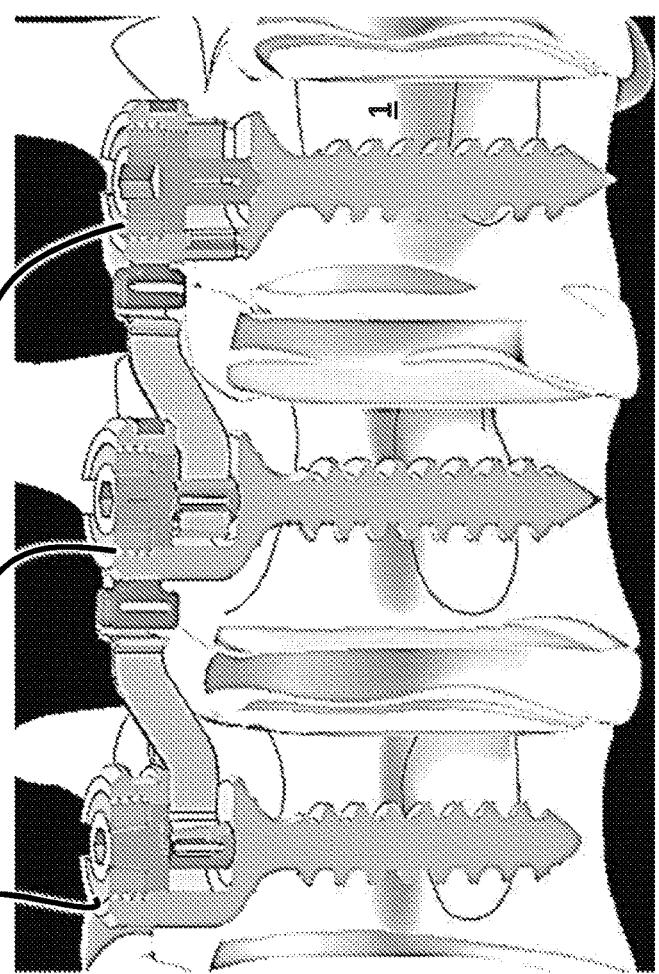

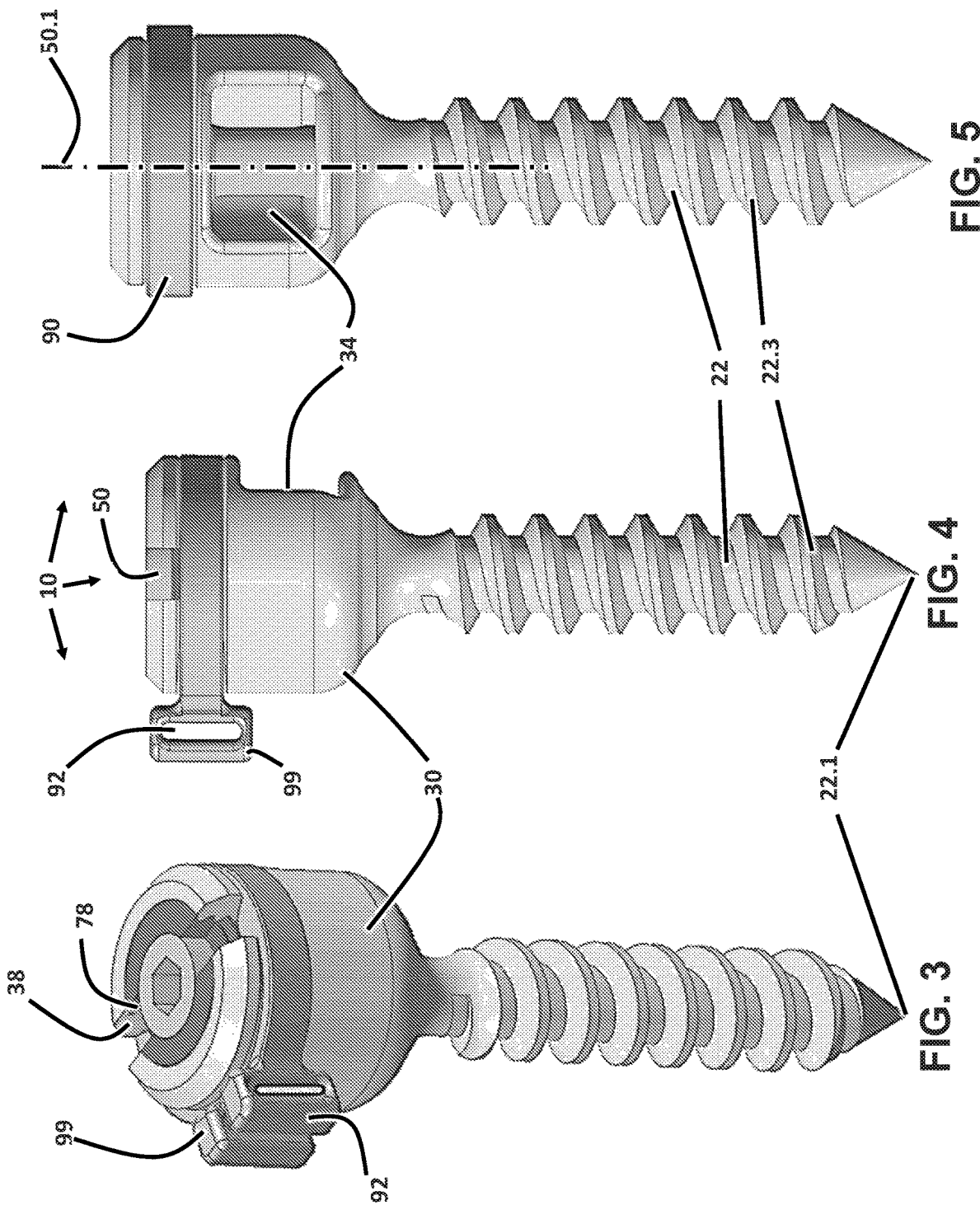

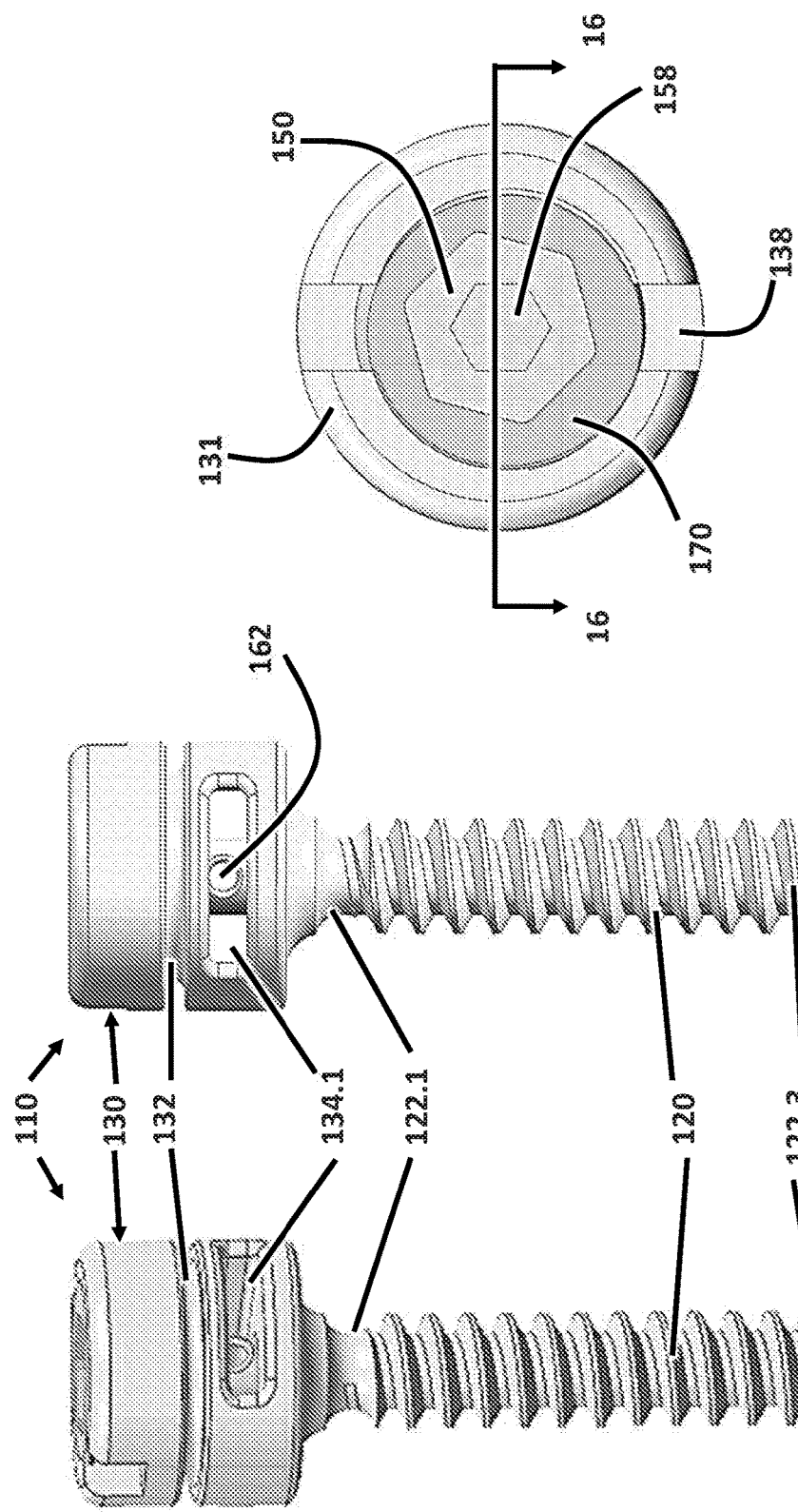

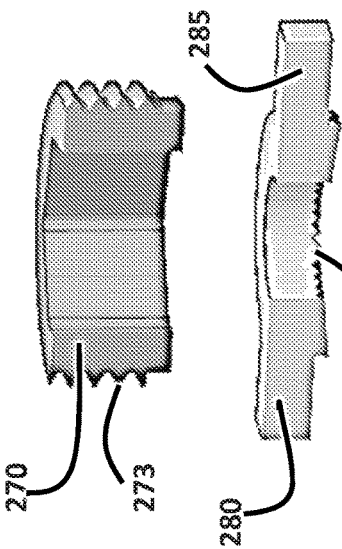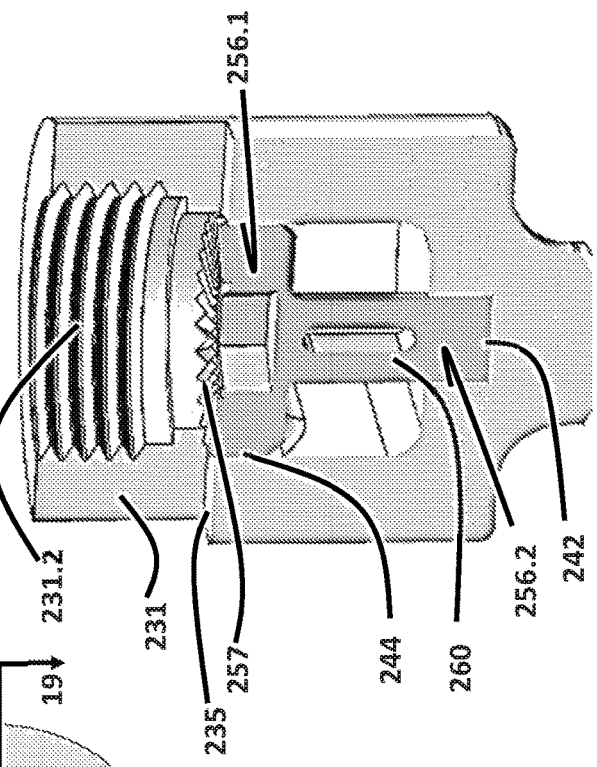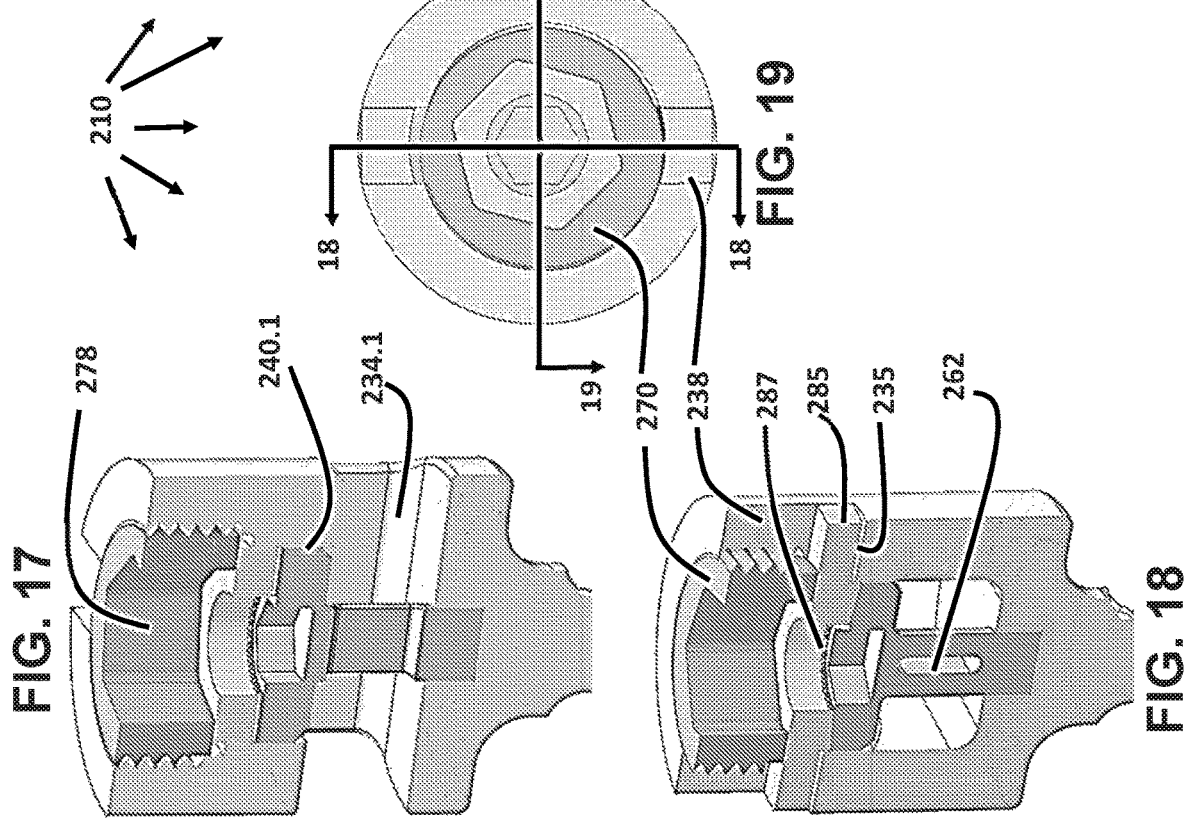

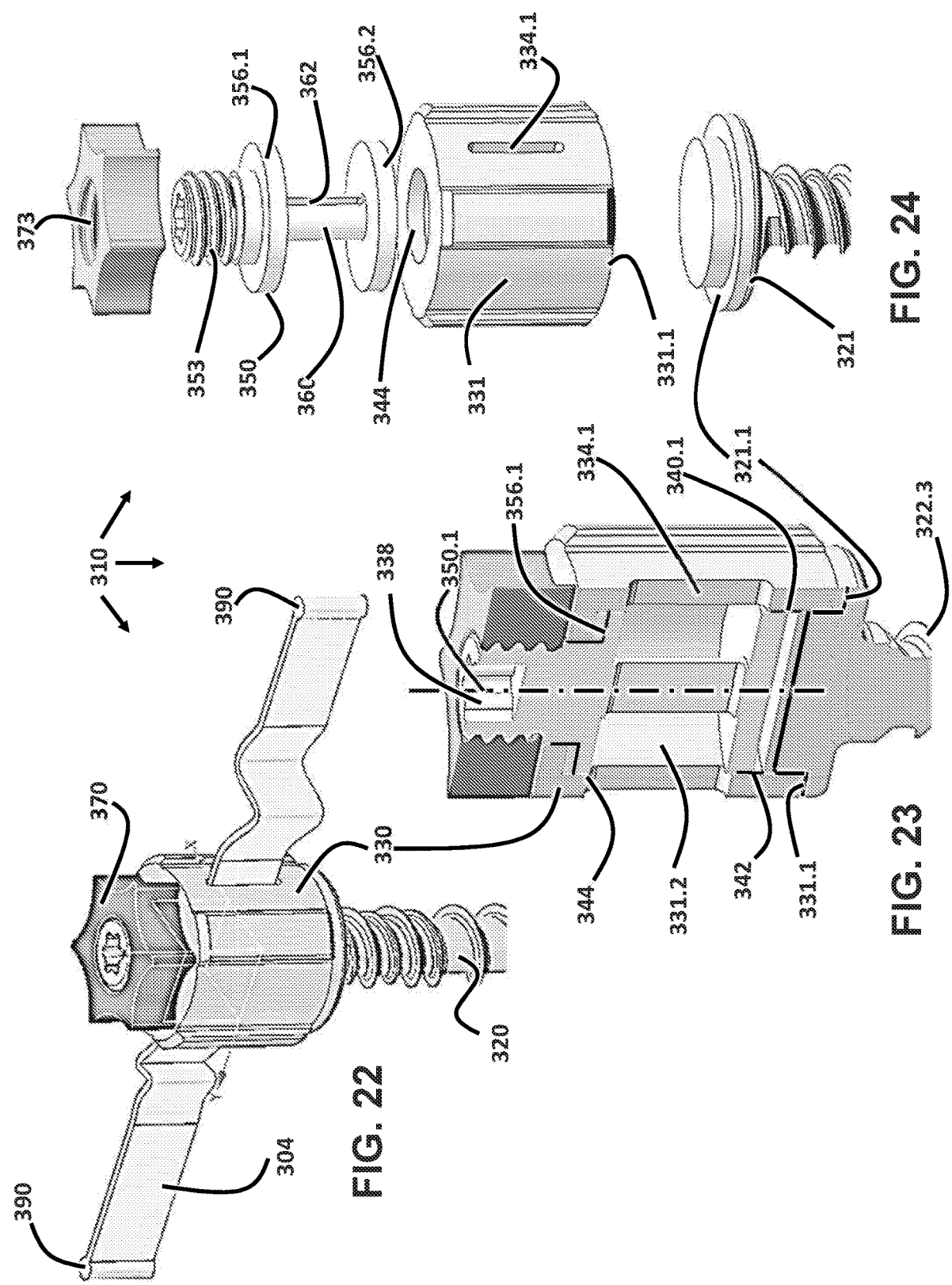

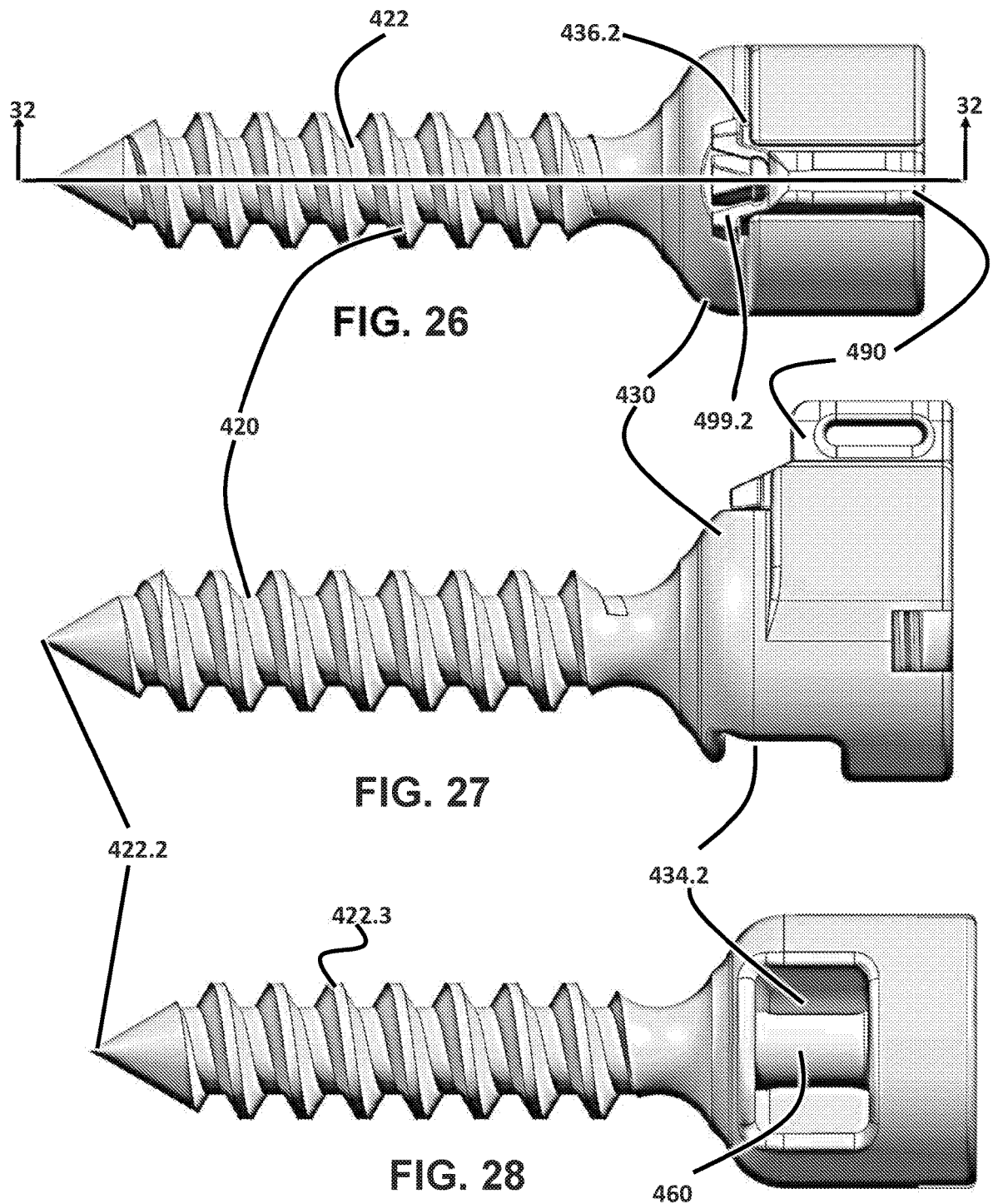

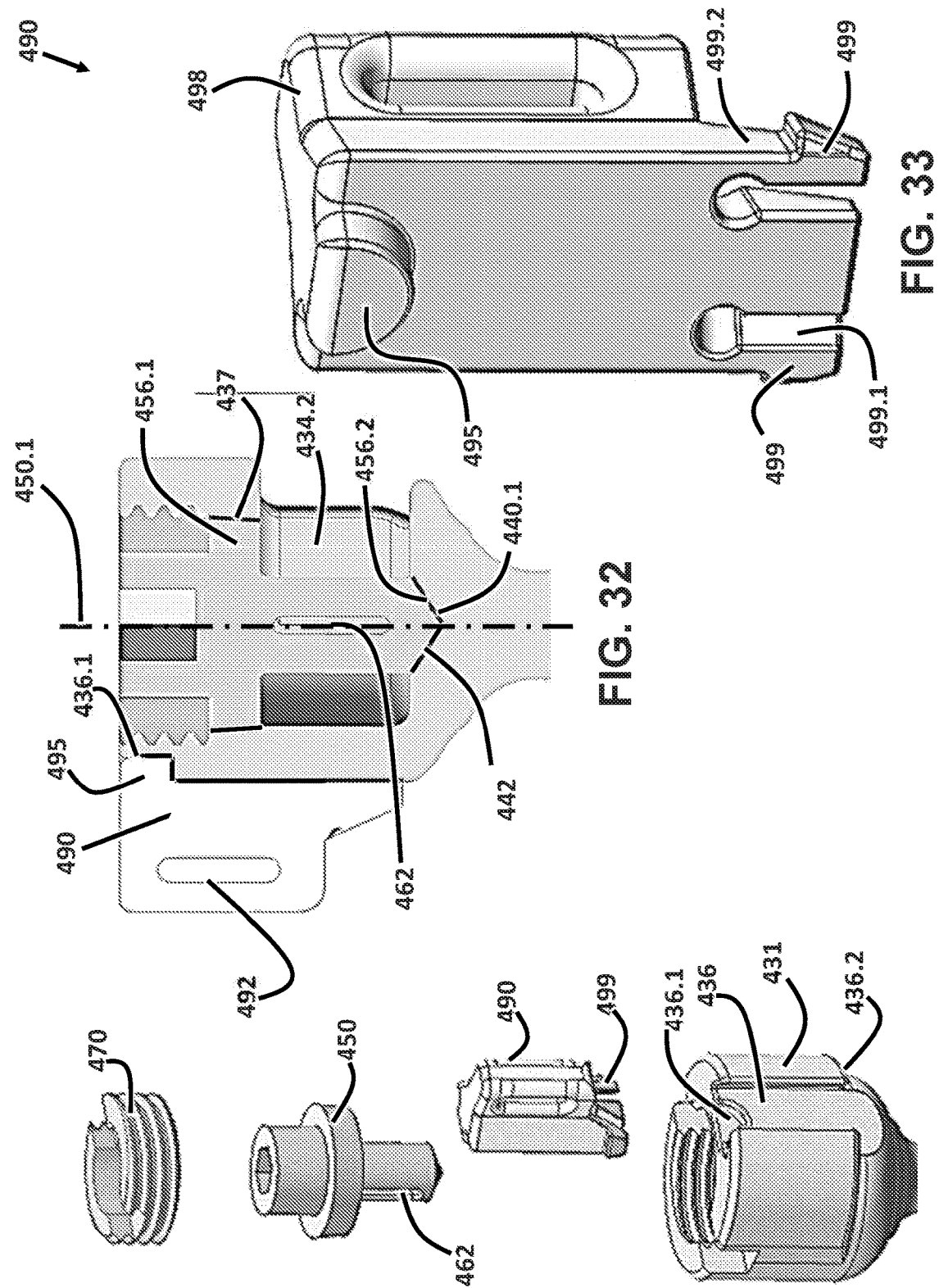

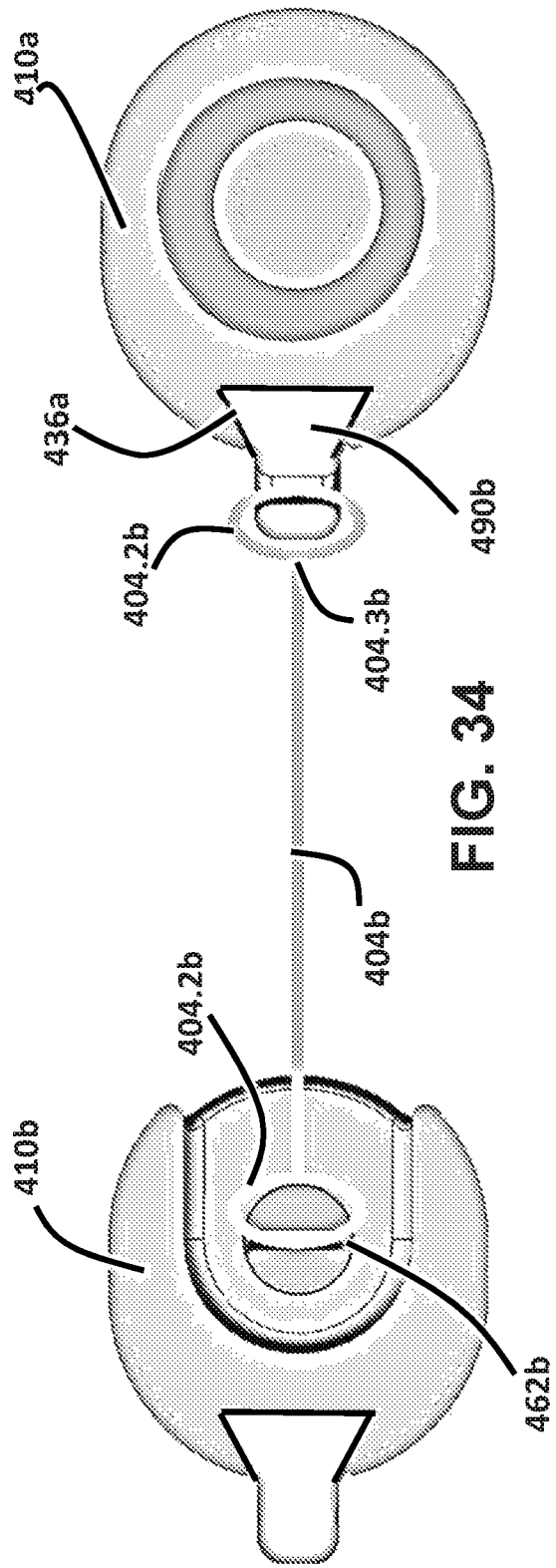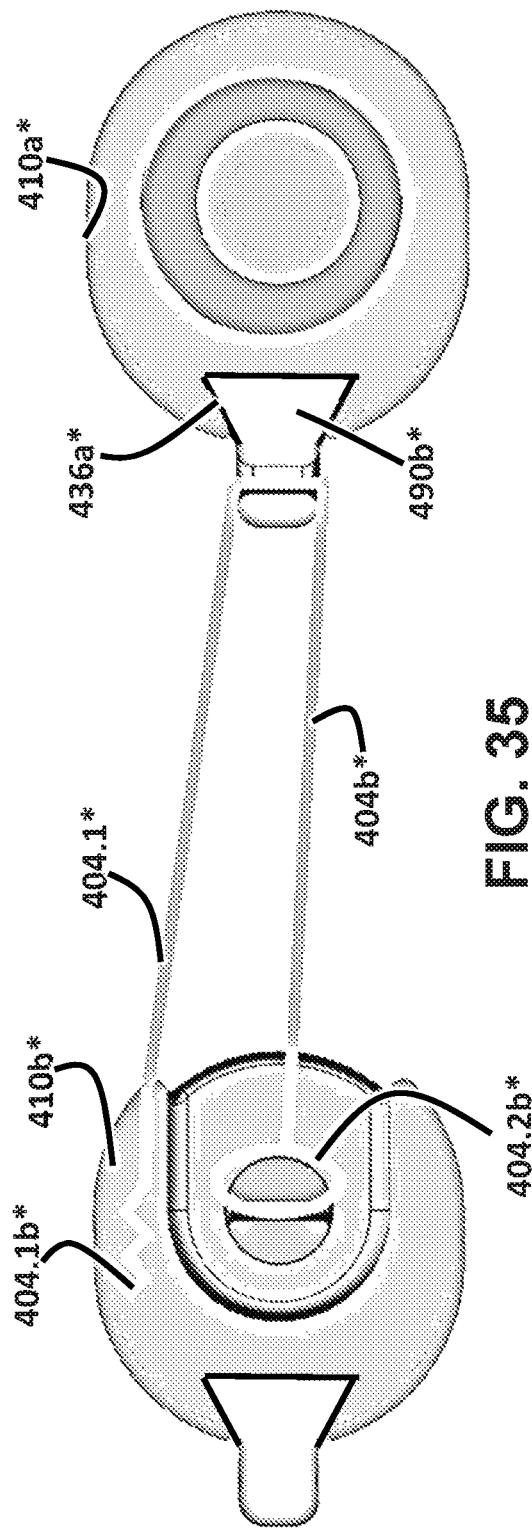

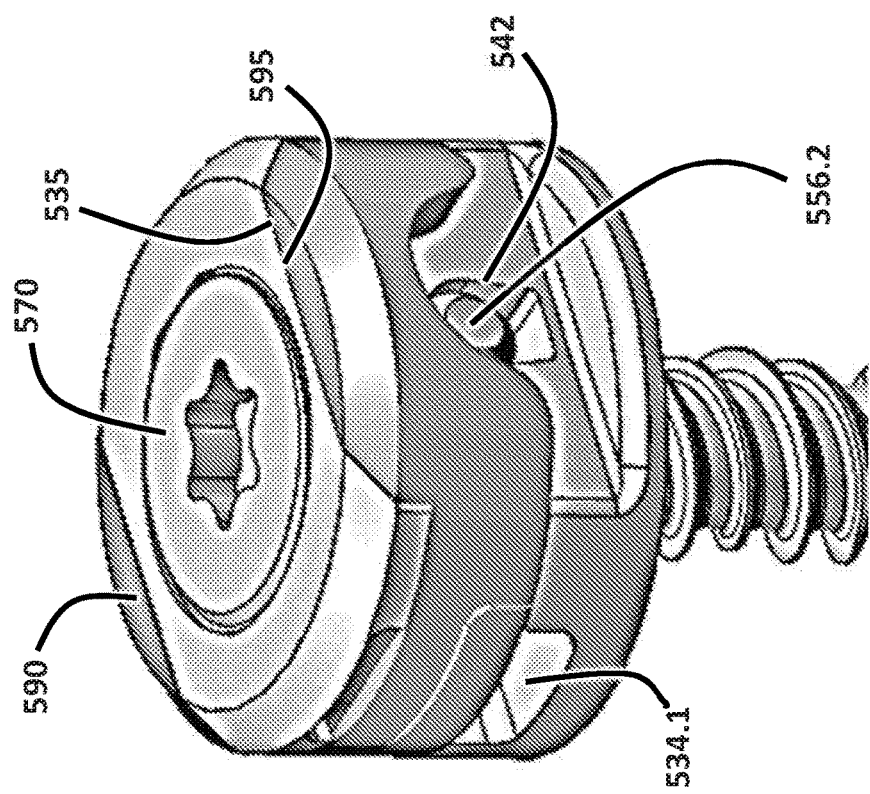
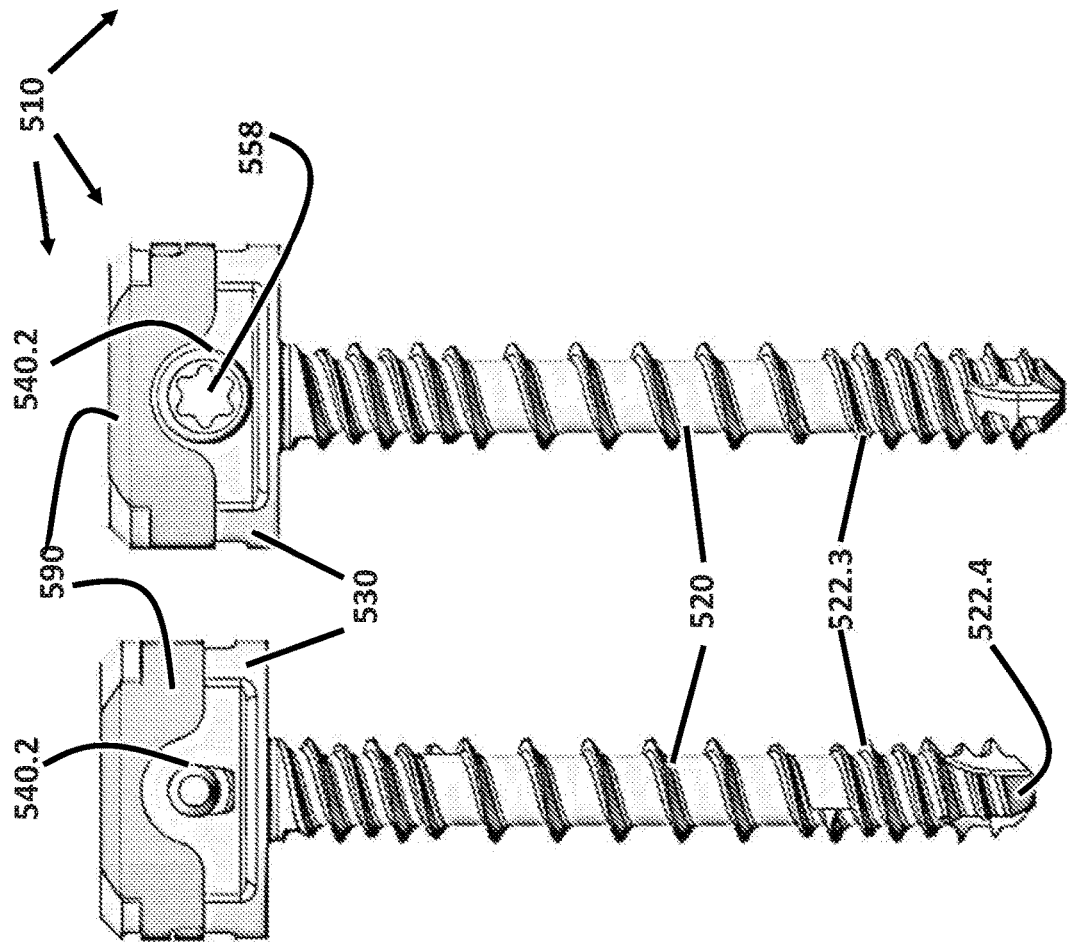
FIG. 36A  FIG. 36B  FIG. 36C

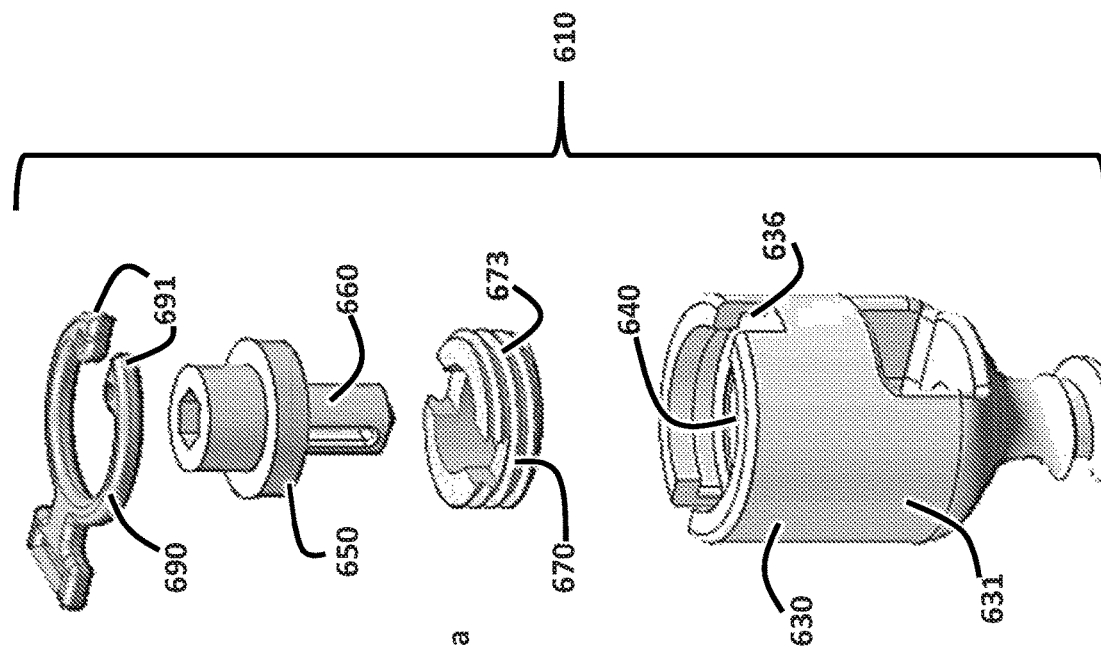
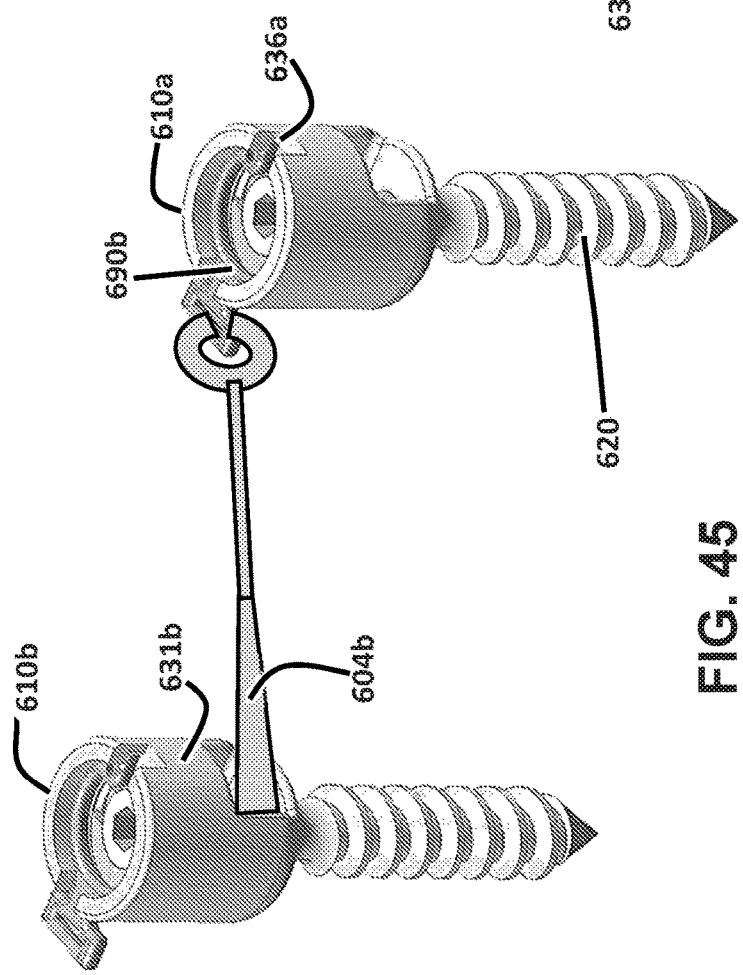
FIG. 46
FIG. 45

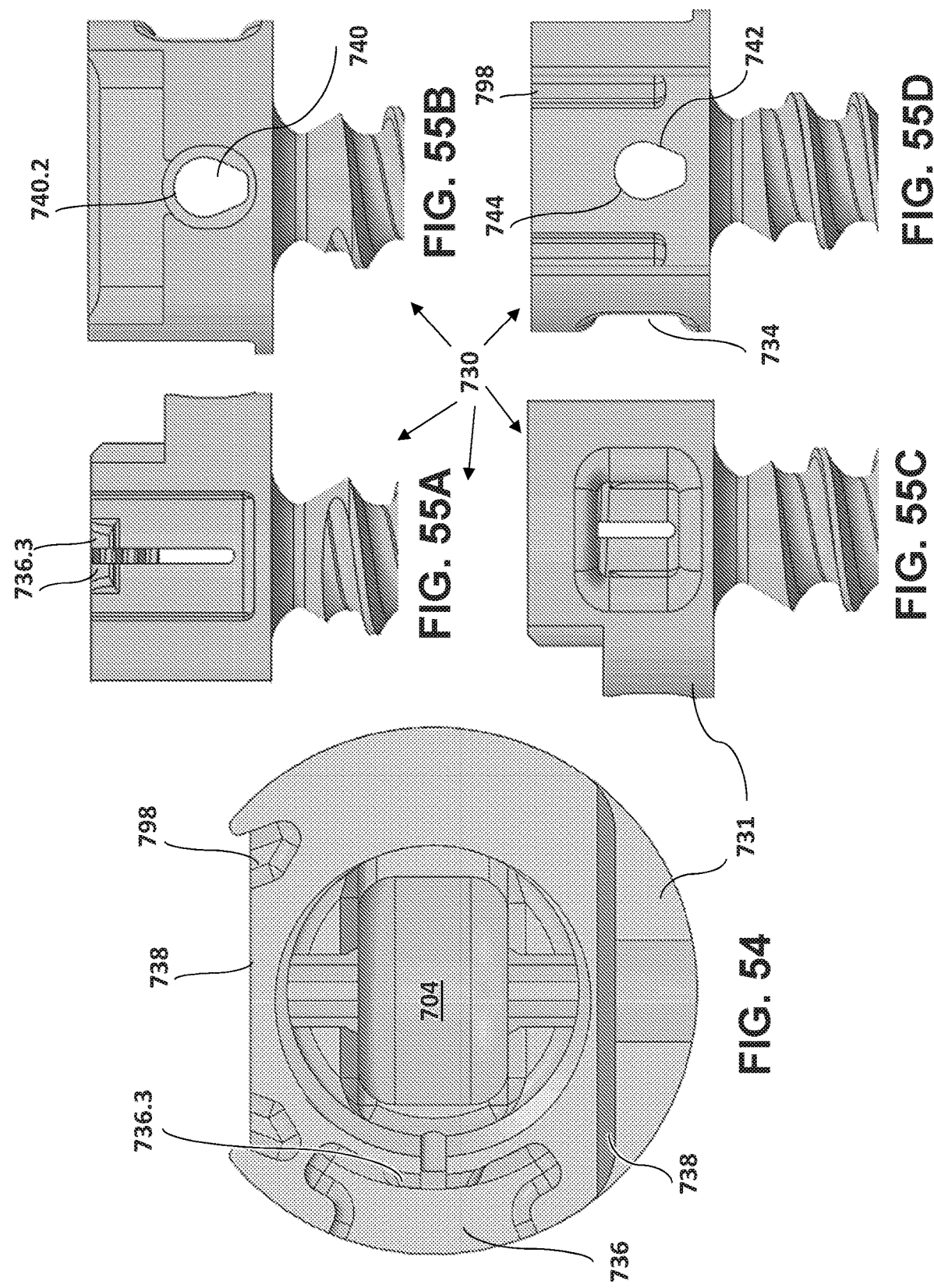

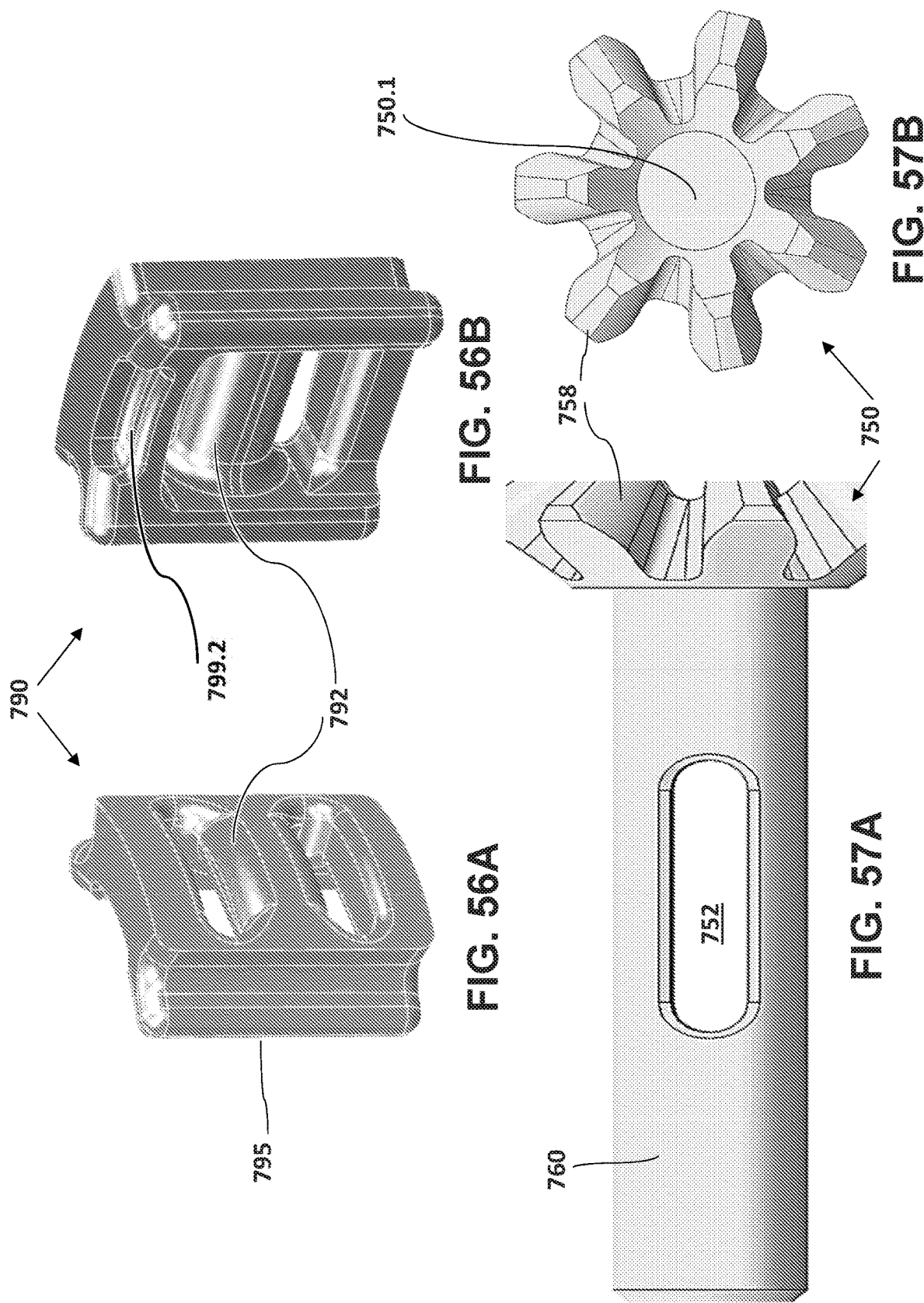

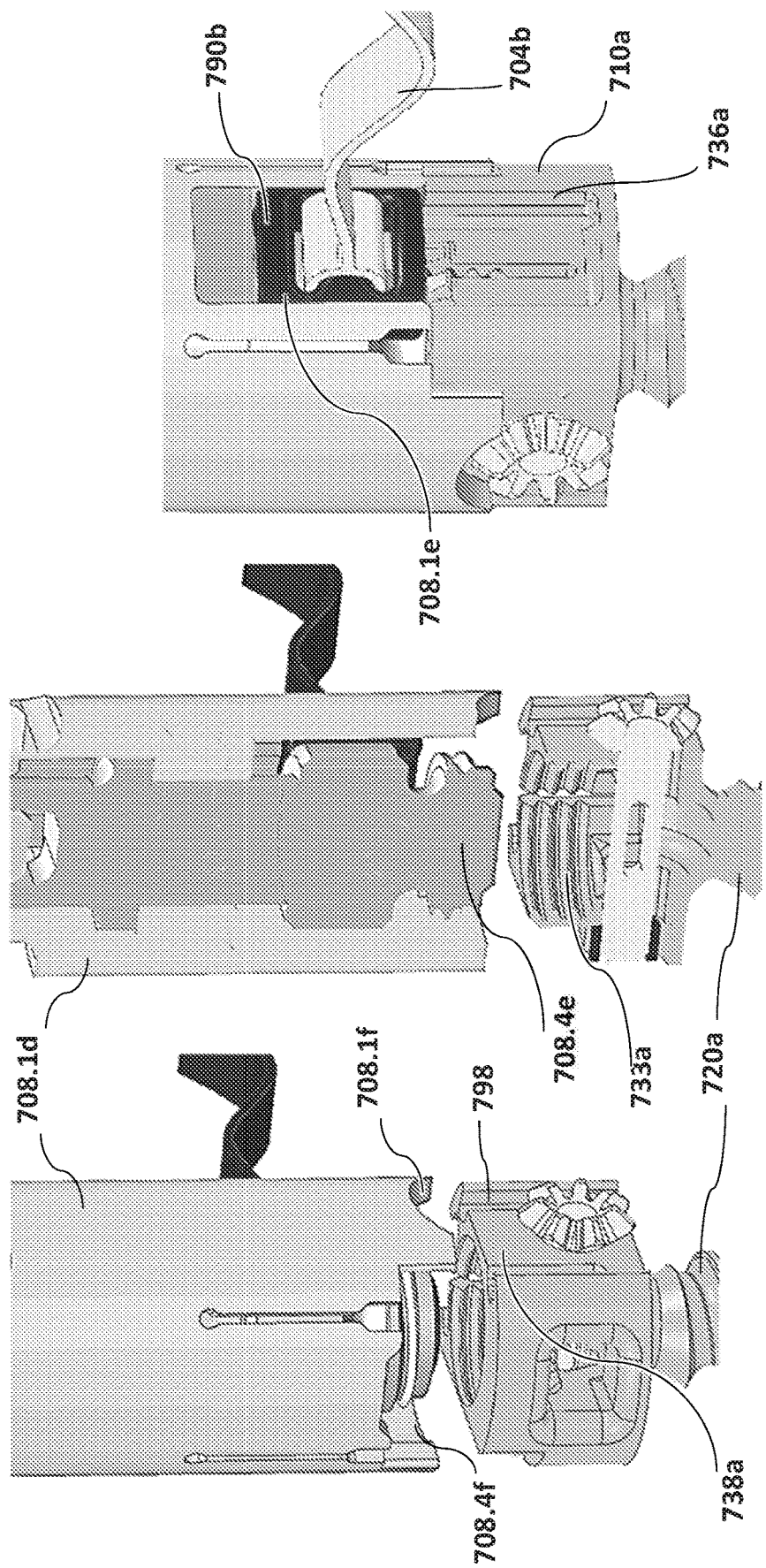

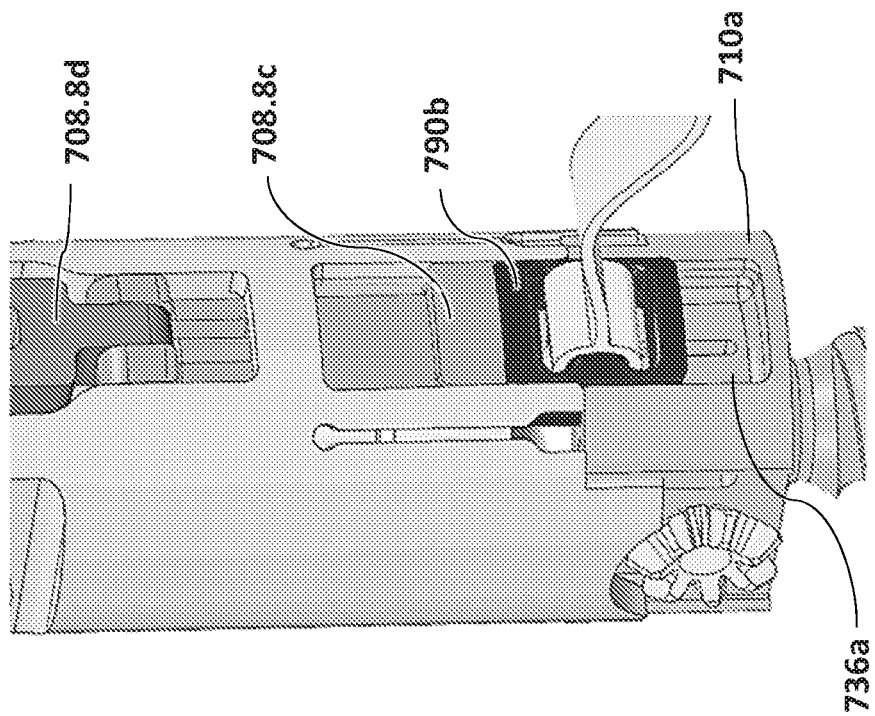
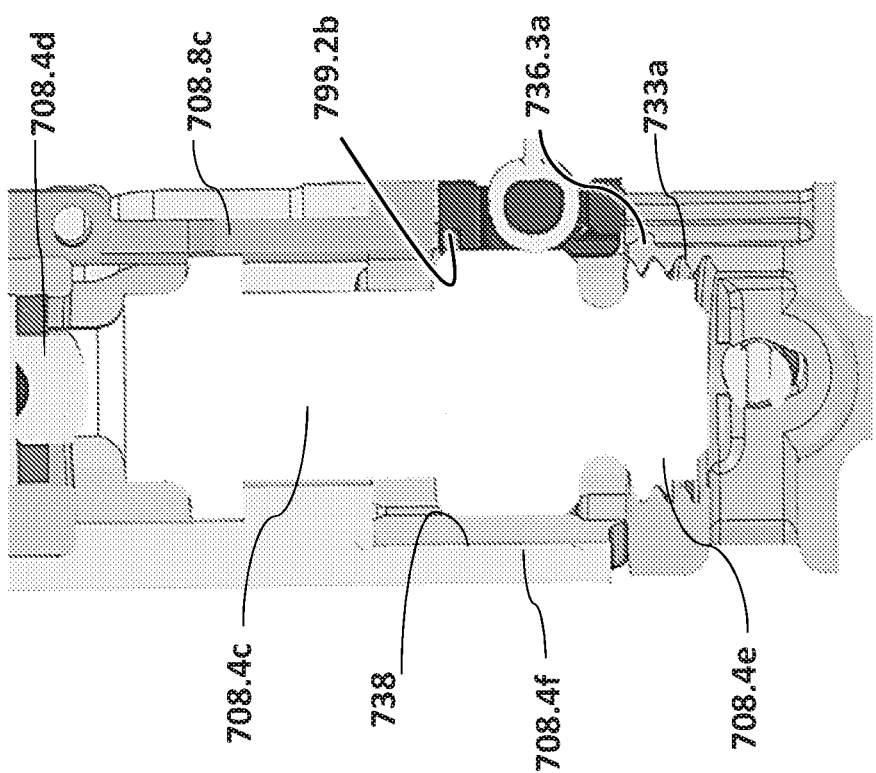

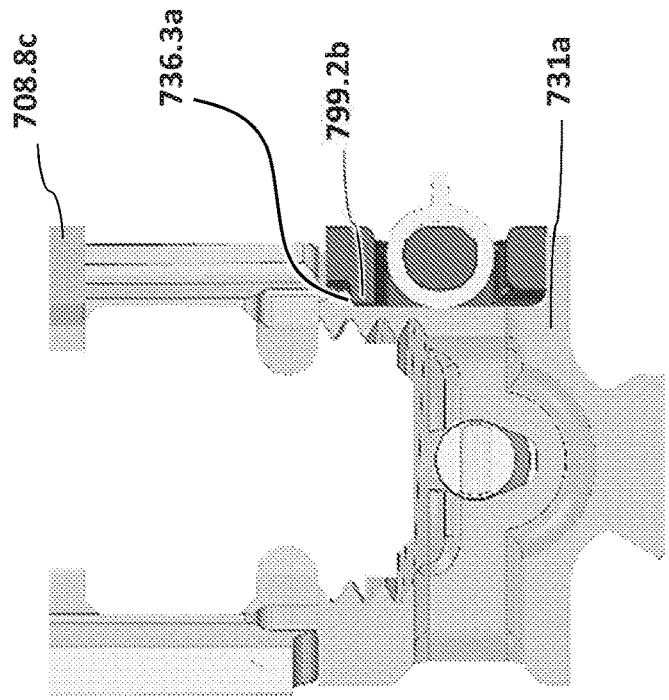
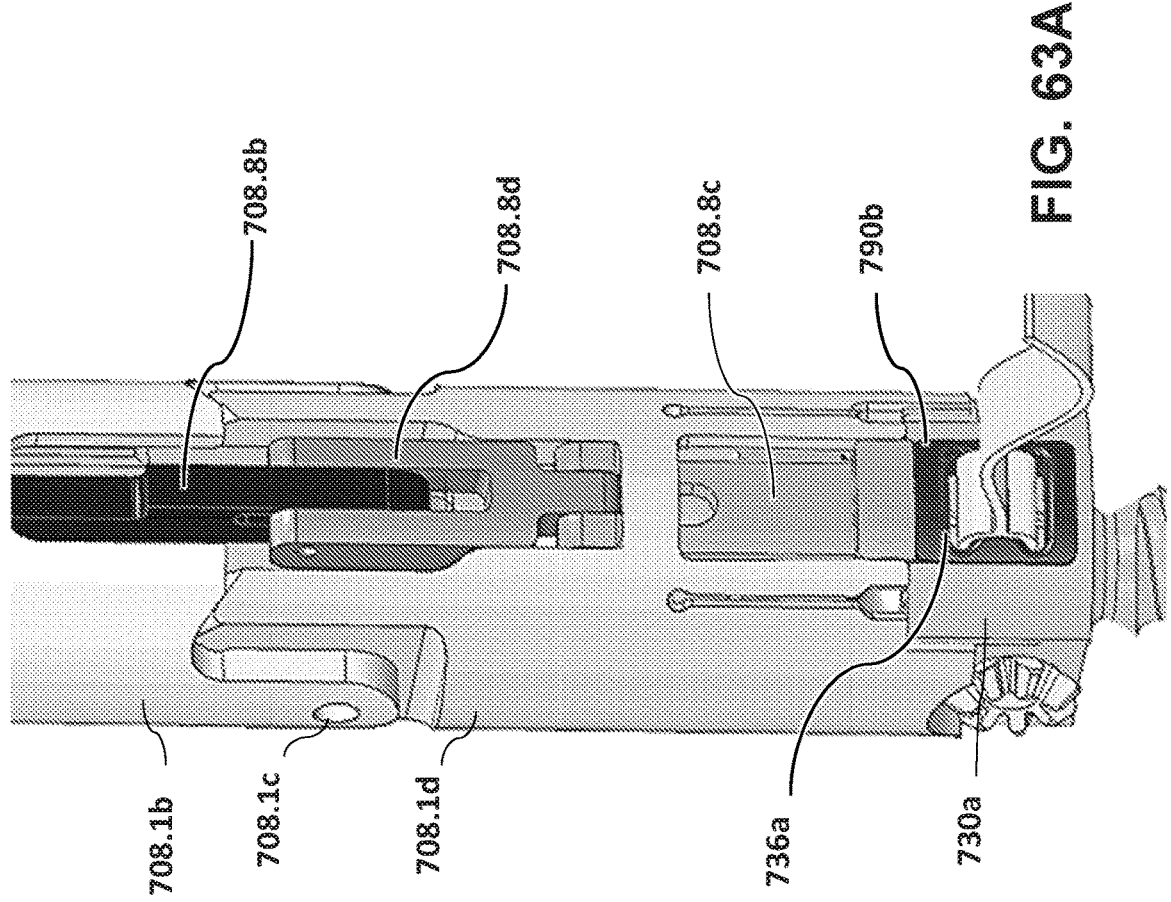
FIG. 63B
FIG. 63A

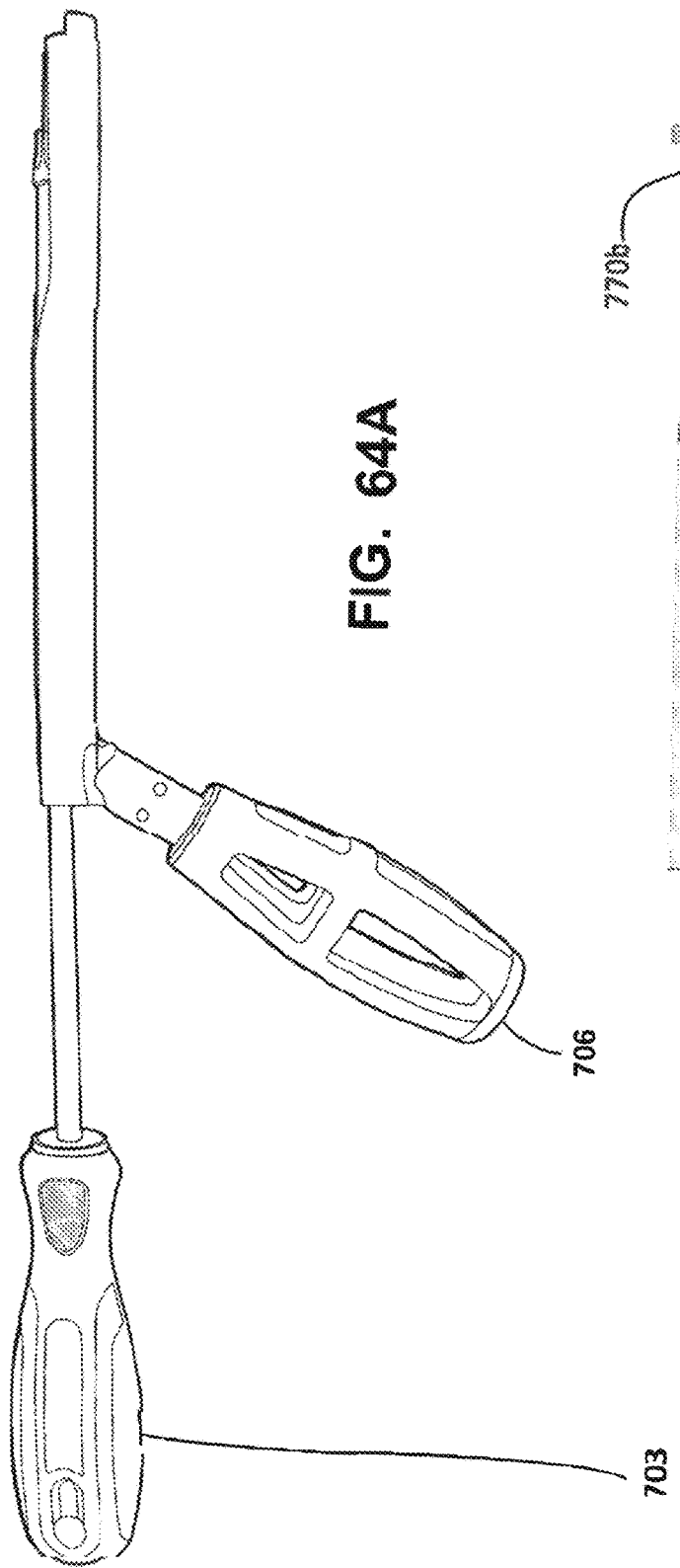
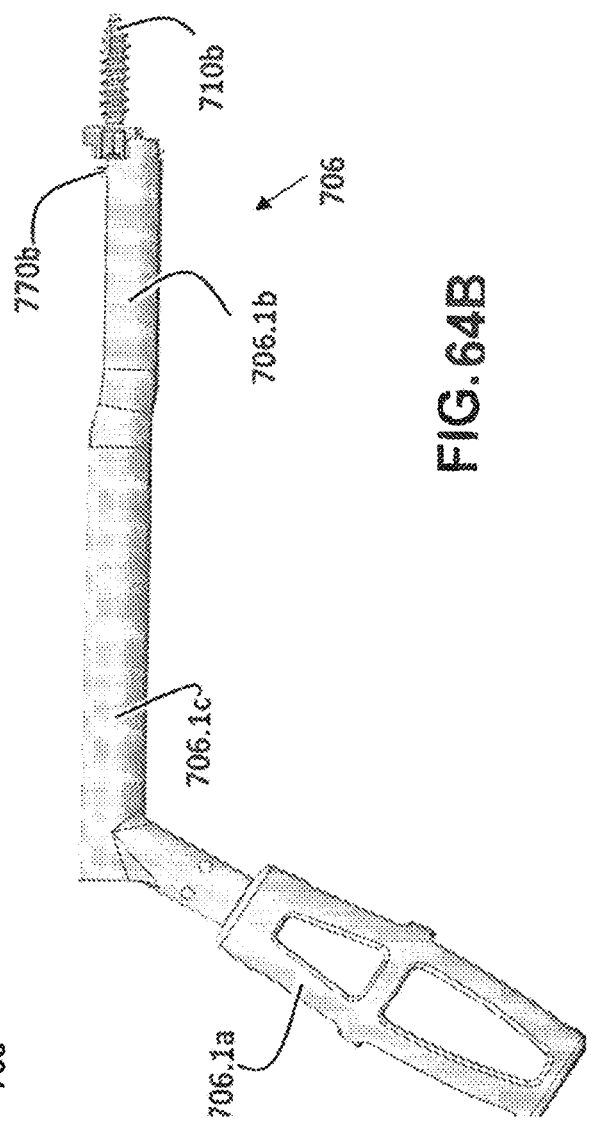

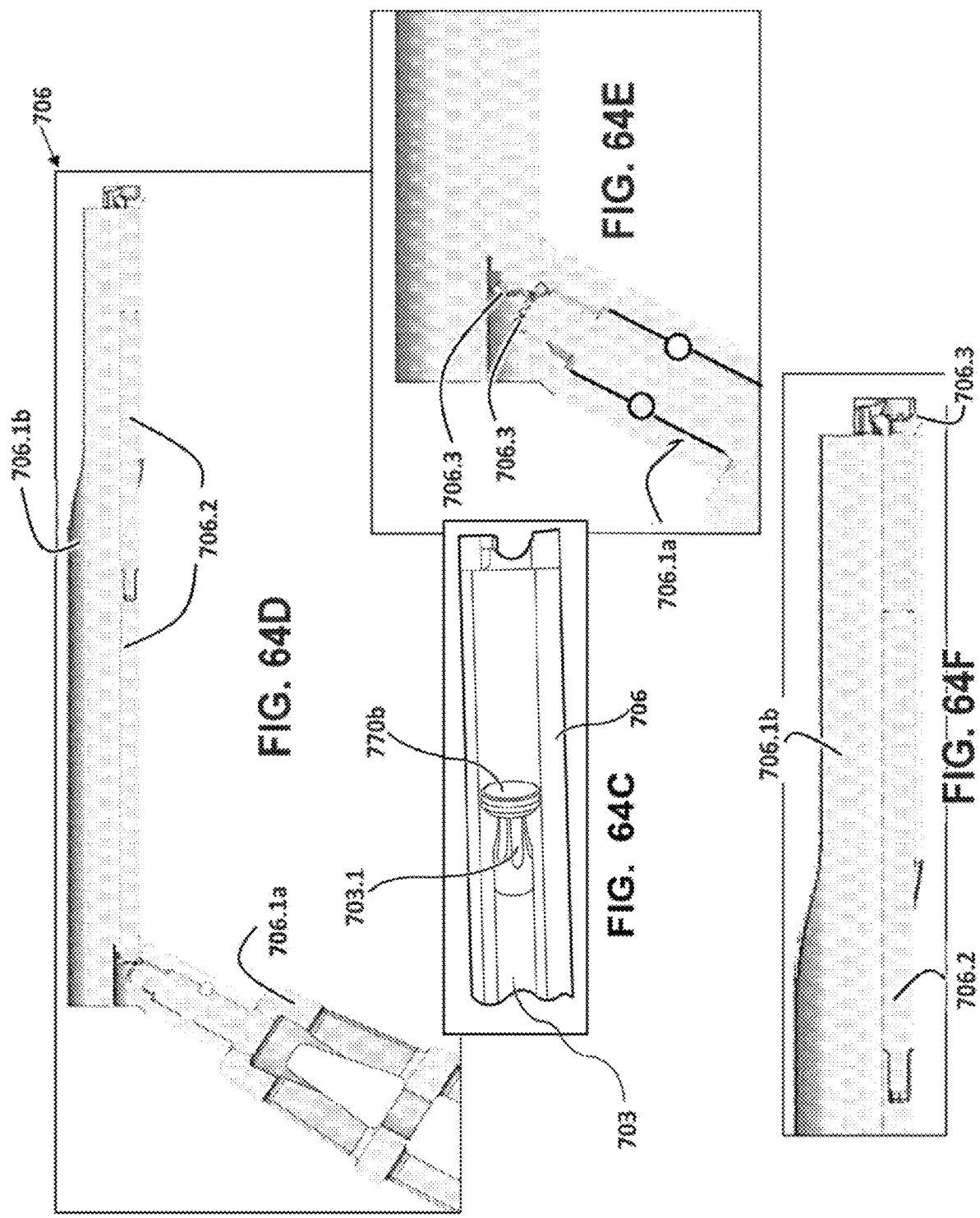

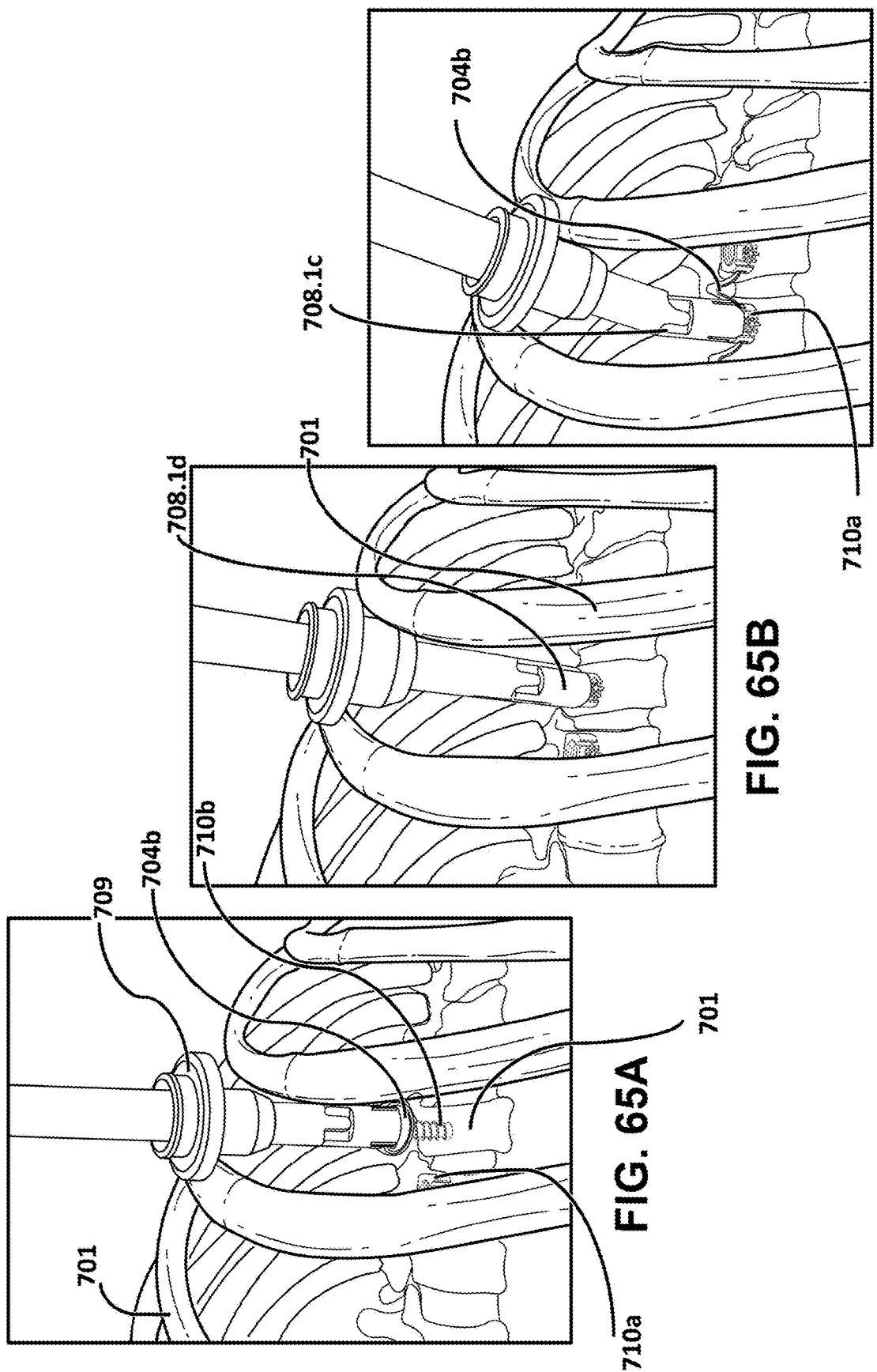

APPARATUS AND METHODS FOR SPOOLED VERTEBRAL ANCHORS

CROSS REFERENCE TO RELATED APPLICATIONS

This application is a national stage application, filed under 35 U.S.C. § 371, of International Patent Application No. PCT/US2019/045968, filed Aug. 9, 2019, which is incorporated herein by reference. This application also claims the benefit of priority to U.S. Provisional Patent Application Ser. No. 62/873,526, filed Jul. 12, 2019, and U.S. Provisional Patent Application Ser. No. 62/716,550, filed Aug. 9, 2018, both of which are also incorporated herein by reference.

FIELD OF THE INVENTION

Various embodiments of the inventions shown and described herein pertain to various concepts in fastening, and in particular to bone anchors, especially those that place a tensile load between two anchors.

SUMMARY OF THE INVENTION

Various anchors are shown herein for providing a flexible connection between adjacent bone anchors. Preferably, the connection if of the type that can sustain a load in tension, but which is generally unsuitable for maintaining a compressive load. Various examples of the flexible connections include sutures, cables, springs, and tethers, including tape, woven tape, braided sutures, and flat braids, as various non-limiting examples. It is understood that some types of flexible connections (such as springs) may be capable of applying a limited range of moments from one connector to another connector.

Some of the features found in some but not necessarily all of the anchors shown herein include:

Each anchor preferably comes pre-wound or pre-attached with its own tether segment.

Each anchor preferably provided with the tether pre-wound around or pre-attached to an instrument.

Each anchor forms an identical "link" in the "chain" of the spinal construct.

The tether wraps around a spool to remove slack and provide tension.

The method of tensioning involves torquing the spool until a given torque/tension, and then locking the spool in place with a set screw.

The anchors provide a means of segmental tensioning, such that the tension between each set of vertebrae can be adjusted (up or down) individually.

The anchors can contain various means of locking the spool in place.

Attachment to an adjacent anchor is accomplished via a dovetail-style tether end connector attached to the tether. The tether end connector is dovetailed so it can support axial load as the tape is tensioned. The tether end connector also has a positive stop at the trailing end and snap teeth at the leading end so it locks in place once inserted in the dovetail groove.

Attachment to an adjacent anchor is accomplished via a dovetail-style tether end connector attached to the tether. The tether end connector is dovetailed so it can support axial load as the tape is tensioned. The tether end connector also has a positive stop at the trailing end and snap feature at the trailing end and a snap tooth on the implant so it locks in place once inserted in the dovetail groove.

A spool that is perpendicular to the axis of the fastener. This design substantially mitigates torque balance issues, in that any torque imparted to the screw body from tension on the tether has no tendency to cause the screw body to rotate in the bone.

The set screw compresses against the several layers of tether that are wrapped around the spool in the tensioned state.

The set screw compress against a metal portion of the screw to improve locking function, the axis of the spool can rest in a tapered slot. Without compression, the spool is allowed to "float" at the top of the slot and rotate freely.

An alternative locking means may be provided by introducing a spacer between the spool and set screw. The underside of the spacer and the top side of the spool are cut with beveled teeth to provide a mechanical interlock between the two components when the set screw is torqued down. Since the spacer is keyed to the screw body, neither the spacer nor the spool can rotate with respect to the screw body once the set screw is torqued down.

Another locking option involves a different configuration of spool and screw body. The tether is passed through the slot in the spool and wraps around the spool as torque is provided to the spool. When the desired torque is reached, the locking nut is torqued to draw the spool upward, compressing the face of the spool against the inside of the spool body. Loosening is prevented by a frictional interface between the two components and the high amount of compression generated via the threaded connection of the locking nut and spool.

Another concept uses a simple loop of suture to connect the tether to the adjacent anchor. The loop sits in a groove in the neighboring screw body so that, when under tension, it resists any tendency to pop/slide off of the screw body. A similar loop/groove concept could be accomplished with a tape as well.

There are several alternate ways of threading the tether through the spool and the attachment clip, including:

1. A continuous loop of tether that passes between the spool and the tether end connector.
2. A single length of tether, with one end attached around the spool (via stitching, splicing, heat welding) and the other end attached around the tether end connector.
3. A single length of tether, with one end attached around the spool and the other end passing through the tether end connector and attached to the Screw Body of the first anchor, such as by crimping or by a secondary clip.
4. A single length of tether, passed around the tether end connector near its midpoint. The two free ends pass through the spool. Both free ends/legs of the tether are wrapped around the spool simultaneously. The free ends could be attached to the spool and/or each other, or could just be wrapped under several layers of tether.
5. The spool could be crimped closed to pinch the tether, or the ends of the tether could be heat set/crimped/sewn into a small bunch that cannot pull back through the aperture.

The tether threading methods can be mixed and matched with the different anchor, clip, and locking designs to come up with a wide variety of feasible options.

Yet other embodiments of the present invention pertain to the use of a tensioning instrument during surgery to adjust the tension of a flexible member attached to 2 implants. In one embodiment, the tensioner transfers rotational motion to the spool via a gear, such as a bevel gear. In yet another embodiment the tensioner transferring rotational motion to the spool in an axis that is not parallel to the spool. Yet other embodiments include a tensioner having clocking features between the tensioner and implant that allow the set screw to be tightened without spinning the whole implant.

In yet other embodiments there is a tensioner design that connects to the implant in an "outrigger" fashion for use with an instrument for tightening a set screw (i.e. centerlines of the instruments are not aligned). This allows the Tensioner to fit down a limited size portal (e.g. 15 mm) while maintaining enough space at the end for a bevel gear.

In still further embodiments there is a tensioner (or any instrument such as a bone connection member tightening tool) that has a bend/jog to its outer geometry while maintaining a straight through-cannula for set screw access. This allows the cannula to shift off-center relative to the local cross-section of the instrument. This is helpful for the situation where as one example there is a 15 mm diameter implant, a 15 mm diameter instrument, and the instrument acts in an outrigger approach. The 15 mm OD example is typical based on common portal sizes. After the first portion of the tensioner passes through the portal/into the chest cavity it can be shifted laterally so the instrument can occupy space outside of the projected circle of the portal. Still further embodiments include a tensioning instrument for an anchoring implant that translates rotational motion in the instrument to axial motion of the tether.

It will be appreciated that the various apparatus and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions. Further, the figures shown herein have been created from scaled CAD models. Persons of ordinary skill in the art will recognize that the drawings shown herein are made from a 3-D CAD model, typically showing shaded surface features. It is understood that relative scaling within a figure is by way of example, and not to be construed as limiting unless so stated in a claim.

FIG. 1A is a top view of a series of tethering anchor assemblies inserted in a spine.

FIG. 1B is a side and top perspective view of the implanted assemblies of FIG. 1A.

FIG. 1C is a side, top perspective cutaway view of the apparatus of FIG. 1A as taken along line 1C-1C.

FIG. 3 is a top, side perspective view of the anchor of FIG. 2 assembled.

FIG. 4 is a side elevational view of the anchor of FIG. 2 assembled.

FIG. 5 is a side elevational view of the anchor of FIG. 2 assembled.

FIG. 12 is a side, top perspective view of one of the anchors of FIG. 11.

FIG. 13 is a side elevational view of the anchor of FIG. 12.

FIG. 14 is a top plan view of the anchor of FIG. 12.

FIG. 17 is a cross sectional view of the apparatus of FIG. 19 as taken along line 17-17.

FIG. 18 is a cross sectional view of the apparatus of FIG. 19 as taken along line 18-18.

FIG. 19 is a top plan view of an anchor assembly according to another embodiment of the present invention.

FIG. 20 is a cross sectional view of a portion of the apparatus of FIG. 18.

FIG. 21A is a cross sectional view of a portion of the apparatus of FIG. 18.

FIG. 21B is a cross sectional view of a portion of the apparatus of FIG. 18, FIGS. 20, 21A, and 21B representing an exploded view.

FIG. 22 is a side, top perspective view of an anchor assembly according to another embodiment of the present invention.

FIG. 23 is a top, side perspective cutaway view of the apparatus of FIG. 22.

FIG. 24 is a side, top perspective exploded view of a portion of the apparatus of FIG. 22.

FIG. 26 is a frontal view of one of the anchors of FIG. 25.

FIG. 27 is a side view of one of the anchor of FIG. 26.

FIG. 28 is a rear view of one of the anchor of FIG. 26.

FIG. 31 is a side, perspective exploded representation of a portion of the apparatus of FIG. 26.

FIG. 32 is a side elevational cross sectional representation of the apparatus of FIG. 27 as taken along line 32-32.

FIG. 33 is a side, top perspective view of the end connector of the apparatus of FIG. 26.

FIG. 34 is a top plan cross sectional view of an interlocked pair of the apparatus shown in FIG. 26, according to one manner of interlocking.

FIG. 35 is a top plan cross sectional view of an interlocked pair of the apparatus shown in FIG. 26, according to another manner of interlocking.

FIG. 36A is a rear elevational view of a tethering anchor according to another embodiment of the present invention.

FIG. 36B is a front view of the apparatus of FIG. 36A.

FIG. 36C is a side, top, perspective representation of a portion of the apparatus of FIG. 36A.

FIG. 45 is a side, top, perspective representation of a pair of anchor assemblies according to another embodiment of the present invention.

FIG. 46 is an exploded view of a portion of an anchor according to another embodiment of the present invention.

FIG. 54 is a top plan view of a portion of the apparatus of FIG. 50.

FIG. 55A is a side elevational view of a portion of the apparatus of FIG. 54.

FIG. 55B is a front elevational view of a portion of the apparatus of FIG. 54.

FIG. 55C is an opposite side elevational view of a portion of the apparatus of FIG. 54.

FIG. 55D is a rear elevational view of a portion of the apparatus of FIG. 54.

FIG. 56A is a side, top perspective view of a portion of the apparatus of FIG. 50.

FIG. 56B is a top, opposite side view of the apparatus of FIG. 56A.

FIG. 57A is a side elevational view of a portion of the apparatus of FIG. 50.

FIG. 57B is an end view of the apparatus of FIG. 57A.

FIG. 61A is a CAD-generated surface depiction of a side elevational perspective view of the apparatus of FIG. 60C, shown prior to mounting of the anchoring assembly on the distal end, and shown without the flexible member wrapping around the distal end.

FIG. 61B is a cutaway view of the apparatus of FIG. 61A.

FIG. 61C is a side elevational view of the apparatus of FIG. 60C, except shown from the other side, and shown without the flexible member wrapping around the distal end.

FIG. 62A is a cutaway view of the apparatus of FIG. 61C showing the distal end of the tool being threadably received by the body of the anchoring assembly.

FIG. 62B shows the apparatus of FIG. 61C with the end connector sliding from the distal end of the tool and into the receptacle of the anchoring assembly.

FIG. 63A shows the apparatus of FIG. 62A with the end connector fully received within the receptacle of the body.

FIG. 63B is a cross sectional view of the apparatus of FIG. 63A, and showing the end connector being interlocked into the body of the anchoring assembly.

FIG. 64A is a photographic representation of a pair of tools used for tensioning, and further for fixating the state of tension.

FIG. 64B is a side elevational view of the tensioning tool of FIG. 64A.

FIG. 64C is a photographic representation of a portion of the apparatus of FIG. 64A.

FIG. 64D is a side elevational cutaway representation of the apparatus of FIG. 64B.

FIG. 64E is a close-up of a portion of the apparatus of FIG. 64D, proximate to the angled connection between the handle and the rigid section.

FIG. 64F is a close-up of the distal portion of the apparatus of FIG. 64D.

FIG. 65A is a photographic representation of various apparatus according to one embodiment of the present invention being implanted onto a model skeleton.

FIG. 65B is a photographic representation of the next act in a method of implantation, following the act of FIG. 65A.

FIG. 65C depicts a following act of implantation, following the act of FIG. 65B.

FIG. 69A is a side elevational view of the apparatus of FIG. 68B.

FIG. 69B is a partially cross-sectioned representation of a portion of the apparatus of FIG. 69A, as taken along line 69B-69B of FIG. 69A.

FIG. 69C is a cross sectional representation of a portion of the apparatus of FIG. 68B, as taken along line 69C-69C of FIG. 68B.

FIG. 69D is a cross sectional representation of the apparatus of FIG. 69A as taken along line 69D-69D of FIG. 69A.

ELEMENT NUMBERING

Figure 1D:
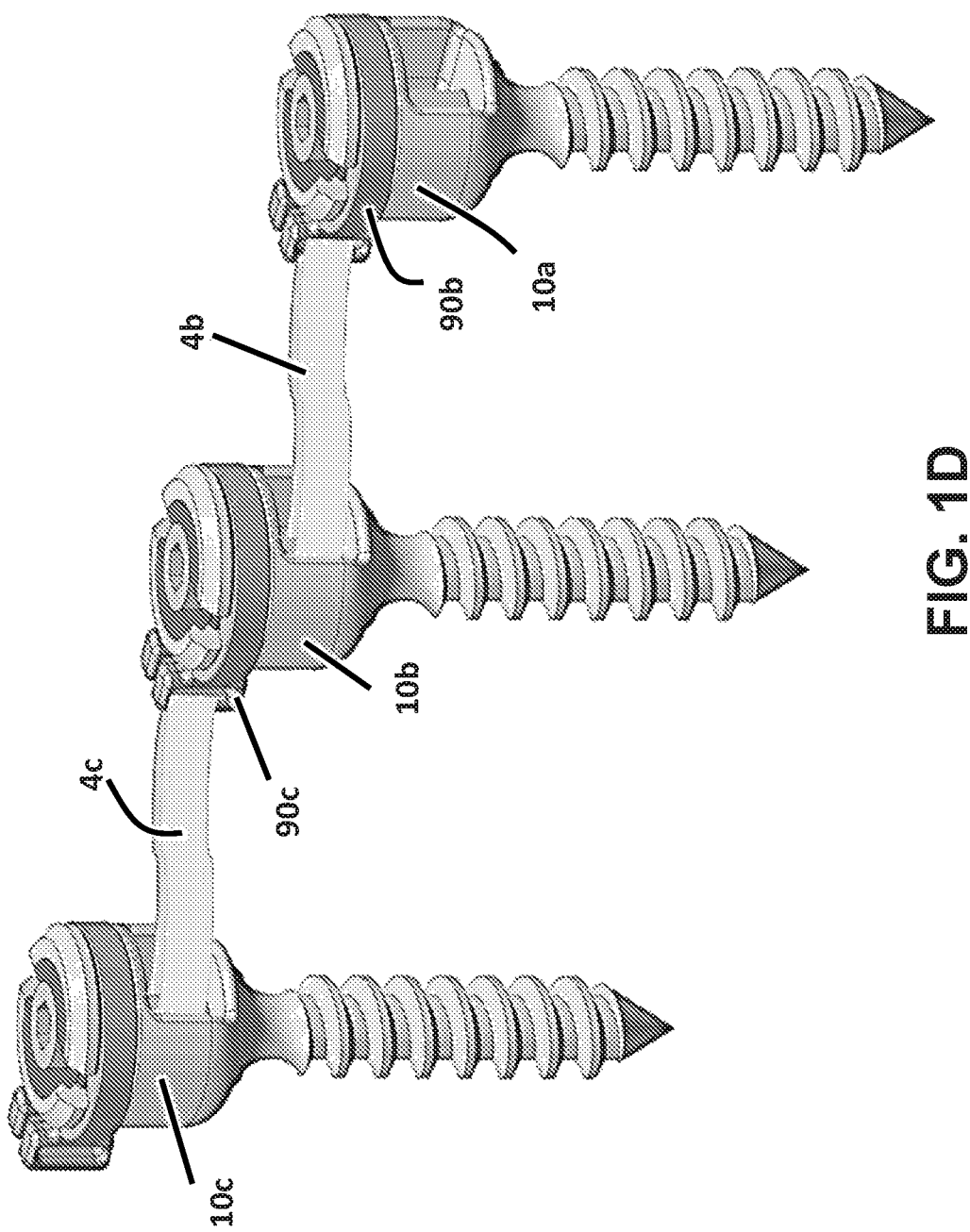
FIG. 1D is a side, top, end perspective representation of the apparatus of FIG. 1A, shown without attachment to the spine, and prepared from a CAD model using surface shading.

The following is a list of element numbers used with all of the embodiments, and at least one noun used to describe that element. The "X" for all of these numbers is replaced with a number (0 or greater) in the text and drawings of this application. Consistent with statements made elsewhere in this specification, these various element numbers are used among multiple embodiments, and aspects of a particular element stated for one embodiment can be applied to the same element number in a different embodiment, except as shown and described differently, and as would be understood by a person of ordinary skill in the art. It is understood that none of the embodiments disclosed herein are limited to these nouns, and these element numbers can further include other words that would be understood by a person of ordinary skill reading and reviewing this disclosure in its entirety.

| | |
|---|---|
| X01 | bone |
| X03 | screwdriver |
| .1 | tip |
| X04 | flexible member, flexible connector, tether, sutures, cables, springs, tape, and any of woven, braided, or flat, as examples |
| .1 | link |
| .2 | loop |
| .3 | junction |
| .4 | free end |
| X06 | tether tightening tool |
| .1 | external structure |
| a | handle |
| b | body |
| c | enclosed lumen |
| .2 | internal drive |
| .3 | gear |
| X08 | bone connection member tightening tool assembly |
| .1 | external structure |
| a | handle |
| b | rigid body |
| c | pivot |
| d | pivoting body |
| e | tether end connector holding slot |
| .1 | upper interior shoulder |
| .2 | tip |
| .3 | threads |
| .4 | cannula |
| X26 | platform |
| .1 | spikes |
| .2 | aperture |
| X30 | head assembly |
| X31 | body |
| .1 | ridge |
| .2 | cavity; bore |
| X32 | slot, groove, other tether connection feature |
| X33 | threads |
| X34 | tether passageway |
| .1 | open |
| .2 | blind |
| X35 | rotation resistance feature; slot; flattened surface |
| X36 | Groove, pocket, or receptacle for tether end connector |
| .1 | pocket |
| .2 | connector clip shoulder |
| .3 | tether end connector clips; projections |
| X37 | locking contact surface |
| X38 | tool coupling feature; slot; driven feature |
| X40 | spool receiving pocket |

-continued

| | |
|---|---|
| .1 | vertical |
| .2 | horizontal |
| X42 | inner spool interface |
| X44 | upper spool interface |
| X50 | spool; means for tensioning; bobbin; winder; reel |
| .1 | axis of rotation |
| X52 | slot, groove, other tether connection feature |
| X53 | threads |
| X54 | tether passageway |
| X56 | head interface feature |
| .1 | upper |
| f | tethering head alignment connector |
| .4 | anchor securement mechanism |
| a | knob |
| b | first shaft |
| c | second shaft |
| d | pivot |
| e | threaded interface |
| f | driving feature |
| .5 | |
| .6 | pivot enable lever |
| a | sliding button |
| b | internal shaft |
| .7 | |
| .8 | end connector releases mechanism |
| a | lever |
| b | first shaft; linkage |
| c | second shaft; linkage |
| d | pivot or pivoting link |
| X09 | surgery portal |
| X10 | anchor assembly |
| X20 | bone connection member; screw; staple |
| X21 | platform |
| .1 | ridge |
| X22 | shank; projection |
| .2 | lower |
| X57 | locking contact surface |
| X58 | tool coupling feature; gear |
| X60 | winding post |
| X62 | aperture |
| X63 | collar |
| X70 | outermost locking member |
| X71 | button |
| X73 | threads |
| X75 | lip; end connector retention feature; projections |
| X77 | spool contacting surface |
| X78 | tool coupling feature |
| X80 | intermediate locking member |
| X83 | threads |
| X85 | rotation resistance feature |
| X87 | spool contacting surface |
| X88 | tool coupling feature |
| X90 | tether end connector; intermediate span tether connector |
| X91 | split ends |
| X92 | slot, groove aperture, other tether connection feature |
| X95 | rotation resistance feature; flattened contact surface |
| X98 | tool coupling feature |
| X99 | connector clip |
| .1 | slots |
| .2 | shoulder |

Detailed Description of One or More Embodiments

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention, and further permits the reasonable and logical inference of still other embodiments as would be understood by persons of ordinary skill in the art.

It is understood that any reference to "the invention" is a reference to an embodiment of a family of inventions, with no single embodiment including an apparatus, process, or composition that should be included in all embodiments, unless otherwise stated. Further, although there may be discussion with regards to "advantages" provided by some embodiments of the present invention, it is understood that yet other embodiments may not include those same advantages, or may include yet different advantages. Any advantages described herein are not to be construed as limiting to any of the claims. The usage of words indicating preference, such as "various embodiments" or "preferably," refers to features and aspects that are present in at least one embodiment, but which are optional for some embodiments, it therefore being understood that use of the word "preferably" implies the term "optional."

The use of an N-series prefix for an element number (NXX.XX) refers to an element that is the same as the non-prefixed element (XX.XX), except as shown and described. As an example, an element 1020.1 would be the same as element 20.1, except for those different features of element 1020.1 shown and described. Further, common elements and common features of related elements may be drawn in the same manner in different figures, and/or use the same symbology in different figures. As such, it is not necessary to describe the features of 1020.1 and 20.1 that are the same, since these common features are apparent to a person of ordinary skill in the related field of technology. Further, it is understood that some features 1020.1 and 20.1 may be backward compatible, such that a feature of a later discussed embodiment (NXX.XX) may include features compatible with other various embodiments that were discussed earlier (MXX.XX), as would be understood by those of ordinary skill in the art. This description convention also applies to the use of prime ('), double prime ("), triple prime ('''), and star or asterisk (*), suffixed element numbers. Therefore, it is not necessary to describe the features of 20.1, 20.1', 20.1", 20.1''', and 20* that are the same, since these common features are apparent to persons of ordinary skill in the related field of technology.

Although various specific quantities (spatial dimensions, temperatures, pressures, times, force, resistance, current, voltage, concentrations, wavelengths, frequencies, heat transfer coefficients, dimensionless parameters, etc.) may be stated herein, such specific quantities are presented as examples only, and further, unless otherwise explicitly noted, are approximate values, and should be considered as if the word "about" prefaced each quantity. Further, with discussion pertaining to a specific composition of matter, that description is by example only, and does not limit the applicability of other species of that composition, nor does it limit the applicability of other compositions unrelated to the cited composition.

Various references may be made to one or more methods of manufacturing. It is understood that these are by way of example only, and various embodiments of the invention can be fabricated in a wide variety of ways, such as by casting, sintering, sputtering, welding, electrodischarge machining, milling, as examples. Further, various other embodiment may be fabricated by any of the various additive manufacturing methods, some of which are referred to 3-D printing.

Various embodiments of the invention shown herein pertain to bone anchors that are adapted and configured to provide a tethering connection between two vertebrae. In some embodiments, the anchor assembly includes a spool that is connected to a length of a tether at one end, and connected at the other end to a readily removable end connector also located on the anchoring assembly. In some applications, a series of such anchoring assemblies (two or more) are placed into different vertebrae (which may or may not be adjacent to one another), and the end connector (with tether attachment) of one anchor is attached to the head of the other anchor (from which the end connector has been removed). In some embodiments, a single anchoring assembly provides an installed, pre-wound length of tether, and a readily removable end connector, along with means for adjusting the tension in the tether, and means for locking the position of the spool once the correct tension has been achieved. In yet other embodiments, the tether and preferably an end connector are provided pre-wound around or pre-attached to an instrument.

In still further embodiments, the anchoring assembly includes a rotating spool, a predetermined length of tether or flexible member, a loop at the end of the tether, and a groove or hitching post or similar feature on the head of the assembly. In such embodiments the tether can be unwound from a first anchor, and the tether loop can be placed on the adjacent anchor, such as in a groove extending around the head. It is understood that the terms spool, means for tensioning, bobbin, winder, winding post, post, reel and the like can each refer to a rotating member the is interconnected to the flexible member, such that rotation of the rotating member pulls on the flexible member.

In still other embodiments, the anchoring assembly includes a spool that is rotatable within the head of the anchor, and a length of tethering material wound around the spool. Preferably, the end of the tether includes an end connector adapted and configured for attachment to an adjacent anchor. In some embodiments, the tethering material extends from opposite sides of the head, and can be wound or unwound in the two opposing directions. Such an anchor would be placed between two other anchors that have been adapted and configured to receive an end connector of the tether.

Still further anchoring assemblies are disclosed herein, which include different means for locking the rotational position of the spool relative to the head of the anchor. In some embodiments the spool is received within a tapered pocket, such that compression of the spool into the pocket (such as by a set screw) results in increasing amounts of friction between the spool and the head. In some embodiments, including those using a horizontal spool concept, there is a dovetail or taper lock between spool and body, as well as friction between set screw and layers of tether. Still further embodiments include a washer or spacer in between the set screw and layers of tether too to minimize abrasion as the set screw or other locking feature is tightened. This friction is capable of locking the rotational position of the spool, and thus maintaining the desired amount of tension. In yet other embodiments, the frictional locking of the anchor head to the spool is achieved by applying compression to the spool by a set screw, and thereby placing a portion of the head sandwiched between the spool and the locking screw in compression, and thereby creating a frictional lock.

In further embodiments, an anchoring assembly including a rotatable spool is locked in place by a pair of locking members. The first locking member, in direct contact with the spool, has an interface adapted and configured to interlock with the opposing face of the spool. This intermediate locking member itself is in contact with a set screw, such that tightening of the set screw places compression between the opposing faces of the bottom of the set screw and the top of the intermediate locking member. When such compression is applied, a compressive force is obtained between the interlocking faces of the intermediate locking member and the top of the spool. Any attempt to rotate a spool locked in this manner results in mechanical interference of the spool surface with the intermediate locking member surface, this interference preventing rotation. Preferably, the intermediate interlocking member also has one or more features that prevent rotation of the intermediate member relative to the head of the anchor.

Various embodiments of the inventions presented herein include readily and easily removable tether end connectors, as well as external features on the anchor head which are adapted and configured to securely receive an end connector, but also to permit the easy removal of the end connector. In some embodiments, the end connectors are of a split ring type, in which the connector is preferably generally circular, and received within a groove on the exterior of the body of the anchor head. The split ring can be of either the expanding or contracting type. With an expanding type split ring tethering connector, a pliers-type of tool can be used to expand apart the split ends, sufficient for the inner diameter of the split ring to be made larger than a corresponding diameter of the head, such that the split ring can be readily removed from the head and readily inserted into the roove of an adjacent anchor head. In yet other embodiments, the ring can be of the contracting type, in which a pliers-type tool couples to the split ends of the ring, and compresses the ring, such that the outer diameter of the ring becomes smaller than a corresponding inner diameter of the head, thus permitting the ring to be readily removed from the head and readily inserted into the groove of an adjacent anchor head. The directions of the split and the connecting ends of the ring can be of any type, including ends that abut each other, as well as ends that overlap one another.

In still further embodiments, the end connector has a predetermined shape substantially complementary to the shape of a feature on the exterior of the head. The end connector can slide in and out of the feature in some embodiment or in other embodiments can be pushed on or pulled off of the feature, and in yet other embodiments includes one or more biasing features that permit the end connector to snap into place on the feature. In some embodiments, the groove is substantially horizontal relative to the connector axis, although such orientation is not required. Preferably, such end connectors include a pair of features for grasping onto corresponding features of the head, thus placing these features of the end connector in compression and thereby maintaining their position on the head. In one embodiment, the head groove and the separable end connector each include complementary features that are meant to bottom-out the connector within the groove, thereby placing a limit on the movement of the end connector within the groove. When the end connector reaches its bottomed-out position, a different connection feature between the separable end connector and the head maintains this fully bottomed-out location. In some embodiments, the end connector includes a pair of inwardly-flexible, outwardly-biased shoulders that snap around the corresponding ledge of the head proximate to the groove. In still other embodiments, this second locking feature can further be a shear pin type of connection, in which both the end connector and the head have apertures that come into alignment, such that the surgeon can place a further separate locking member, such as a rolled steel pin.

FIGS. 1-10 depict various views of a bone anchor adapted and configured to provide vertebral tethering between two or more vertebrae of a spine. However, the various anchors and features shown for any of the embodiments herein can be useful in other locations of a skeleton, as well as being useful in non-medical applications.

As used herein, the terms "tether" and "flexible connector" refer to any of a variety of devices and materials for providing a flexible connection between two objects. Preferably, this flexible connection is adapted and configured to transmit a tension load, but substantially unable to transmit a compressive load. In some applications, the flexible connector has a limited ability to transmit a moment (either by bending or torsion), whereas in other applications the flexible connector has no ability to transmit a moment. Various embodiments contemplate "tether" or "flexible connectors" comprised from organic material (including synthetic polymers such as PET or UHMWPE), metal, whether braided, single strand cable, multi-strand cable, woven, or flattened, including sutures.

FIGS. 1A, 1B, 1C, and 1D show one application of an anchor assembly according to the various embodiments disclosed herein. These figures show a particular anchoring assembly 10 placed in three different locations on a spine. Going from left to right on these figures, it can be seen that a first anchoring assembly 10c is placed near a second, substantially identical anchoring assembly 10b, which in turn is located proximate to a third substantially identical anchoring assembly 10a. As will be explained in the paragraphs to follow, the tether 4c and end connector 90c of anchor 10c are coupled to the body 31b of the adjacent anchor. In similar fashion, the tether 4b and end connector 90b of anchor 10b are coupled to the 31a of anchor 10a.

Figure 2:
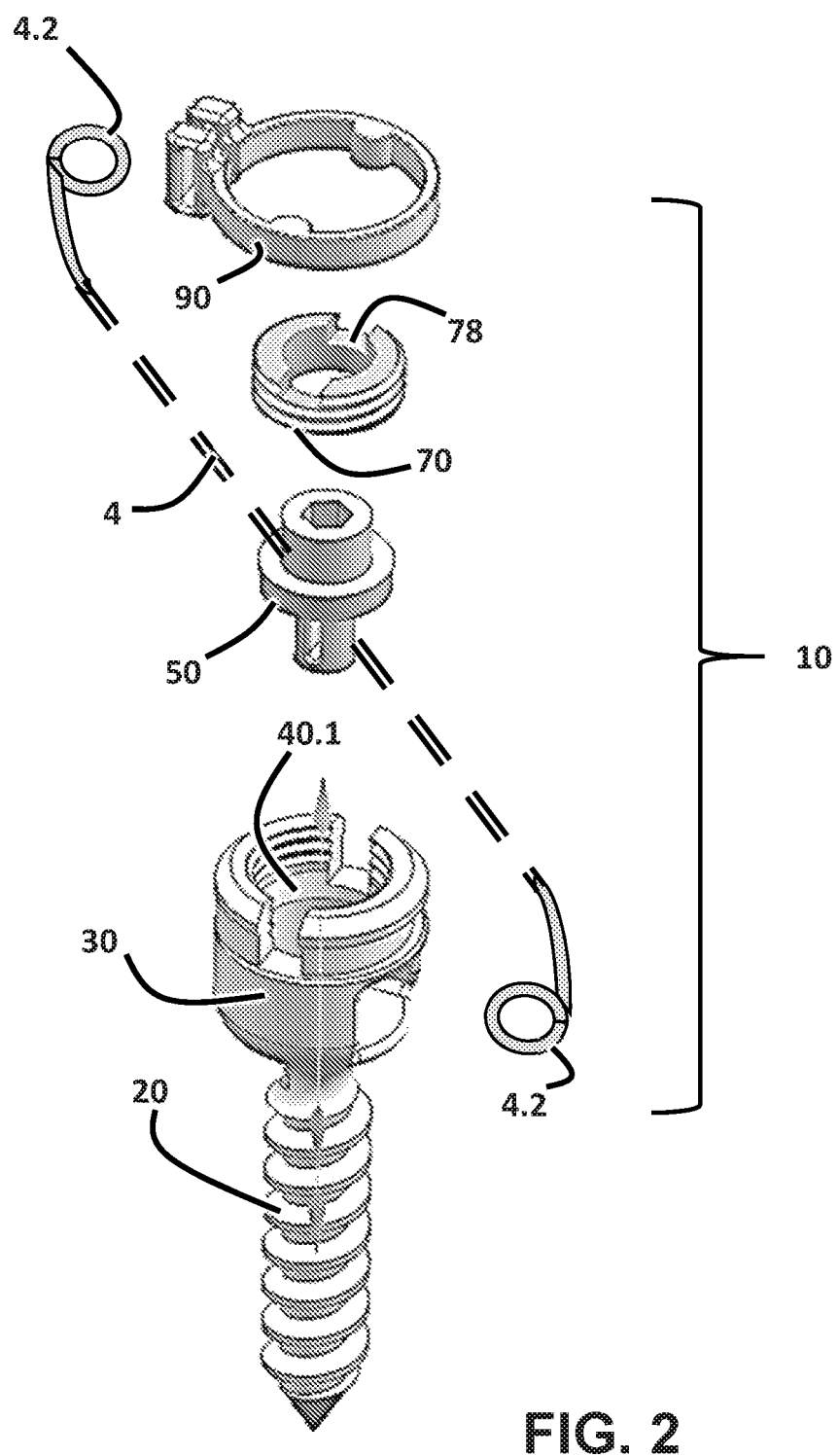
FIG. 2 is an exploded view of a single anchor of FIG. 1D.

The tethered anchoring assemblies shown herein can be used in a variety of different applications. With respect to spinal applications, in one application anchors are placed on adjacent vertebrae and the tension is adjusted as desired by the surgeon, and locked by the surgeon into the anchors. In other applications the anchors can be placed on different vertebrae that are not adjacent to one another. In some applications two (2) anchors are adjusted and locked as a single pair, whereas in other embodiments three or more anchors can be attached in series FIG. 2 shows an exploded view of a representative anchor 10 according to one embodiment of the present invention. Anchoring assembly 10 comprises a bone connection member 20 coupled to a head assembly 30. Head assembly 30 includes a bore 31.2 that receives a spool 50, outermost locking member 70, and a tether end connector 90.

Anchor 10 further includes a predetermined length of flexible connection that is preferably pre-wound around spool 50 and further, preferably pre-attached to end connector 90. In FIG. 2 this section of flexible connector is shown expanded, and not attached to either the spool or end connector. Preferably, the anchors shown herein are provided to a surgeon with a ready wound quantity of tether that is: (a) coupled to spool 60, whether through aperture 62 or through other means; (b) pre-wound around post 60; and (c) having an outer end attached to an end connector that is installed on the head of the anchor. In the various views to follow of the various embodiments, this pre-wound, pre-attached quantity of tether is omitted from the figures for purposes of clarifying other internal structure of the anchors.

As can be seen in FIGS. 2-9, in one embodiment the bone connection member 20 comprises a shank 22 having a plurality of threads 22.3 extending generally from a tip 22.2 to an upper shoulder 22.1. The type of threads placed on the shank can be of any type, and what will be shown herein are cortical threads, cancellous threads and combinations of cortical threads and cancellous threads. However, it is understood that the anchoring assemblies shown herein contemplate any type of connection between the head assembly 30 and the bone, including, as one example, platforms that include multiple spikes that are adapted and configured to penetrate into the cortex of the bone, and are not limited to the threaded shanks shown herein.

Figure 8:
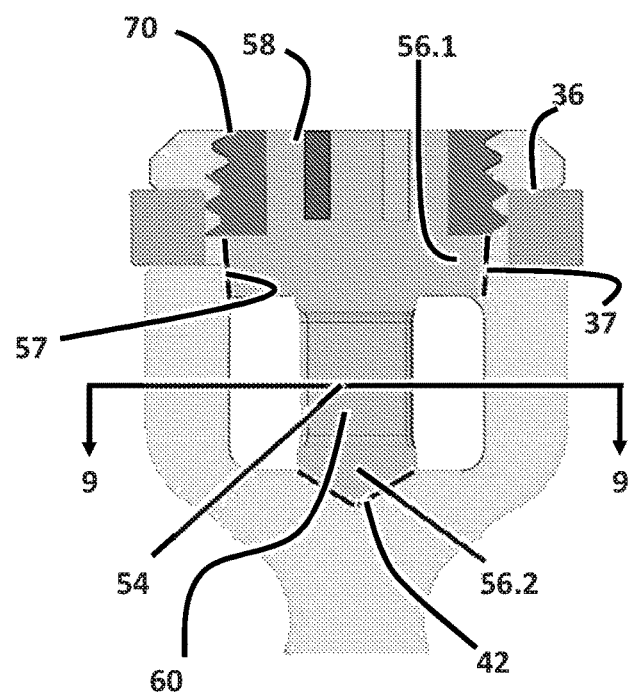
FIG. 8 is a cross sectional view of the apparatus of FIG. 7 as taken along line 8-8 of FIG. 7.

Head assembly 30 comprises a body 31 that includes a cavity or bore 31.2. Referring to FIG. 8, it can be seen that this interior cavity of body 31 includes a spool pocket 40 including an inner spool interface 42 and an upper spool interface 44. These two interfaces serve to provide stable rotation of the spool 50 within body 31, and further can assist in the securement (by friction, locking grooves, or otherwise) between spool 50 and body 31.

FIG. 8 shows the spool 50 received within the spool pocket 40. Spool 50 includes an upper head interface feature 56.1 and lower head interface feature 56.1 (best seen on FIG. 2) that are received within the respective spool interfaces 44 and 42. However, in head assembly 30, these spool-head interfaces further serve to provide frictional locking between the spool and the head. It can be seen that both the upper and lower spool interfaces include tapering features that provide for increased friction as the spool 50 is pushed toward and into the pocket 31.2 by set screw 70. At the upper interface, there is an included conical angle that converges in the direction of the bottom (distal end) of bore 31.2 and which provides increasing friction between the inner conical shape and the outer conical shape. Likewise, the bottom interface features 57 and 37 are characterized with conical angles that converge at a point at the bottom of pocket 40.

Body 31 further includes a threaded bore 33 that is adapted and configured to receive a threaded fastener 70, such as the set screw shown in these figures. Referring again to FIG. 2 and FIG. 3, it can be seen set screw 70 includes a feature 78 such as a groove that is adapted and configured to couple with a tightening tool for threaded coupling of body 31 and locking member 70.

Figure 9:
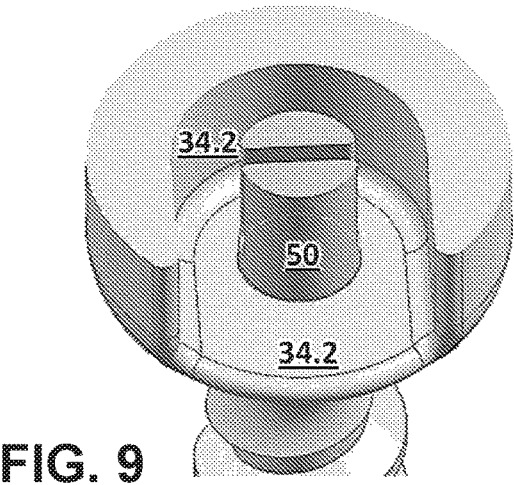
FIG. 9 is a cross sectional view of the apparatus of FIG. 8 as taken along line 9-9.

As previously discussed, spool 50 is received within a pocket 40 of head 31, such that spool 50 in its free state is able to rotate about an axis 50.1. This rotation can be performed manually by way of a tool coupling feature 58, such as an interior hex drive. Located between the upper head interface 56.1 and the lower head interface 56.2, spool 50 includes a winding post 60 that is adapted and configured to couple to a flexible connection member. It is understood that this coupling can be of a variety of types, depending upon the characteristics of the flexible member and the intended usage of the anchor. As shown in FIGS. 8 and 9, it can be seen that winding post 60 includes a through slot 62 adapted and configured to receive therein a flexible assembly such as a fabric tether that has a flattened cross sectional shape. However, all of the anchors shown herein can be adapted and configured to connect to any type of flexible member, and either at an end or midway along the length in any suitable manner.

Figures 10A, 10B:
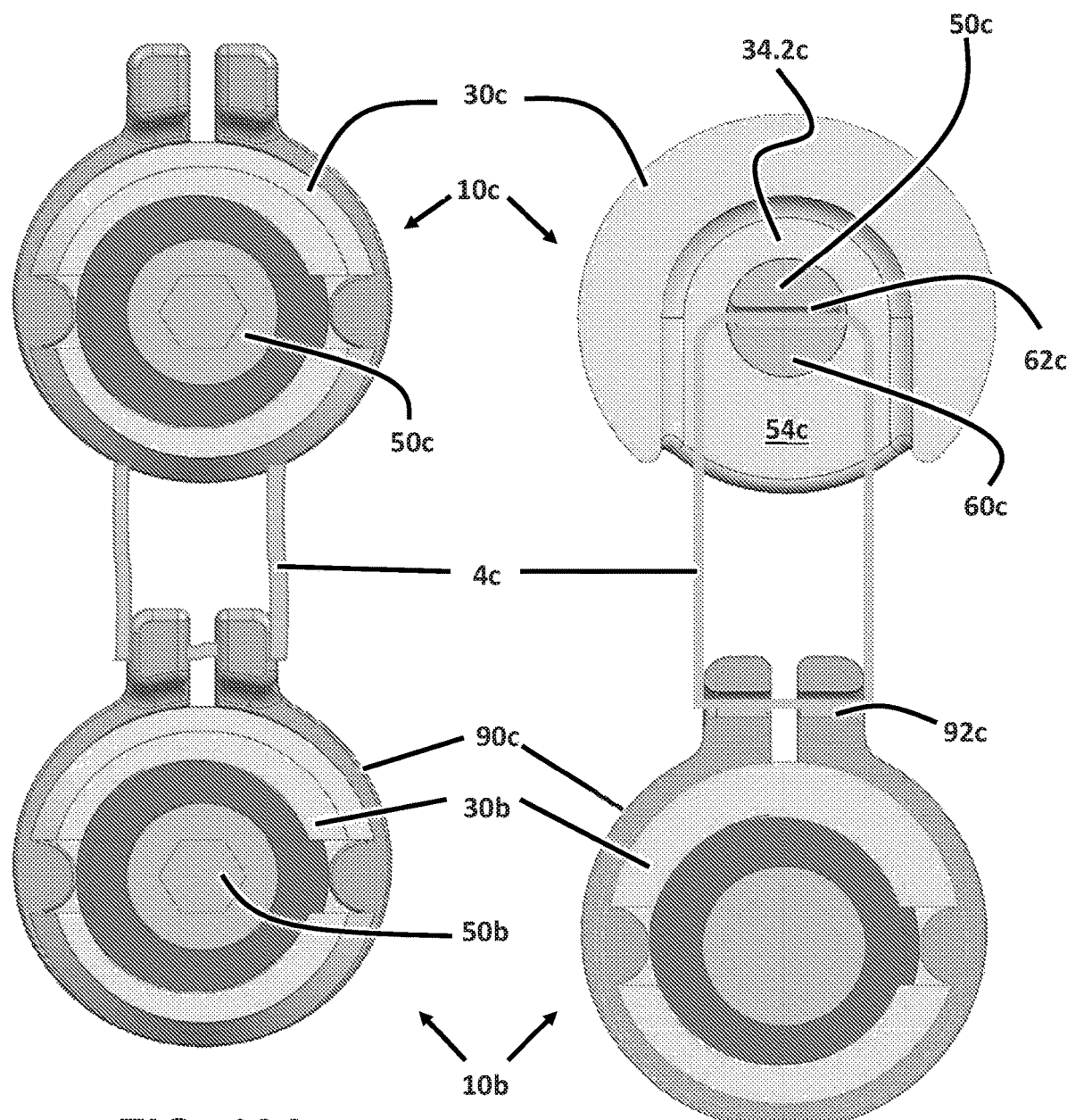
FIG. 10A is a top plan view of a pair of anchors interconnected to one another.
FIG. 10B is a cross sectional view of the apparatus of FIG. 10A in a plane passing through the aperture 62c of post 60c.

Referring to FIGS. 9 and 10B, it can be seen that spool 50 includes a winding post 60 and aperture 62 adapted and configured to receive a portion of a loop of tether. Further, this post to tether connection is provided within a blind tether passageway 34.2 of body 31. It can be seen that there is an opening for passage of the flexible member out of the tether passageway on one side of head 31. As best seen in FIG. 10B, it is recognized that the opening of blind passageway 34.2 will be directed substantially toward the adjacent anchoring assembly when the surgical implantation is performed. However, it is understood that the various anchors shown herein can be provided with blind (single sided) passageways, and through (two sided) passageways. Further, although in some embodiments the two sides of a through passageway are shown on substantially opposite sides of the head, yet other embodiments contemplate through passageways that define an included angle that is less than one-hundred and eighty degrees.

In one embodiment, the anchoring assembly 10 (or any of the other anchoring assemblies X10 shown herein) ae provided with a predetermined length of tether X4 pre-wound on the spool X50, and already connected to the end connector X90. In one application, a pair of tethering anchor assemblies 10 are placed on different vertebrae (which may or may not be adjacent), and anchored to their respective vertebrae by means of connection member X10. An end connector X90 is then removed from one of the anchor assemblies, and if there is no intention to connect it to yet a third anchoring assembly, then the tether can be cut and the loose tether segment and end connector can be discarded. The end connector and tether from the other anchored assembly can then be unwound from that anchor, and coupled to the first anchor, from which the end connector has been discarded. The two anchor assemblies are now connected by a loose piece of tether. The surgeon can then unlock and wind the spool of the second anchor until the appropriate amount of tension is achieved in the tether. Once this is accomplished, the means for locking is employed to lock in the amount of tension between the two anchoring assemblies.

Referring first to FIGS. 10A and 10B, it can be seen that the tether 4c of anchor 10c is looped through aperture 62c, and further has a looping connection with the tether end connector 90. Tether end connector 90 has some of the characteristics of a split locking ring. Tethering connector 90 includes a substantially circular body with two adjacent and opposing ends 91 defining a split in the ring. It can be seen that each of the opposing ends includes a tool coupling feature 98 that is adapted and configured to couple to a tool (similar to pliers that expand a split ring connector).

Figure 6:
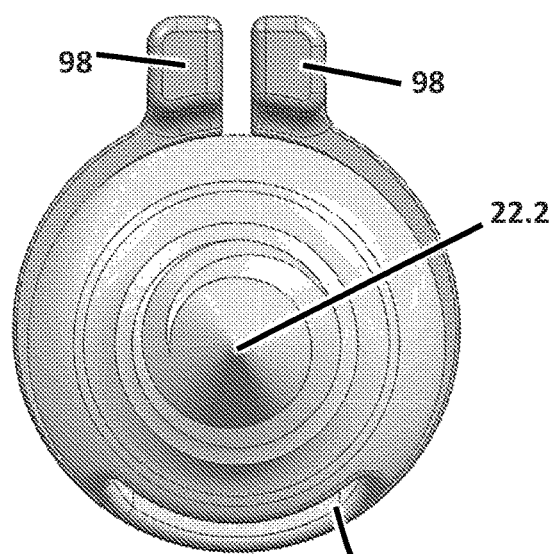
FIG. 6 is a bottom end view of the assembled apparatus of FIG. 2.
Figure 7:
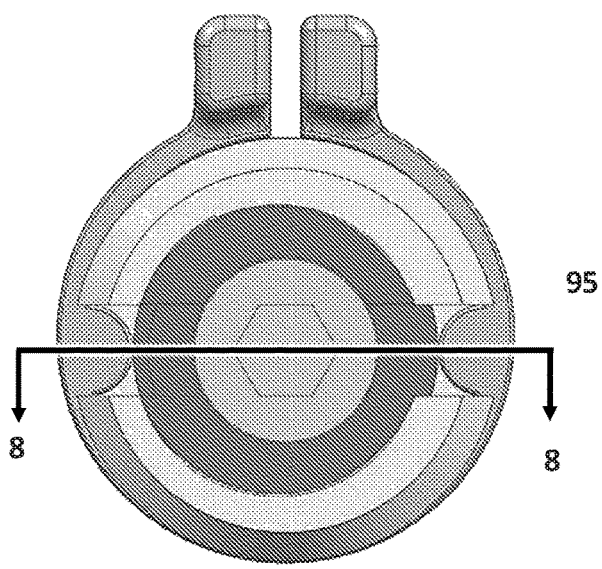
FIG. 7 is a top plan view of the assembled apparatus of FIG. 2.

As seen in FIGS. 6 and 7, the split ends 91 and tool coupling features 98 are separated by a predetermined distance when installed within groove 36 of head 31. In this particular embodiment, tether end connector 90 is adapted and configured to be in compression with groove 36, and establishing friction in that interface that will resist the rotational movement of ring 90 relative to body 31. However, the various embodiment shown herein contemplate other types of expanding, split locking rings, including those rings that are adapted and configured to be loosely captured within the corresponding groove of the head, and further including those rings in which the two split ends 91 are in contact when the ring 90 is received within the groove 36 of the adjacent head. Still further embodiments contemplate the use of compressible, split locking rings, such as those in which separated split ends are brought together by a tool so as to pull the outer diameter of the ring from an inner groove in the head. It is further understood that such compressible, split locking rings can be loosely captured within the corresponding groove, expanded into tight frictional contact with a groove, or adapted and configured for any desired degree of looseness.

The split ends 91 further include a tether connection feature 92 best seen in FIGS. 3, 4, and 10B. It can be seen that each end 91 includes a through aperture 92 that is adapted and configured to receive a loop of tether. The tether connection features 92 are depicted as elongated slots, adapted and configured for receiving a flexible connection member having a flattened cross section. However, it is contemplated that a loop of flexible member (or in some embodiments an end of flexible member) can be connected to end connector 90 in any manner. Further, although what is shown and described is a loop of tether that passes through both apertures 92, it is also contemplated that in still further embodiments the loop may attach to only one of the apertures.

Referring to FIGS. 2, 3, and 7, in some embodiments a split ring end connector 90 includes one or more anti-rotation features 95. It can be seen that when end connector 90 is fully nested within groove 36, that a pair of rotation resistance features 95 are located within the tool coupling slots 38 of head 31. These tool coupling slots have a shape that receives the protrusions 95, such that tether end connector 90 cannot be rotated relative to body 31 when installed. These slots 38 are further used for coupling to a tool, such as a screw driver, for driving anchor 10 into the bone. Although this tool coupling slot 38 is shown providing both tool coupling and rotation resistance, yet other embodiments of the present invention are not so constrained and the resistance to rotation of the end connector 90 relative to body 31 can be provided in any manner. Still further, the configuration of resistance rotation feature 95 within slot 38 is shown to provide minimal possible rotation, in yet other embodiments the two rotation features may couple together to provide a limited degree of relative rotation, especially in those embodiments where the compressive characteristics of end connector 90 within groove 36 is minimized to provide minimal or no frictional coupling. In yet other embodiments, there are no features of the end connector 90 that resists rotation, such that the angular location of the tensed tether can vary if required after surgery.

Referring to FIGS. 1C and 4, it can be seen that the aperture 92 has a location and angular orientation compared to slot 62 such that the tether 4 connecting adjacent anchors is slightly angled upward as it exits the passageway 34.2 and transitions to the slot 92 (one connected to the adjacent anchor). As shown in FIG. 4, the slot 92 is oriented relatively parallel to the spool rotational axis 50.1. However, in yet other embodiments the slots 92 are nonparallel and angled downward slightly relative to rotational axis 50.1, such that a more uniform degree of tension is achieved in the tether.

Figure 11:
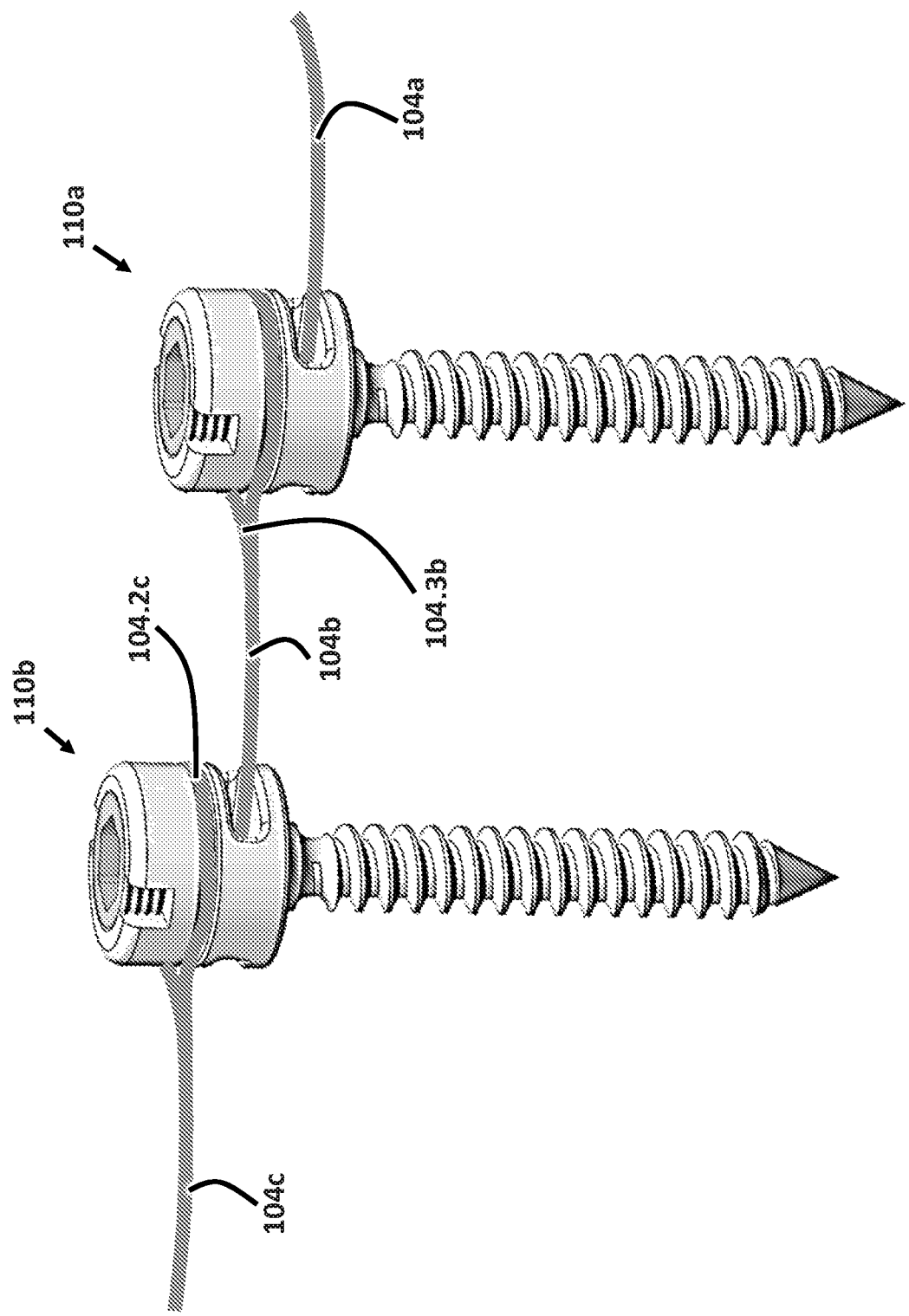
FIG. 11 is a side, top perspective representation of a pair of interconnected anchors according to another embodiment of the present invention.

FIGS. 11-16 show an anchoring assembly 110 according to yet another embodiment of the present invention. Referring to FIG. 11, it can be seen that one application of anchor assembly 110 is with regards to providing a tethered connection between adjacent anchors 110b and 110a. A tether 104b from an anchor 110b is looped around the head of an adjacent anchor 110a. The tether 104b is connected at one end to a winding post 160b, and the other end includes a loop 104.2b, which can be accomplished by making a junction 104.3b between an end of tether 104b and a midpoint along the tether. This loop 104.2b is then placed in a groove 132a of the adjacent anchor, looping around the entire head 130a.

FIGS. 12-16 show various features of anchoring assembly 110. Assembly 110 includes a head assembly 130 that is preferably fixedly coupled to a bone connection member 120. In some embodiments, bone connection member 120 includes a shank 122 including a plurality of threads 122.3. However, various other embodiments of the invention are not so limited, and contemplate any manner of fixedly securing a head assembly to bone.

Figures 15, 16:
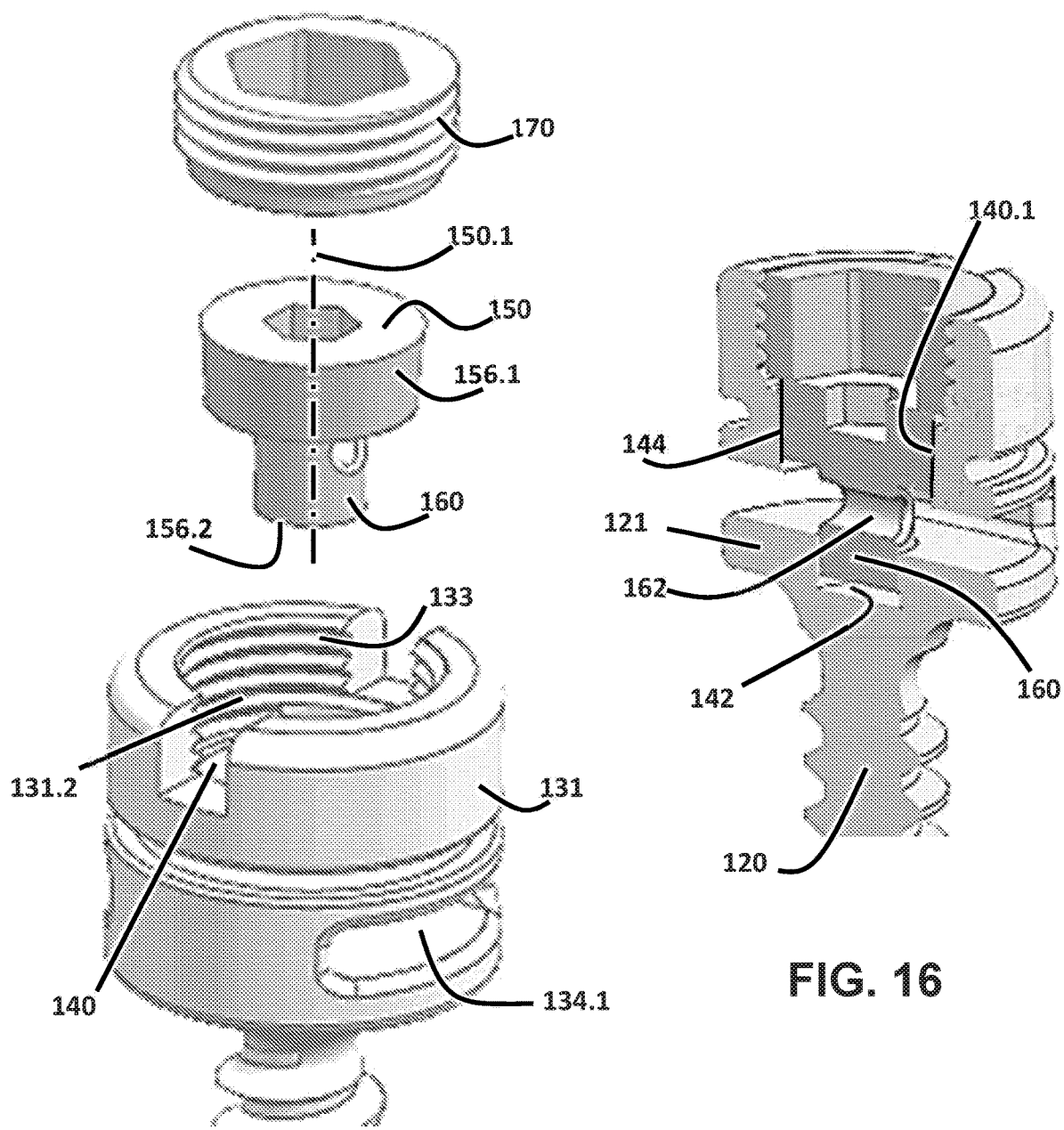
FIG. 15 is a side, top perspective exploded representation of a portion of the anchor of FIG. 12.
FIG. 16 is a side, top, perspective view of a cutaway of a portion of FIG. 12 as taken along line 16-16 of FIG. 14.

Referring to FIGS. 15 and 16, it can be seen that head assembly 130 includes a body 131 defining a cavity or bore 131.2 that receives therein a rotatable spool 150 in a pocket 140 and locking member 170 is received in threads 133. Spool 150 preferably includes upper and lower head interfaces 156.1 and 156.2, respectively. As best seen in FIG. 16, the upper head interface 156.1 is generally cylindrical and is received within a corresponding cylindrical upper spool interface 144. Lower head interface 156.2 is preferably cylindrical, and fits within a blind pocket 142 located either in the bottom of body 131 or the top platform 121 of bone connection member 120. Spool 150 is a slip fit within body 131, and preferably able to rotate freely within body 131 when locking member 170 is not compressing the spool into the head.

It can be seen that spool 150 further includes a winding post 160 extending between the upper and lower interfaces 156.1 and 156.2. Winding post 160 preferably includes a through aperture 162 for coupling to an end of a flexible member, or for providing passage therethrough of a flexible member. In the embodiment shown in FIG. 11, the end of the flexible member is coupled to post 160 through aperture 162, such as by a loop, a knot, crimped connector or other means.

In one embodiment, head 131 includes a threaded bore 131.2 that threadably receives a locking member 170. As best seen in FIG. 16, the installation of locking member 170 axially traps spool 150 within the pocket 140 of head 131. Preferably locking member 170 can be tightened to where the lower head interface 156.2 comes into frictional contact with inner spool interface 142, with this friction being sufficient to resist rotation of spool 150. In still further such applications, the aperture 162 can be pushed downward such that the flexible member passing therethrough is captured in compression between the top of the aperture 162 and the bottom floor of through passage 134.1. In some embodiments, head 131 includes a through passage 134.1 as shown, which permits the flexible member coupled to winding post 160 to extend out of the passageway (as shown in FIG. 11), and which further permits the passage therethrough of yet other tethers from other anchors to pass therethrough, such that head 130 secures one flexible member in tension, and provides a through passageway for a different flexible member 104.

FIGS. 17-20 show different aspects of a tethering anchoring assembly 210 according to another embodiment of the present invention. Anchor assembly 210 has an internal structure similar to that of anchor 110, but uses an additional locking member. Anchor 210 includes a bone connection member 220 that is preferably fixedly coupled to a head assembly 230. Head assembly 230 includes a body 231 that defines a spool pocket 240 that receives a spool 250, an intermediate locking member 280, and an outer locking member 270. Although anchor assembly 210 does not show an end connector such as any of the end connectors 90, 190, 490, 590 or 690, it is understood that in various other embodiments such a separable tether end connector X90 is provided.

Referring to FIG. 21, it can be seen that the upper and lower spool interfaces 244 and 242, respectively, provide contact and stability to the spool 250 by the respective head interfaces 256.1 and 256.2, respectively. The upper spool interface is between the cylindrical inner diameter 244 of head 231, and the cylindrical outer diameter 256.1, and the lower interface includes a cylindrical lower projection 256.2 that is received within cylindrical pocket 242. Note that the distal end of spool 250 bottoms within the pocket 242, with the corresponding surfaces being in contact. It is against this bottom pocket that the compressive forces of the locking mechanism 270 are reacted.

The top surface of spool 250 includes a plurality of contacting features 257 that are adapted and configured to interlock with a plurality of locking features 287 on the underside interface of intermediate locking member 280. These two interfaces are shown separated in FIG. 20, and shown in interlocking contact in FIGS. 17 and 18. Similar to the other embodiment described herein, winding post 260 preferably includes means 262 for connecting to a tether, such as a through aperture or blind aperture.

During implantation, the outer locking member 270 is retracted relative to the top surface of intermediate locking member 280. Therefore, locking member 280 is loose, but constrained within the vertical gap between the top surface of the spool and the bottom surface of the locking member 270. Yet a further constraint on a motion of locking member 280 is provided by a pair of rotation resistance features 285 such as the short arms shown in the figures. These rotation resistance features couple with an anti-rotation feature 235 located in the head 231. As shown in FIG. 21, this anti-rotation feature 235 is a slot that extends from the top of head 230 to a location just past the top surface 257 of the installed spool 250.

When the intermediate locking member 280 is axially loose in this manner, the surgeon can rotate spool 250 within the spool pocket 240 freely. When the desired amount of tension in the elastic connecting member is achieved, the surgeon uses a tightening tool within tool coupling feature 278 to tighten outer locking member 270 and move it into compression against intermediate locking member 280. In so doing, the interlocking features 287 of the bottom surface interlock with the corresponding features 257 of the top surface. This interlocking between the two components is of an interference type. Friction is not required to maintain the angular orientation of spool 250. Instead, the features of the contacting surfaces 257 and 287 interfere with one another if rotation is attempted. Further, it can be appreciated that in those applications using the beveled teeth best seen in FIG. 20, any attempt at relative rotation also results in an axial load to spread apart spool 250 and intermediate member 280. However, the tightened position of locking member 270 prevents such separation, and thus maintains a positive interlock.

Although radially oriented beveled teeth have been shown and described, it is understood that the interlocking features of the top surface of the spool and the under surface of the intermediate locking member can be of any type that provides an interference-type fit. Other examples include combinations of protrusions and recesses, such as rounded bumps that can be received within pockets, posts (round, square, or any cross sectional shape) that can be received within pockets. It is further understood that the protruding shape used on one surface does not need to be complementary in shape to the recess on the other surface, such that a round peg can interlock with a square hole.

FIGS. 22-24 depict an anchoring assembly 310 according to yet another embodiment of the present invention. Anchoring assembly 310 differs from the other anchoring assemblies disclosed herein, in that the spool 350 is preferably captured within a two piece head assembly, and further that the end connectors 390 are optionally provided on each loose end of a tether 304 for placement of anchor assembly 310 between a pair of other anchor assemblies. In such applications, the pair of other anchor assemblies can be of any type that include a provision for connection to an end connector 390.

Referring to FIG. 24, it can be seen that body 331 of head 330 in one embodiment is a cylindrical structure open on opposing ends. A spool 350 is received within the corresponding cavity 331.2, being placed from the underside (distal side) such that the threaded portion 353 of the spool extends out of a bone within cylindrical spool interface 344. With the spool 350 being loosely contained within cavity 331.2, the bottom facing ridge 331.1 of body 331 is placed into contact with a corresponding ridge 321.1 of bone connection member 320. This interface can then be welded, brazed, or adhered together so as to permanently capture spool 350 within cavity 331.2. However, in yet other embodiments, instead of a welded, brazed, or glued interface, yet other embodiments contemplate a threaded coupling between the platform 321 of connection member 320 and body 331, or still further yet by a plurality of radially extending locking pins that penetrate through a sidewall of body 331 into the central cylindrical extension of platform 321.

Referring to FIG. 23, it can be seen that the captured spool 350 resides within a cavity 331.2 that is preferably a through passage 334.1, extending from one side of head 330 to the other side head of 330. Preferably, the opposing entrance slots to passageway 334.1 are located on opposite sides of body 331, and generally aligned with post 360 (as best seen in FIG. 23). Referring to FIG. 22, it can be seen that in some embodiments a length of flexible material extends through the opposing apertures of through passage 334.1, and further through the aperture 362. The end connectors 390 are adapted and configured to fit within a slit, cylindrical pocket on an adjacent anchoring member. Various embodiments of the present invention contemplate any type of end connectors, including any of the end connectors shown herein. In some applications, one or more ends of tether 304 of an anchor 310 may be provided with the end connectors 390 shown, or any of the split ring or dovetail end connectors shown herein, as non-limiting examples. It is appreciated that rotation of the spool 350 will wrap both ends of the flexible member around post 360, thus reducing the total length of the exterior flexible member or if the end connectors 390 are connected to adjacent anchors, increasing the tension.

Referring to FIG. 23, it can be seen that after the surgeon has adjusted the flexible member with the correct amount of tension, the external locking member 370 can be tightened about the threads 353 of spool 350 by using a first tool coupled to tool connection feature 378 to maintain the angular position of spool 350, while using a second tool (not shown) coupled to tool feature 378 to rotate member 370 relative to spool 350. In so doing, the locking member applies compression to the upper surface of the upper head interface 356.1, and the top annular wall of body 331 is squeezed between spool 350 and locking member 370. Friction at this annular interface frictionally retains spool 350 in the desired position.

Figure 25:
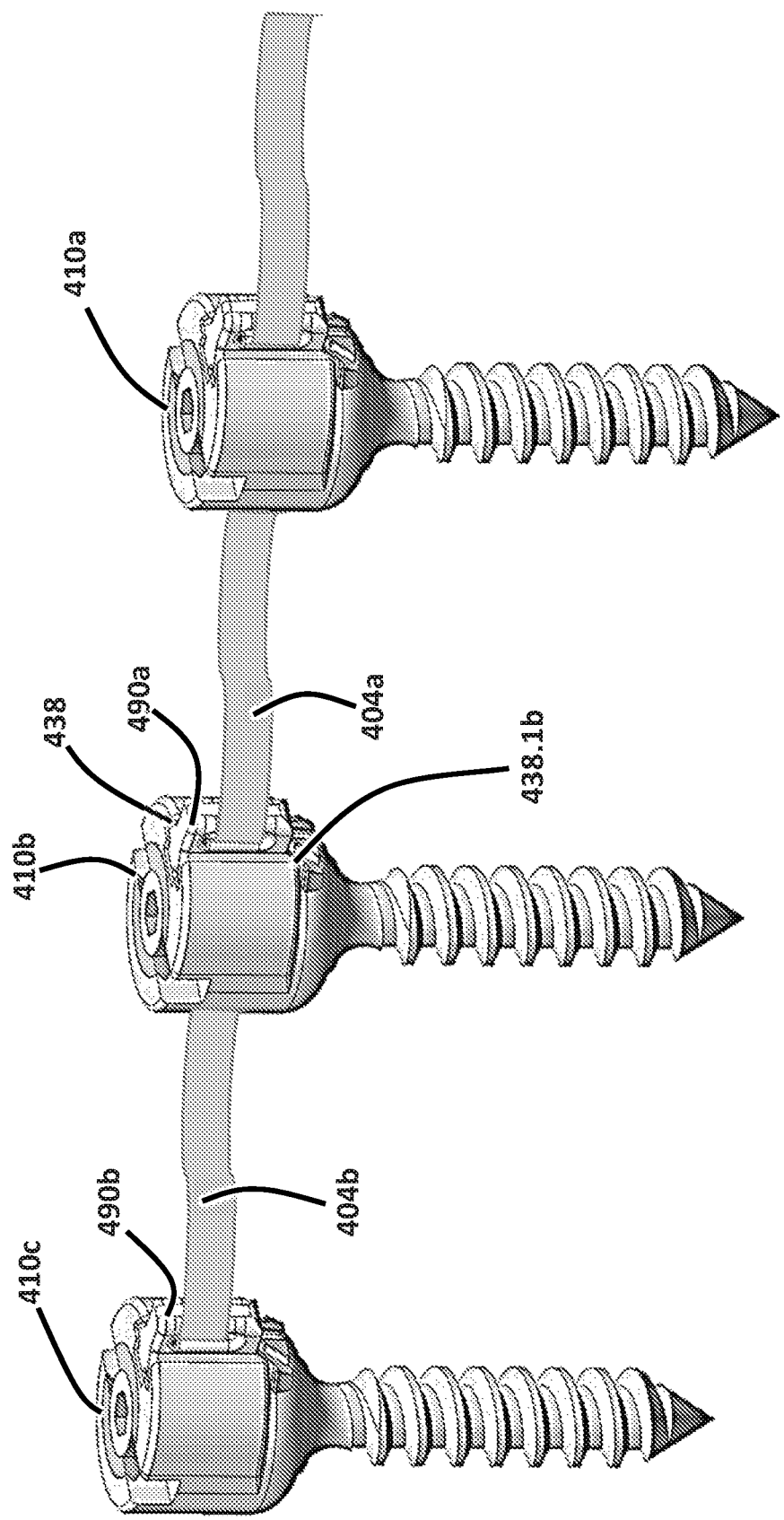
FIG. 25 is a side, top perspective representation of three interconnected tethered anchors according to another embodiment of the present invention.

FIGS. 25-35 show various views of an anchoring assembly 410 according to yet another embodiment of the present invention. Referring to FIG. 25 and similar to FIGS. 1, it can be seen that in one application a plurality of anchoring assemblies 410 are placed next to each other in different vertebrae, and then tethered to one another. The end connector 490*b* and tether 404*b* from central anchor 410*b* are connected by way of a groove 436*c* to the adjacent anchor 410*c*. Likewise, the tether 404*a* of anchor 410*a* is placed in tension with central anchor 410*b* by means of end connector 490*a* received within groove or pocket 436*a*. All of the anchoring assemblies X10 shown herein are useful in the various multi-anchoring concepts shown herein, such as by way of example in FIGS. 1, 10, 11, 25, 34, 35, 43, 45, 59, 65, 66, 68, and 69. It will be understood by those of ordinary skill in the art that the anchoring assemblies X10 shown herein can be used as a central anchor with tethering attachments from a central anchor to adjacent anchors on opposite sides of the central anchor. In some such embodiments, the body of the head may have receptacles on opposing sides, each receiving a connector from the anchor and tether adjacent to that side.

FIG. 31 shows an exploded view of the head assembly 430 of anchor 410. A body 431 includes a cavity 431.2 that contains a spool 450 in a pocket 40. Spool 450 is preferably located in place by tapered upper and lower spool interfaces 444 and 442, respectively. As previously discussed, the tightening of locking member 470 into grooves 333 places spool 450 in compression, such that the tapered interfaces create sufficient friction to retain winding post 460 in the desired angular orientation. In some embodiments, head 430 includes a blind tether passageway 434.2, such that the flexible member 404 is looped around the winding post (as best seen in FIGS. 34 and 35).

Figures 29, 30:
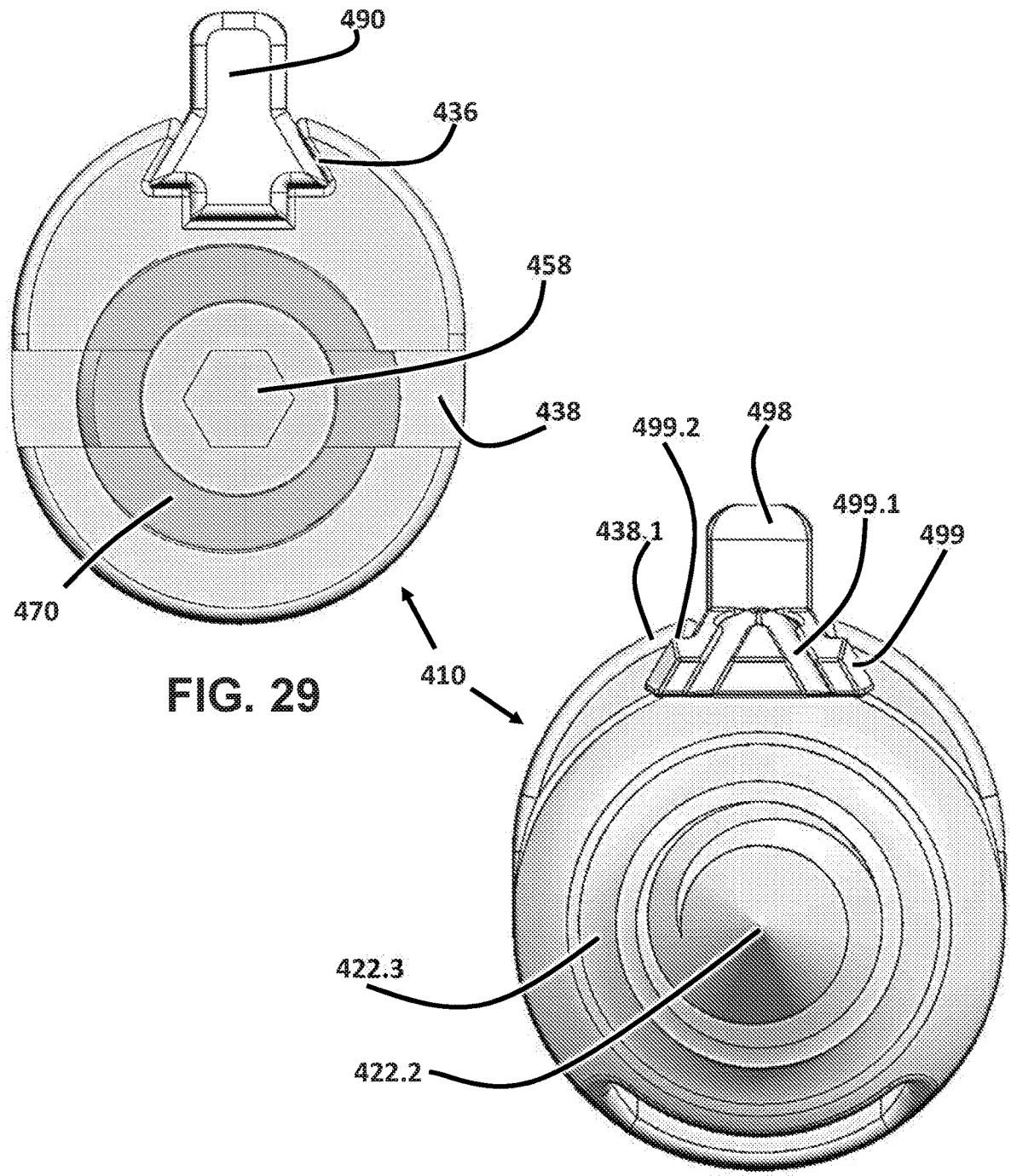
FIG. 29 is a top plan view of the anchor of FIG. 26.
FIG. 30 is a bottom plan view of the assembly of FIG. 26.
Figure 37:
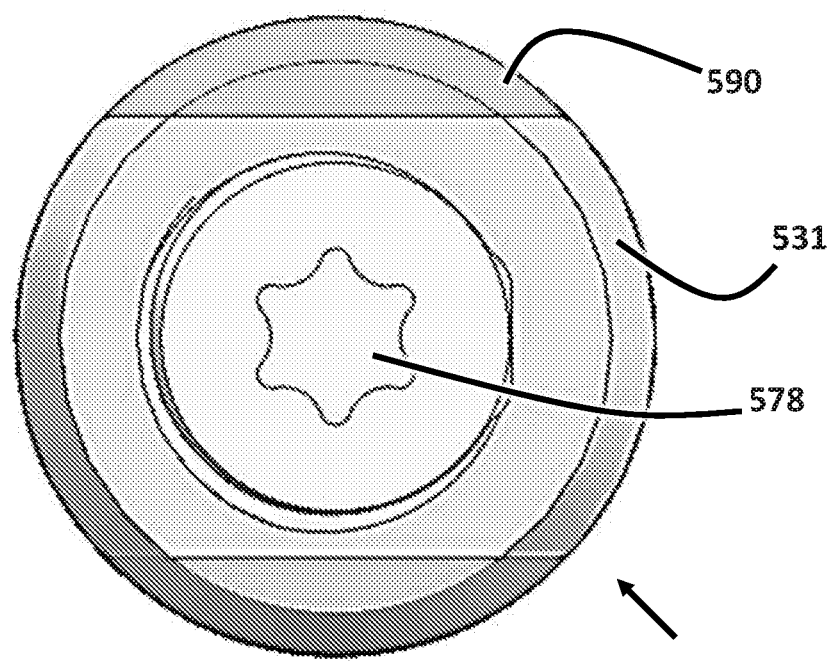
FIG. 37 is a top plan view of the apparatus of FIG. 36A.
Figure 38:
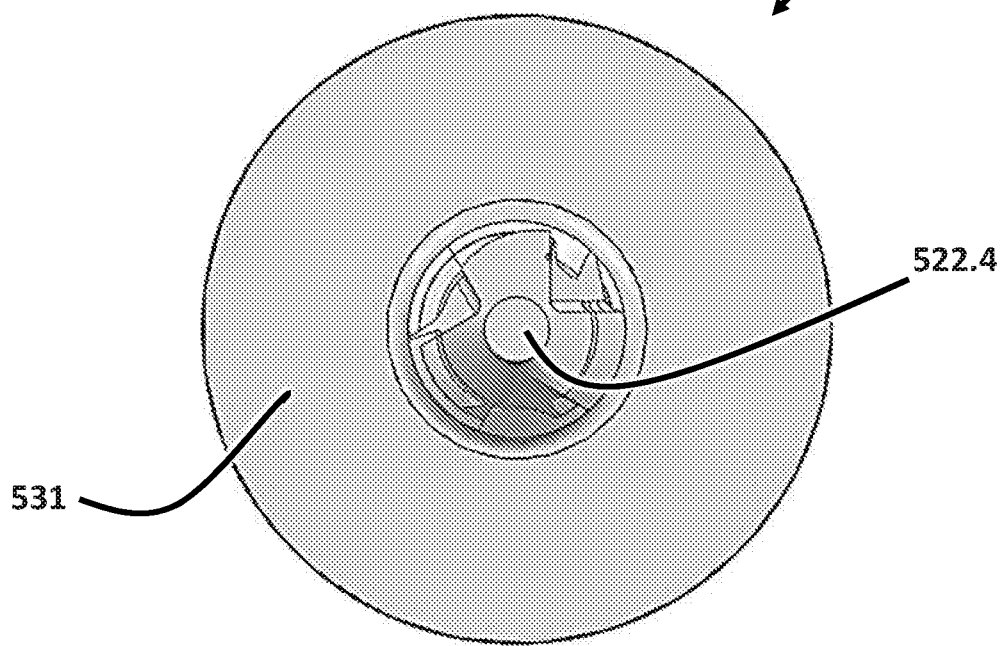
FIG. 38 is a bottom plan view of the apparatus of FIG. 36A.

Referring to FIGS. 26 and 27, it can be seen that anchoring assembly 410 includes a tether end connector 490 that is captured within a slot 436 of the exterior of the body 431 in the configuration that assembly 410 is initially provided to the end user. This slot 436 is shown in FIGS. 29-31 as a longitudinally-oriented slot having, in one embodiment, a dovetail shape. Likewise, the end connector 490 has a complementary dovetail shape for a close fit within slot 436. The longitudinal and angular positions of connector 490 within slot 436 is established by contact of a rotation resistance feature 495 that protrudes from the back surface of connector 490, and is likewise received within a complementary-shaped pocket 436.1 of groove 436. Further, as previously described, a predetermined quantity of flexible connector 404 is attached at one end to one or more apertures 492, and at the other end to aperture 462. This tether 404 is not shown for purposes of clarity and simplicity.

Yet a further interconnection between end connector 490 and body 431 is achieved by way of connecting clips 499 at the bottom of end connector 490 (best seen in FIG. 33). Each of these clips 499 are laterally flexible and can be elastically bent toward each other to provide a temporarily reduced width for sliding within the groove 436. This lateral flexibility is achieved by the use of slots 499.1. Because of the material removed by these slots, each of the clips 499 are able to bend inward (i.e., toward the longitudinal central plane of connector 490) during installation. As the bottom of a connector 490 is placed within the top of a pocket 436, the downward forcing by the user of the end connector 490 into the slot 436 results in the outermost angled surfaces 499.2 of the connectors creating an inward load that elastically moves each of the lateral connectors inward. In still further embodiments, the end connector X90 and body X31 can be achieved by adding tapered or dovetail shapes, as shown in FIGS. 58D and 58H.

The surgeon continues to move the connector 490 downward with these angled surfaces maintaining the outward edges of the clip within the slot. However, once the connector 490 bottoms out within the slot (because of the contact of protrusion 495 with pocket 436.1), the two end connectors 499 are no longer maintained within the slot, and are free to elastically spring outward to their free state. In so doing, the shoulders 499.2 locate themselves underneath a bottom facing connector clip shoulder 436.2 of body 431 (as best seen in FIGS. 26 and 30). In any attempt to remove connector 490, the connector clip shoulders 499.2 will abut against the interfering clip shoulder 436.2 of body 431, thus preventing removal. Each of these connector clips in conjunction with other features of 490 provide an interface for a tool (not shown) that will inwardly compress the clips 499 in order to allow upward movement of the connector 490 within groove 436 for purposes of removing the connection between the adjacent implanted anchors (or for initially removing the end connector from its home anchor in the condition as first provided to the surgeon).

FIGS. 34 and 35 shown connections between adjacent anchors 410. In FIG. 34, it can be seen that the tether 404b includes loops 404.2b at either end. One end of tether 404b is looped around post 460, and through aperture 462. The other looping end of tether 404b passes through the tether aperture 492 of end connector 490. As shown in FIG. 34, the tether 404b has been unwound from post 460, and connector 490b has been moved from its home in slot 436b into the slot 436a of the adjacent anchor 410a.

FIG. 35 shows an alternate connection, in which tether 404b* includes a loop 404.2b* wrapping around the winding post, with the free end 404.1b being threaded through the aperture 492b*, and being in connection with another feature of anchor 410b*, so as to create a connection in tension. It is understood that the end 404.1b* can be connected to anchor 410b* in any manner, including as one example a crimped connector or a connector similar to connector 390. Still further examples of looping constructions are shown in FIG. 59

FIGS. 36-44 show an anchoring assembly 510 according to yet another embodiment of the present invention. Anchoring assembly 510 includes a bone connection member 520 that incorporates both cortical and cancellous threads 522.3. Still further, the connection member 510 preferably includes a cannula 522.4 extending from tip 522.2 through the shank, through the bone connector platform 521, and into the bottom of the open tether passageway 534.1.

Figure 40:
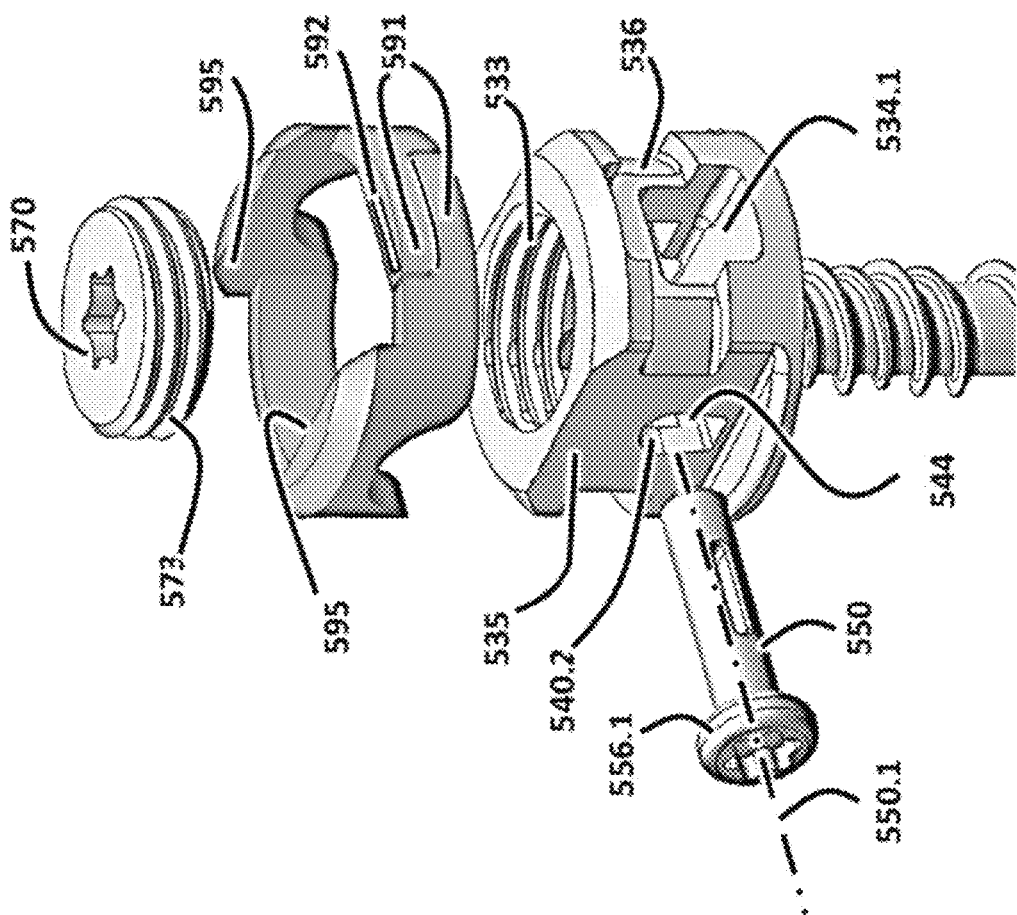
FIG. 40 is a side, top, perspective exploded view of the apparatus of FIG. 39.

Referring to FIG. 40, it can be seen that anchoring assembly 510 includes a head assembly 530 comprising a body 531, post 550, outer locking member 570, and a tether end connector 590. In contrast to other embodiments disclosed herein, spool 550 is received within a horizontal spool receiving pocket 540.2, and rotates about a horizontal axis 550.1. It is understood that the term horizontal refers to a perpendicular orientation relative to the bone connector longitudinal axis.

Figure 42:
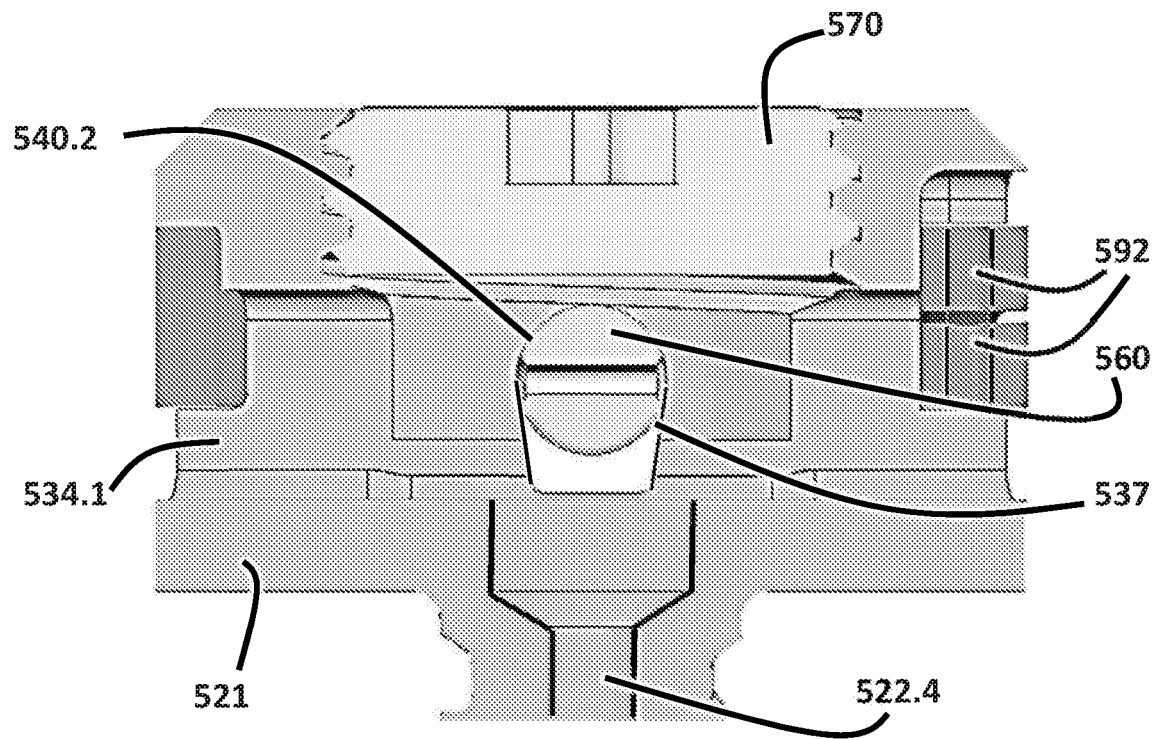
FIG. 42 is a view of the apparatus of FIG. 41 as viewed perpendicular to the cross sectional face of FIG. 41.

Referring to FIG. 42, it can be seen that winding post 560 is received within a spool receiving pocket 540.2 that includes a substantially circular shape at the top, but at the lateral sides of the circle tapers to a more narrowed width. Preferably, this downward tapering configuration is used for both the first spool interface 544 (which also includes a flattened surface perpendicular to the axis for receiving the underside of the enlarged head 556.1 of the spool), as well as for the second spool interface 542 that receives the second head interface 556.2. Referring again to FIG. 42, it can be seen that when locking member 570 is tightened, that the bottom of the locking member pushes against the top midsection of spool 560, and pushes the spool into the tapered pocket. In a manner similar to that previously described, this pushing of the spool into a tapered pocket provides frictional coupling sufficient to lock the angular rotation of the spool after the surgeon has established the correct tension in the tether.

Figure 41:
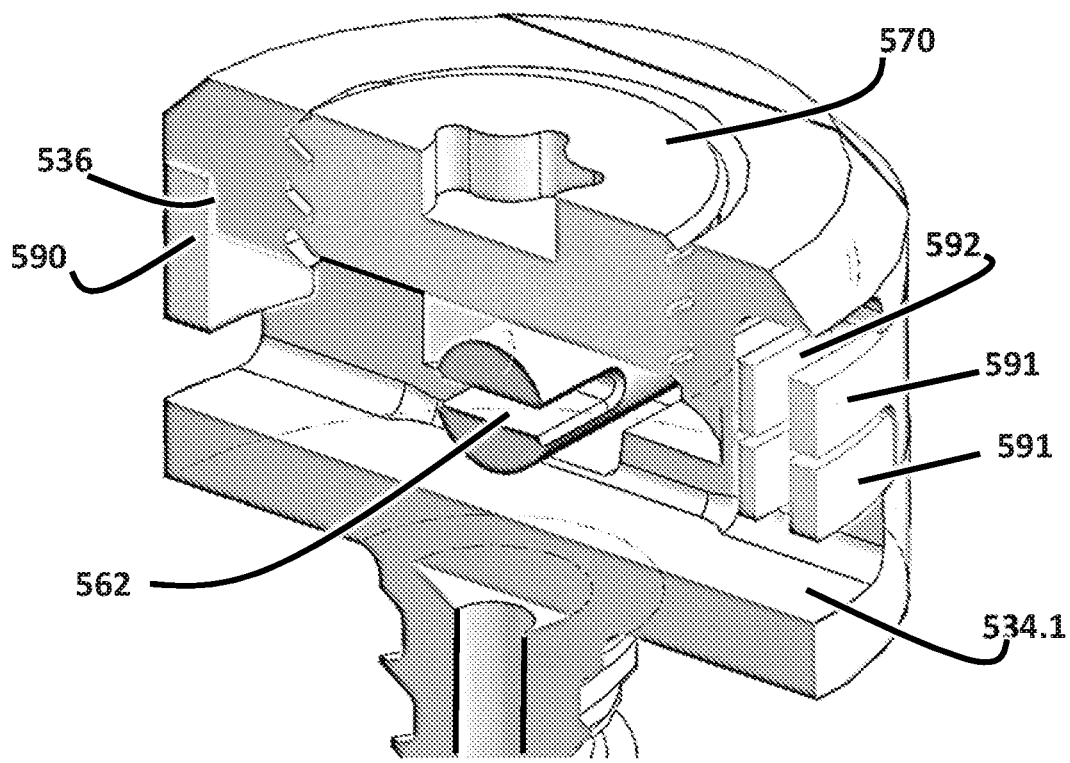
FIG. 41 is a cross sectional view of the apparatus of FIG. 39 as taken along line 41-41 of FIG. 39.

Referring to FIGS. 40, 41, and 42, it can be seen that end connector 590 is a split-ring type of connector, in which the ring is biased to either a larger or smaller diameter, but can be opened with a tool to the other of the smaller or larger diameters. As shown with end connector 590, the ring is biased to a closed position, in which the inner diameter of the ring is of a first, smaller diameter, and which can be opened with a tool (not shown) such that the inner diameter is enlarged sufficiently to slip over the proximal edges of groove 536.

Figure 39:
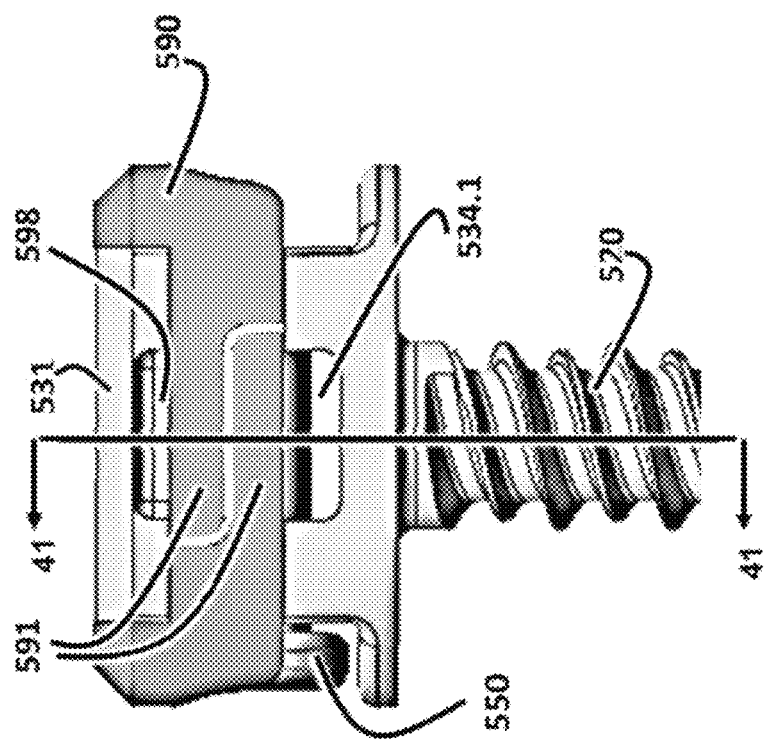
FIG. 39 is a side elevational view of a portion of the apparatus of FIG. 36A.

Referring to FIG. 39, the two overlapping split ends 591 of ring 590 are accessible to a tool (not shown) by way of a tool coupling recess 598 and an opening of tether passage 534.1. The tool would fit into the top and bottom slots 592, and then spread apart this opened end of the ring so that in this expanded state it is able to clear the ledges of groove 536.

Referring to FIG. 40, it can be seen that the body 531 and the end connector 590 cooperate to prevent rotation of a spit ring end connector once it is installed in groove 536. It can be seen that the body includes at least one flattened surface 535 that is in contact with a corresponding flattened surface 595 of ring 590. In the embodiment presented in these figures, it can be seen that there are multiple flattened sides 535 and 595, although it is understood that a single such pair of retention features is sufficient to prevent rotation of the installed end connector. FIG. 36C shows the nesting of the anti-rotation features 535 and 595 cooperating to prevent rotation.

Figure 43:
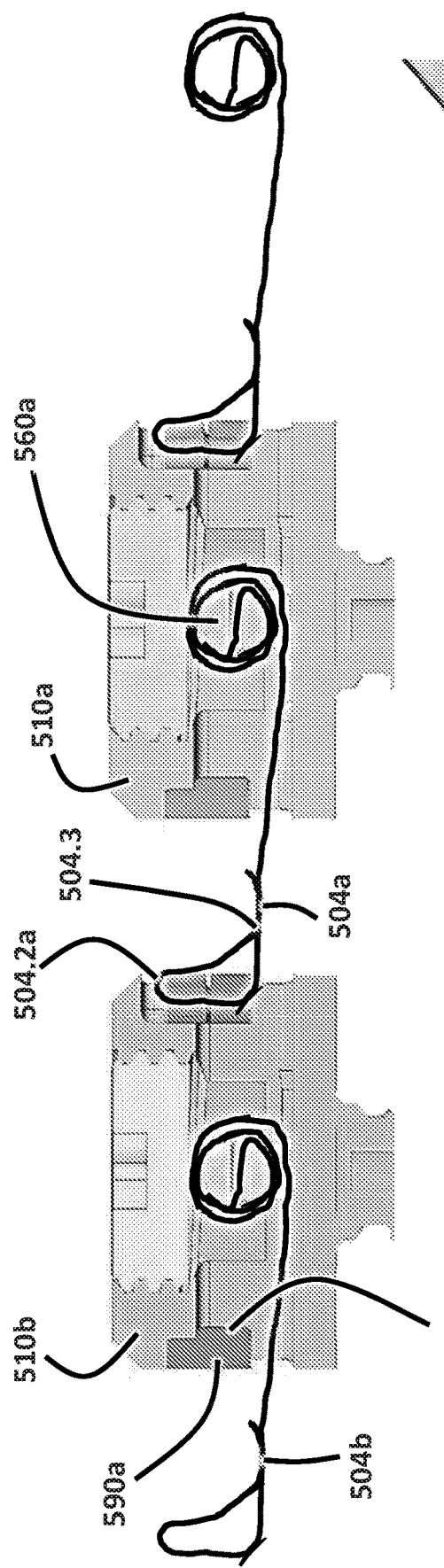
FIG. 43 shows a pair of the anchors shown in FIG. 42 interconnected to one another.
Figure 44:
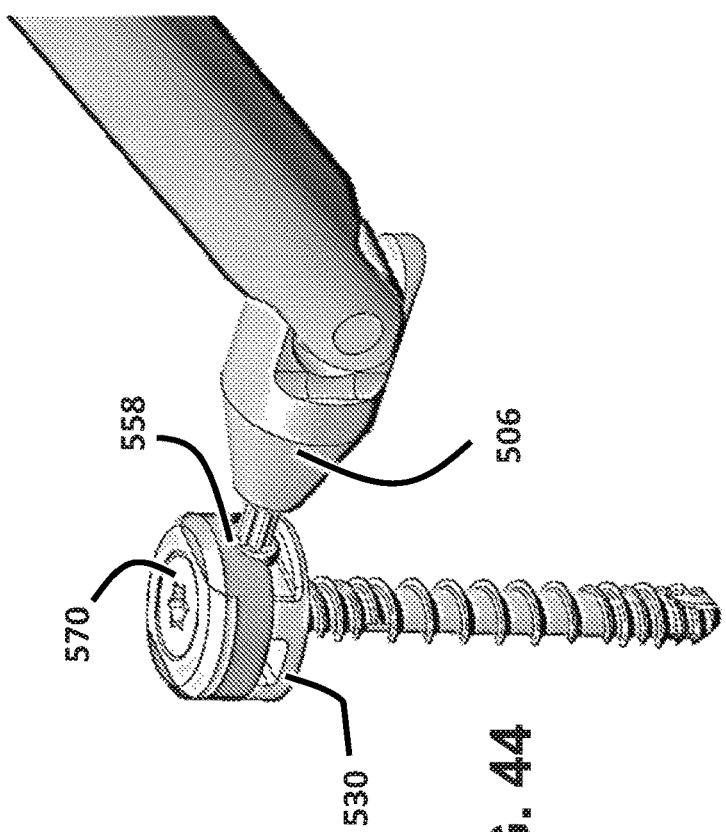
FIG. 44 is a side, top, perspective representation of the anchor of FIG. 36A being adjusted by a tool.

FIGS. 43 and 44 show a pair of adjacent anchors 510a and 510b interconnected by a tether (with still further tether wrapping options being shown in FIG. 59). The ring 590a has been removed from anchor 510a, with tether 504a attached. The ring 590b from attachment anchor 510b has been removed, and is not seen in the figure. Instead, ring 590a has been placed in groove 536b, such that tether 504a now interconnects anchors 510a and 510b. In one embodiment, the tether 504 is wound around the spool 560, with one end of the tether being attached to the winding post 560. The other end of the tether passes through preferably both apertures 592 (one on each of the separate split ends 591). This outer end of the tether 504 can form a junction 504.3 with the remaining portion of the tether, so as to create a loop 504.2 surrounding the tether end connectors. FIG. 44 shows a head 530 for which the surgeon is using tool 506 to rotate the tool coupling feature 558 of spool 550. After the surgeon has created the desired tension between two anchors, the locking screw 570 can be driven into head 531 so as to place spool 550 in compression within the receiving pocket 540, and thereby lock a desired angular orientation of spool 550.

FIGS. 45-49 depict an anchoring assembly according to yet another embodiment of the present invention. Referring first to FIG. 45, it can be seen that a pair of anchor assemblies 610b and 610a are shown next one another. The end connector 690b has been removed from its groove on head 631b, the tether 604b has been unwound from the spool 650b, and the end connector 690b (in looping attachment to the tether) has been placed into the corresponding groove 636a of adjacent connector 610a.

Figure 49:
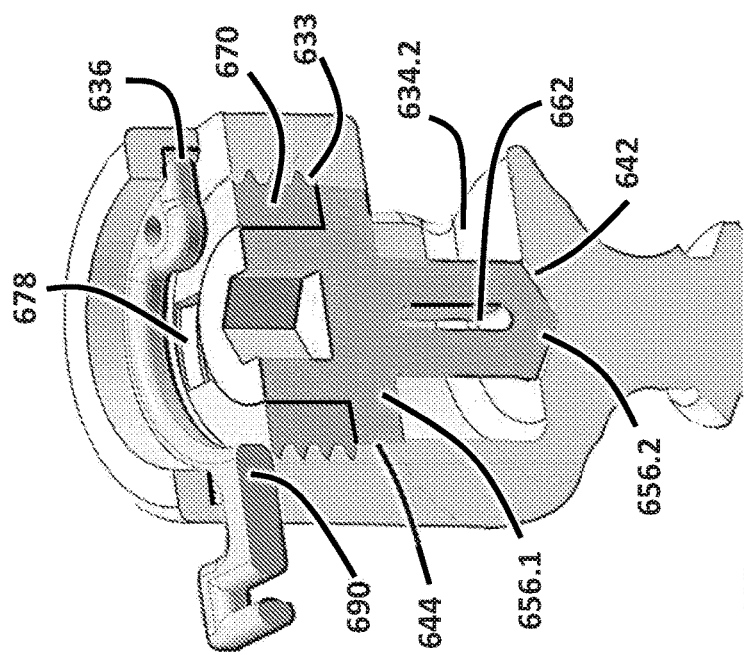
FIG. 49 is a cross sectional representation of the apparatus of FIG. 47 as taken along plane 49-49.

FIG. 46 shows an exploded view of the head assembly of anchoring assembly 610. Head assembly 630 includes a body 631 including threads 633 for threaded coupling to a locking member such as a set screw. A spool 650 is received within a spool bore 640 of head 631. Referring to FIG. 49, it can be seen that spool 650 includes an innermost spool interface 656.2 that is adapted and configured to be closely fit within a corresponding tapered pocket 642. Spool 650 includes an upper head interface 656.1 that is received within a bore 644 of pocket 640. In some embodiments, this interface between bore 644 and interface 656.1 is a tapered fit, although it is understood that in yet other embodiments the ID of bore 644 and the OD of feature 656.1 are substantially cylindrical and close fit.

Anchoring assembly 610 further includes an end connector 690 that includes a ring structure having a pair of split ends 691. In comparison to end connector 90 previous discussed, it can be seen that end connector 690 is of an internal snap ring type, fitting within internal groove 636 of head 631. Removal or insertion of end connection 690 is achieved by use of appropriate snap to compress together the two split ends 691 by way of tool coupling features 698. By using the pliers to compress the two ends 691 together, the outer diameter of connector 690 can be made smaller than the corresponding diameter of groove 636, allowing for vertical removal or installation of the compressed end connector 690.

Figure 48:
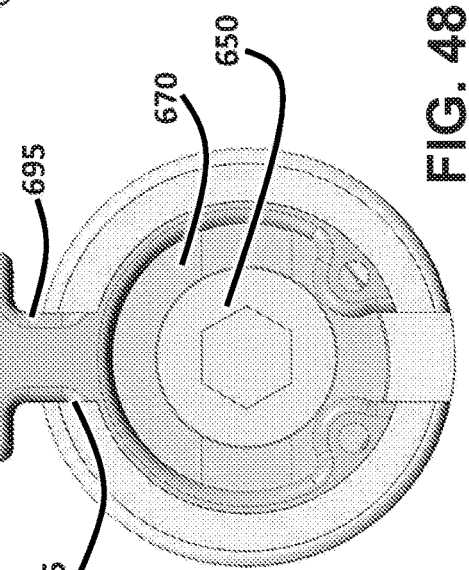
FIG. 48 is a top plan view of the apparatus of FIG. 46.
Figure 47:
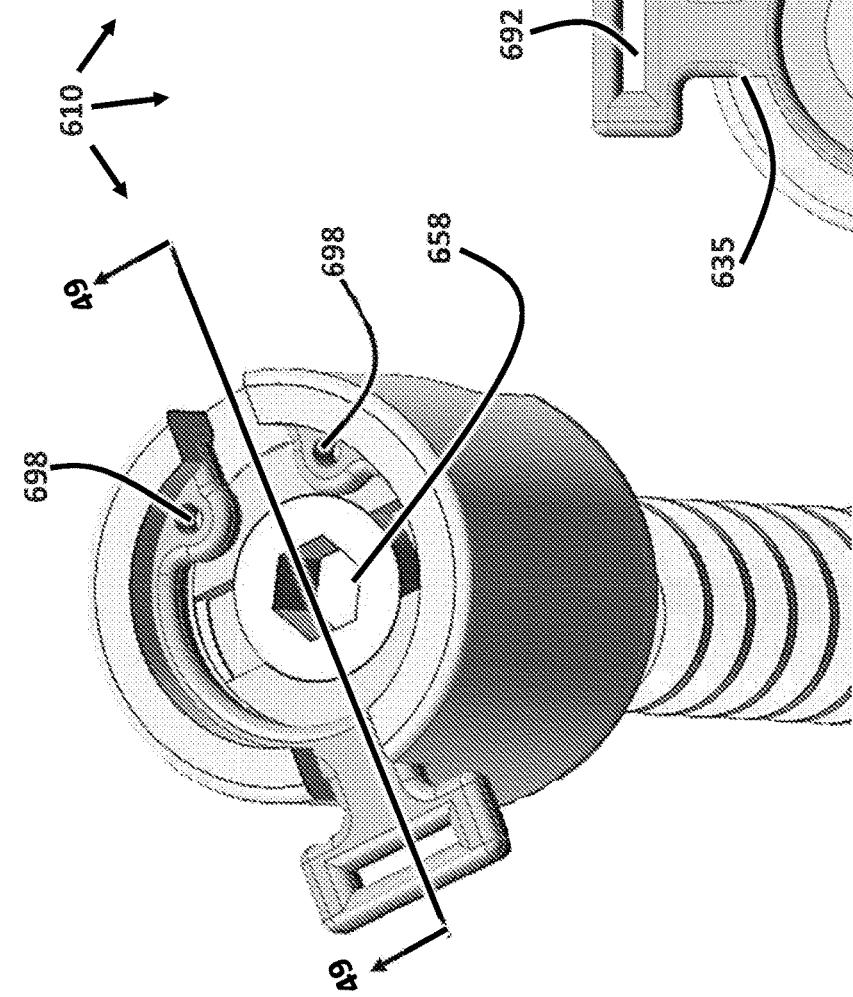
FIG. 47 is an assembled view of the anchor of FIG. 46.

As best seen in FIGS. 47 and 48, it can be seen that end connector 690 includes an aperture 692 that preferably extends beyond the outer diameter of head 631 when installed in groove 636. Slot 692 is adapted and configured to receive therein one end of the tether 604b, the other end of the tether 604b being coupled to aperture 662 of post 660. In some embodiments, the portion of the end connector coupling slot 692 to the room portion is achieved by a short arm 695 that provides rotation resistance when arm 695 is received within the corresponding slot 635 of head 631.

Some embodiments of the present invention include anchoring assemblies having an outrigger-style bevel gear X58 on the spool X50 that allows the spool to be wound up by a tensioning instrument that preferably includes a mating gear. Yet other embodiments include modifications to the shape of the head X30 to allow an interface with an anchor inserter X8 and tensioning instrument X6. These modifications include features X38 that allow the instruments to provide counter-torque to the implant X10 during manipulation.

Still further embodiments of the present invention include a dovetail receptacle X90 that attaches to the end of the tether X4. In some embodiments, the receptacle or clip X90 has a snap-fit style connection to the body X31. In some embodiments, this snap-fit connection is established by a pocket X99.2 on the clip X90, and a snap-tooth projection X36.3 on the body X31. In still further embodiments there is a slot extending between adjacent snap-teeth, which permits each of these snap-teeth to flex inward as the clip or end connector X90 is inserted into receptacle X36. In these embodiments, when the locking mechanism or set screw X70 is inserted, this mechanism prevents the snap-tooth features from flexing inward, and thus preventing the receptacle from disengaging from the body X31.

Still further embodiments include a locking feature between the round outer diameter of the spool X50 and a tapered hole X40 in the body X31. As the set screw X70 or other locking device drives a tether-wrapped spool X50 into the head X30 of implant X10, the spool is driven into the tapered slot, creating a wedging effect that prevents backrotation. This locking mechanism acts in conjunction with friction between the set screw and tether to lock the tether (and its tension) in place.

FIGS. 50-58 depict various views of an anchoring assembly 710 according to another embodiment of the present invention. Anchoring assembly 710 includes a head assembly 730 that is, in one embodiment, attached to a vertebrae by a bone connection member 720. As shown in FIGS. 58, bone connection member in one embodiment is a bone screw fixedly attached at a platform 721 to the underside of head assembly 730. Bone connection member 720 includes a plurality of bone-engaging threads 722.3 that preferably extend from the platform 721 to a tip 722.2. However, other embodiments of the present invention are not so constrained, and contemplate head assemblies X30 that are pivotally coupled to a separable bone screw X20, so as to allow pivoting of head assembly X30 relative to connection member X20 in one or more directions. Still further embodiments contemplate a bone connection member X20 that comprises a staple body including a plurality of projections X22.

In one embodiment, anchor assembly 710 includes a separable end connector 790 that is attached to a portion of a flexible member 704. As seen in FIGS. 56A and 56B, end connector 790 preferably includes a tether connection feature 792 which comprises a post extending between two slots or apertures. Flexible connector 704 preferably passes through one aperture and around the other aperture, wrapping the post, as will be explained with regards to FIG. 59. However, yet other embodiments contemplate an end connector with a single aperture, and still further those end connectors that can have any manner of attachment to a flexible member X04.

Figure 51:
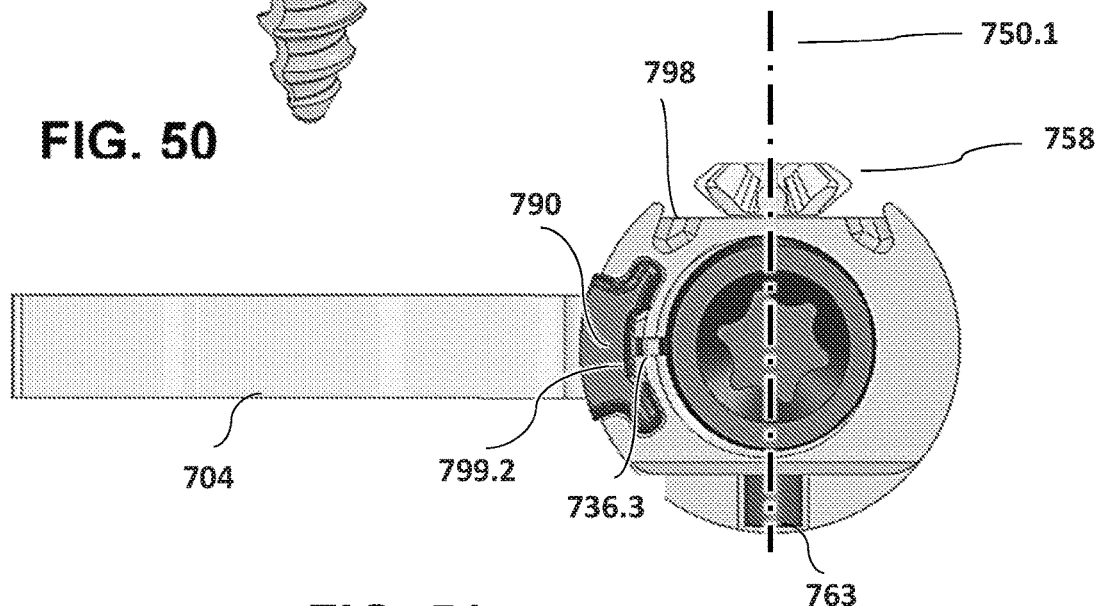
FIG. 51 is a top plan view of the assembled anchor of FIG. 50.
Figures 52, 53:
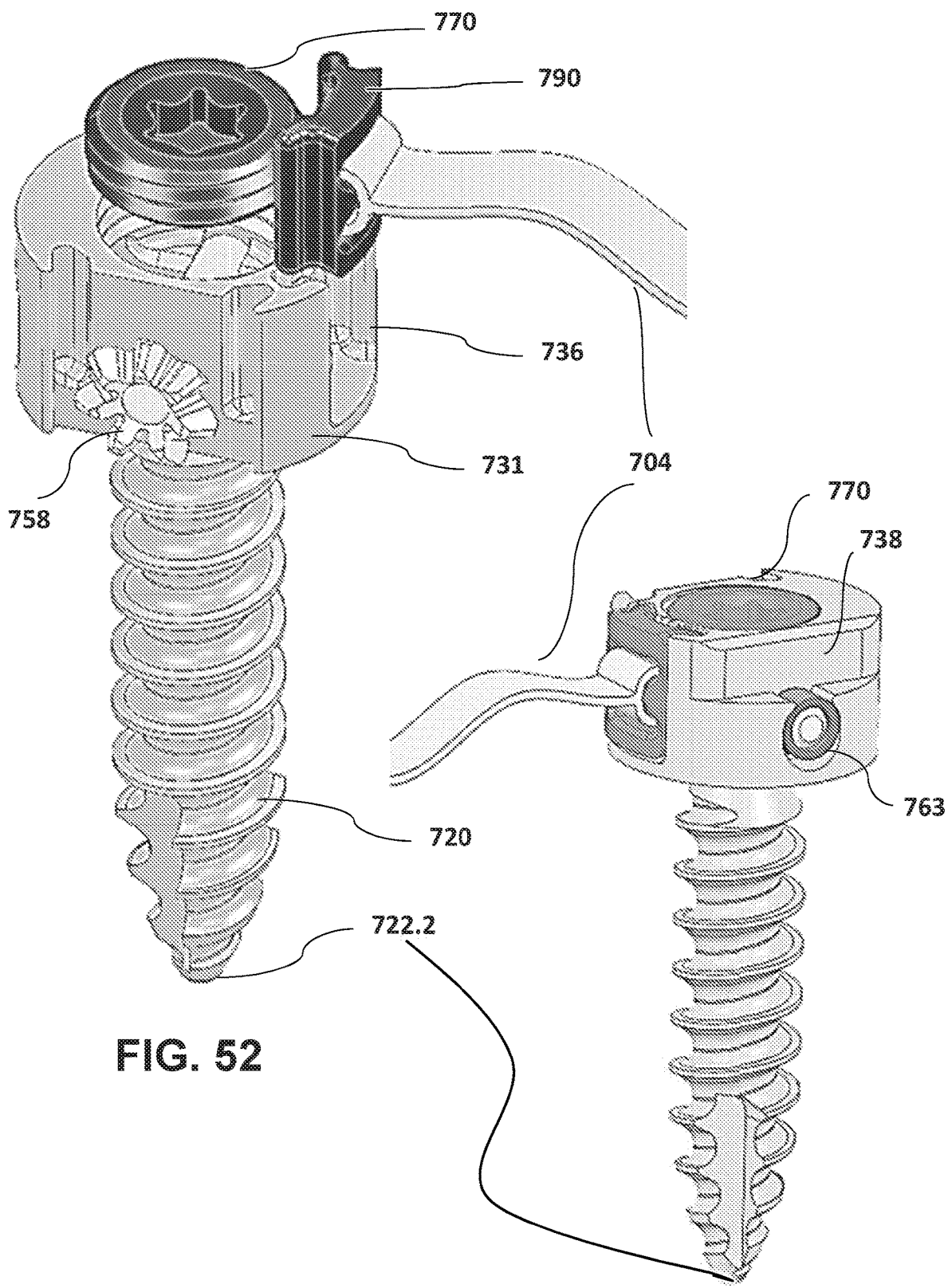
FIG. 52 is a partially exploded view of the anchor of FIG. 50.
FIG. 53 is a side elevational, top perspective view of the assembled anchor of FIG. 51.

Referring to FIGS. 51 and 52, it can be seen that end connector 790 has a top plan shape that is complementary to the top plan shape of a receptacle 736 in body 731. As shown in FIG. 52, end connector 790 and receptacle 736 are adapted and configured to slidingly engage, with end connector 790 preferably being top loaded into body 731. However, yet other embodiments are not so constrained, and include end connectors X90 that can alternatively be side loaded or bottom loaded into a body X31.

As shown in FIG. 51, the exterior shape of end connector 790 coacts with the interior shape of slot 736 such that a lateral force (such as tension on flexible member 704) will not remove end connector 790, but will instead pull generally on head assembly 730.

As best seen in FIGS. 51, 55A, and 56B, in one embodiment body X31 and end connector X90 have one or more interlocking features that discourage or prevent removal of the end connector from the receptacle. Referring to FIGS. 55A and 51, it can be seen that at least one projection 736.3 located near the top of body 731 extend laterally outward into receptacle 736 (also as seen in FIG. 54). As seen in FIG. 55A, a slit separates the two clips or projections 736.3. Referring to FIG. 56B, it can be seen that the inner, top side of end connector 790 includes a recess or shelf 799.2. When clip 790 is fully seated in receptacle 736, as shown in FIG. 51, the projections 736.3 extend over shelf 799.2, so as to deny or discourage the sliding removal of end connector 730 from receptacle 736.

In one embodiment, the receptacle projection, and slit are designed such that when the connector is first placed into the receptacle that the projections bend inward and out of the way. When the receptacle is fully seated, the clips extend back and over shelf 799.2. When the implantation is complete, and the set screw has been fully inserted, the presence of the set screw will prevent the projections from bending inward as they did during installation. In this manner, by reinforcing the receptacle pocket with the set screw, the projections are unable to bend inward after final implantation and thereby physically interfere with inadvertent removal of the clip.

Head assembly 730 further includes means for tensioning a flexible member, including a spool 750 located within a spool-receiving pocket 740. Referring to FIGS. 57A and 57B, it can be seen that in one embodiment spool 750 includes a shaft or winding post 760 and a gear 758 that is adapted and configured for coupling to a tensioning tool. In one embodiment, gear 758 has a beveled design, and is fixedly attached to shaft 760. However, yet other embodiments include yet other manners of coupling gear 758 to spool 760, including as one example a keyway, a threaded attachment, or other.

Referring to FIGS. 55B and 55D, it can be seen that the generally cylindrical outer shape of shaft 760 is placed within spool receiving pockets 740 that are located on opposite sides of body 731, although still further embodiments include spool receiving pockets that are open from the top, or a pocket placed on only one side of body 731. It can further be seen that in one embodiment the spool receiving pocket is preferably noncircular, having an upper spool interface 744 that is wider than the inner spool interface 742. Preferably, the outer diameter of shaft 760 rotates freely within the upper interface 744, but will engage the inner sides 742 of the pocket when pressed downward, such as by the set screw.

Figure 50:
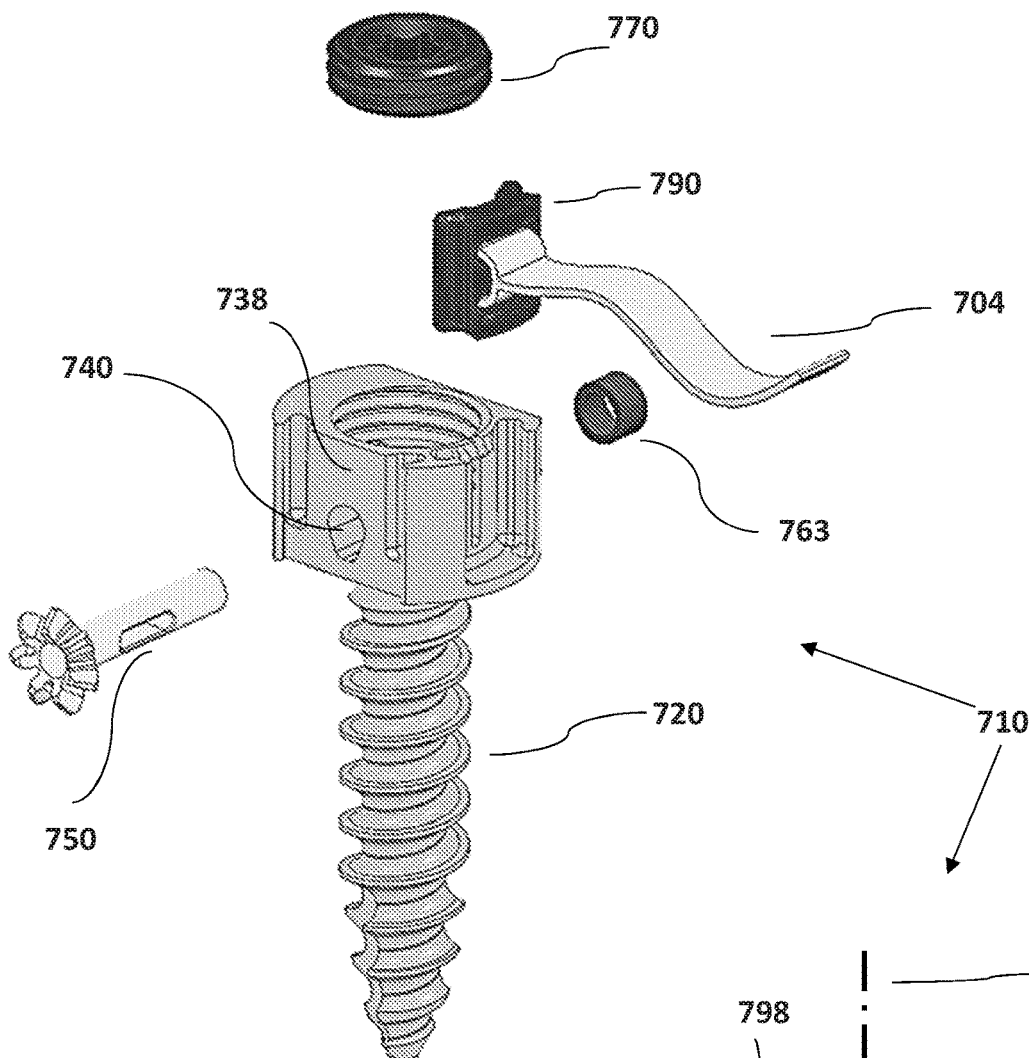
FIG. 50 is a CAD-generated surface depiction of an exploded view of an anchoring assembly 710 for the interconnection of anchors by a flexible connector, according to one embodiment of the present invention.
Figures 58A, 58B, 58C:
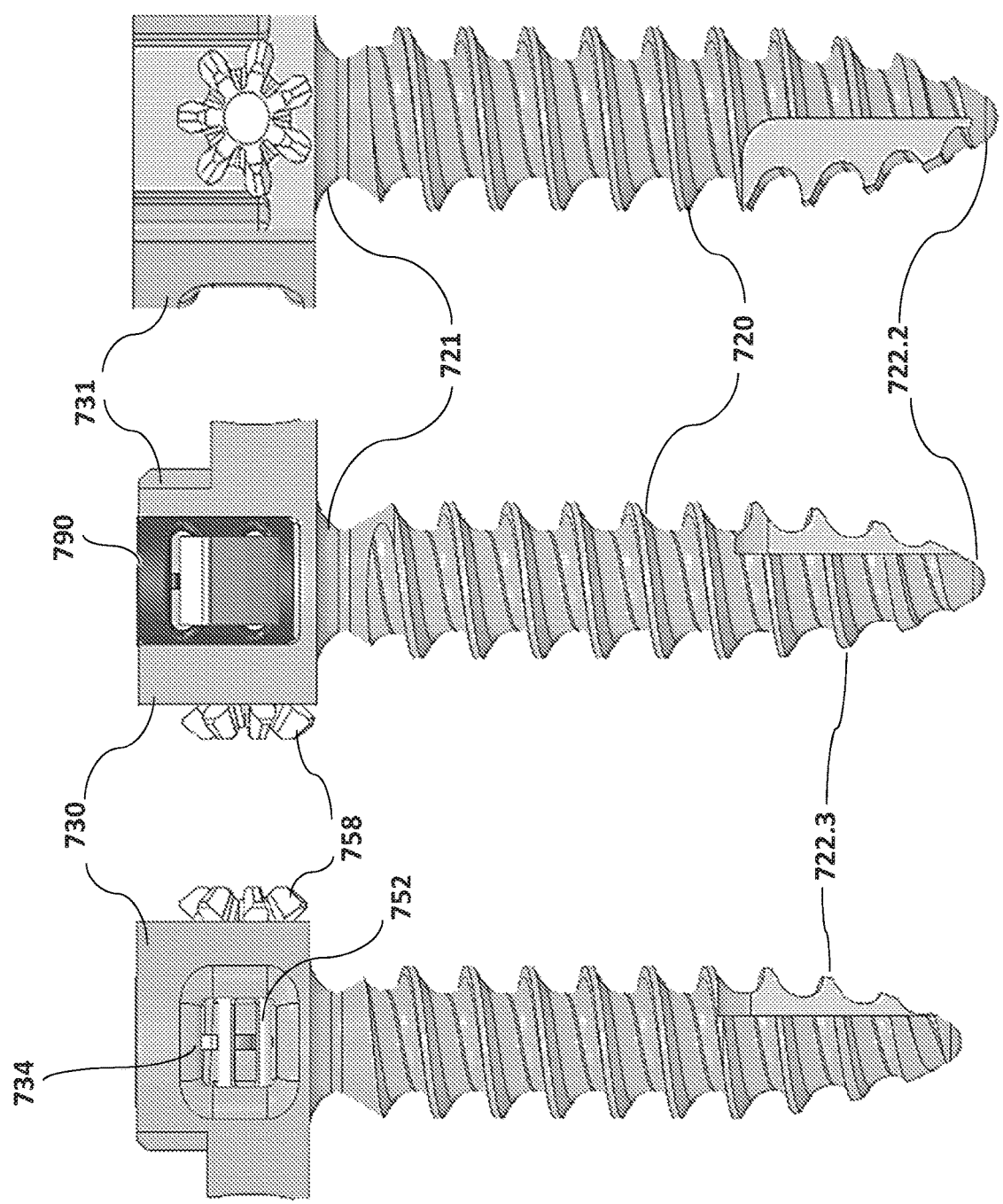
FIG. 58A is an opposite side elevational view of the apparatus of FIG. 53, except without the tether.
FIG. 58B is a side elevational view of the apparatus of FIG. 58A.
FIG. 58C is a rear elevational view of the apparatus of FIG. 58A.
Figure 58D:
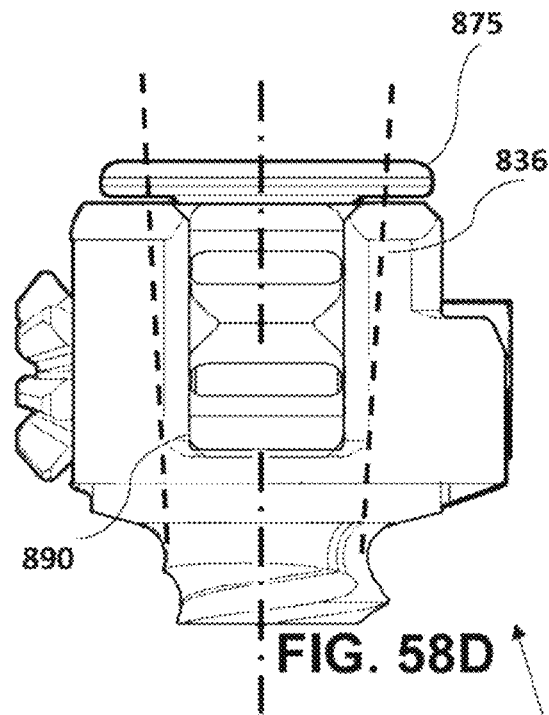
FIG. 58D is a side elevational view of an anchoring assembly according to another embodiment of the present invention.
Figure 58E:
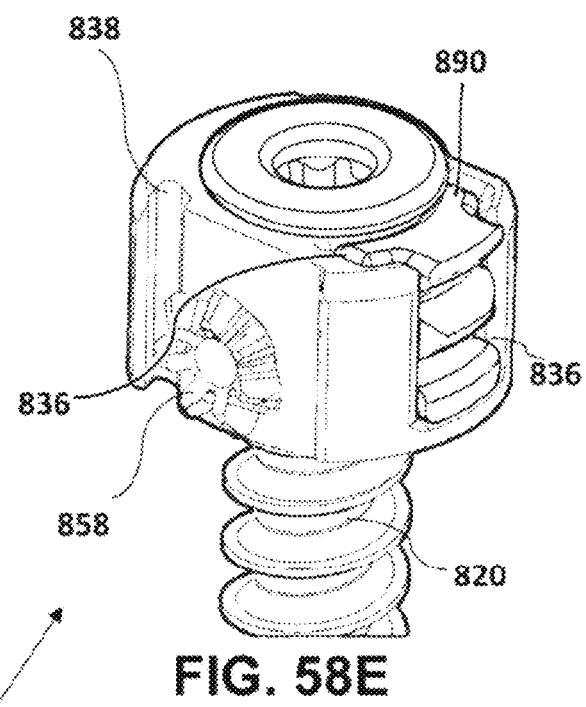
FIG. 58E is a top, perspective view of the apparatus of FIG. 58D.
Figure 58F:
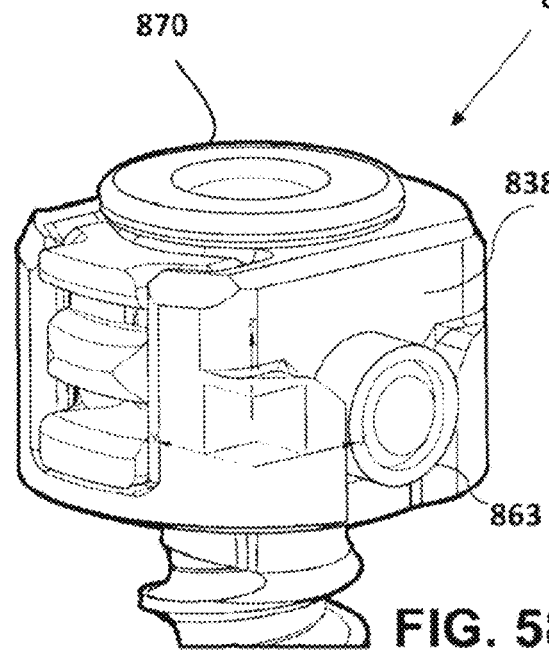
FIG. 58F is a top, perspective view of the apparatus of FIG. 58D.

FIGS. 50, 51, and 58A depict the spool assembly 750 installed in a head assembly 730. Spool 750 is inserted laterally into a spool-receiving pocket 740, with the cylindrical end of spool 750 extending out of the pocket on the opposite side. A collar 763 is press fit onto the end of the shaft, thus preventing removal of the installed spool assembly 750. It is understood that in yet other embodiments the end of the shaft may be deformed so as to prevent its removal from pocket 740. Further variations include the use of a transversely placed pin such as a cold-rolled pin, a threaded fastener in the end of the shaft, or any other. Referring to FIG. 58A, it can be seen that the flexible member connection feature 752, such as a slot, is aligned with the tether pathway aperture 734 of body 731, thus permitting the flexible member from an anchoring assembly to be coupled to the spool 750 of a second anchoring member.

Yet another embodiment of the present invention pertains to an anchoring assembly 810 having a horizontal spool, and a larger end connector 890 that provides for a different type of connection between end connector 890 and body 831. In some embodiments the threaded portion of set screw 870 has a smaller major diameter, which allows more room for a larger receptacle 836 and a larger end connector 890. In some embodiments, both the clip 890 and the mating pocket 836 in the body 831 include a tapered fit. As the clip is pressed into the pocket 836, a more motion-resistant taper lock is created between the components. This motion resistance can be adjusted by varying the taper angles. In some embodiments, both the opposing external sides of the clip and the internal sides of the pocket are tapered at the same angle, although in yet other embodiments the taper angles are different. As nonlimiting examples, the receptacle can be tapered differently than the end connector, with a more tapered end connector receiving a less tapered receptacle, or less tapered end connector receiving a more tapered receptacle. In still further embodiments, the right and left sides of either the end connector and/or the receptacle can be different, such that the end connector or receptacle is not symmetric about a centerline. For additional retention, the set screw 870 includes a head or cap 875 that prevents clip 890 from becoming loose, even if the tapered junction were to loosen.

Figure 58G:
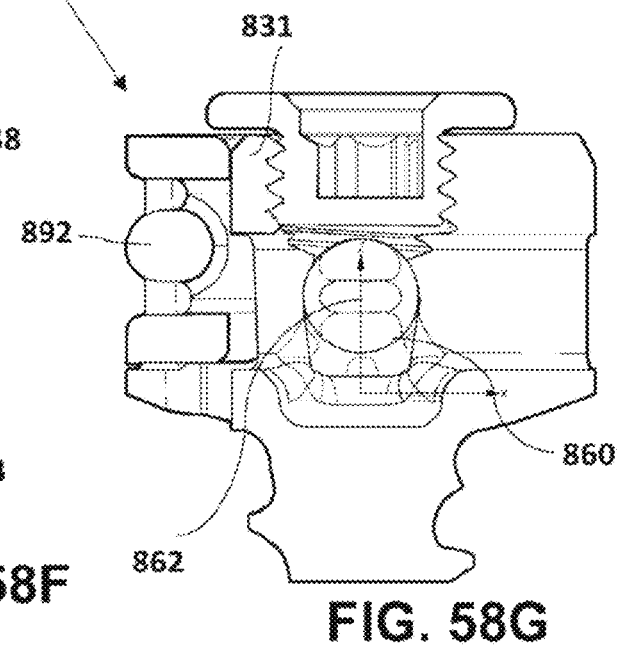
FIG. 58G is a cutaway view of the apparatus of FIG. 58G as taken along long line 58G-58G of FIG. 58F.
Figure 58H:
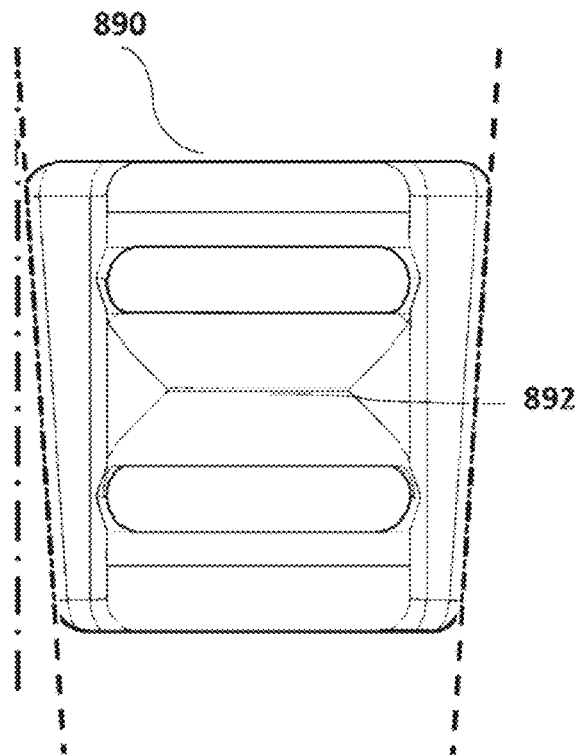
FIG. 58H is a side elevational view of a portion of an apparatus for an end connector for a flexible member according to another embodiment of the present invention.

FIGS. 58D, 58E, 58F, 58G, and 58I depict various views of an anchoring assembly 810 according to another embodiment of the present invention. Anchoring assembly 810 is similar to 710, as shown and discussed. One difference between assemblies 710 and 810 is the manner in which the end connect is retained within the receptacle once it has been installed. Referring to FIG. 58G, it can be seen that the receptacle 836 and end connector 890 are adapted and configured such that the interface between the end connector and body 831 is located under an extension or lip 875 of outermost locking member 870. This projecting lip provides an end connector retention feature that prevents removal of end connector 890 because of the interference or overlap between the radially inwardmost portion of the end connector and the underside of lip 875. In some embodiments, and as shown in FIG. 58G, this overlapping projection of the set screw eliminates the need for interlocking features 736.3 and 799.2 (as best seen in FIG. 51). Still further, it is understood that this overlapping and interfering portion of the set screw can also be obtained by the use of a separate washer between head 831 and set screw 870.

A still further difference of head 830 as compared to head 730 is with regards to the shape of the receptacle 836 and further in some embodiments the corresponding shape of the lateral sides of the end connector. Referring to FIG. 58H, it can be seen that in some embodiments that one or more of the lateral sides of end connector 890 are tapered, such that the distalmost width (i.e., the portion of the end connector first inserted into the receptacle) is less than the width of the topmost portion of the end connector. This tapering angle of more than about two degrees and less than about twenty degrees is graphically depicted as dashed lines on FIG. 58H. This tapered shape is further shown in the dashed lines imposed upon FIG. 58D. The use of a tapered end connector in some embodiments allows for easier insertion of the end connector from one anchor into the receptacle of the adjacent anchor. Still further, in those embodiments in which the receptacle is likewise tapered, it may be possible to achieve a more snug fit of the end connector within the receptacle.

Figure 58I:
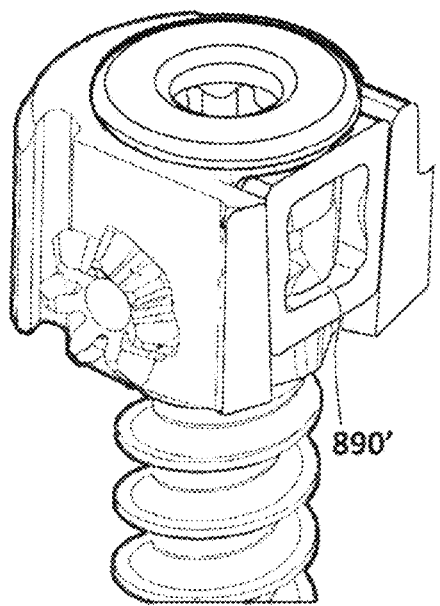
FIG. 58I is a side perspective view of an anchoring assembly according to another embodiment of the present invention.

FIG. 58I shows another modification to anchor assembly 810. A modified, tapered end connector 890' is shown. This end connector does not include a middle post 892, but instead defines a preferably single aperture.

Still further embodiments of the present invention pertain to alternative manners of wrapping the flexible member on a horizontal or vertical spool. As will be discussed with FIG. 59A, one option is to have a single layer of flexible member. One end is sewn, spliced, or otherwise interconnected to create a small loop for attachment to the receptacle. A single length of flexible member passes through the spool of the adjacent implant and is subsequently wrapped around that spool.

Figure 59A:
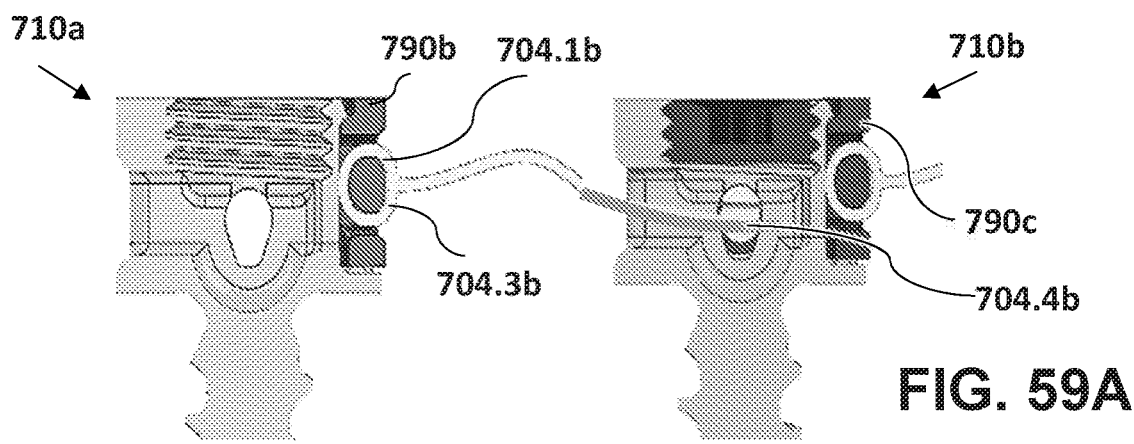
FIG. 59A shows a pair of interconnected anchoring assemblies the same as the anchoring assembly of FIG. 50, except with a tethering connection according to one embodiment of the present invention.
Figure 59B:
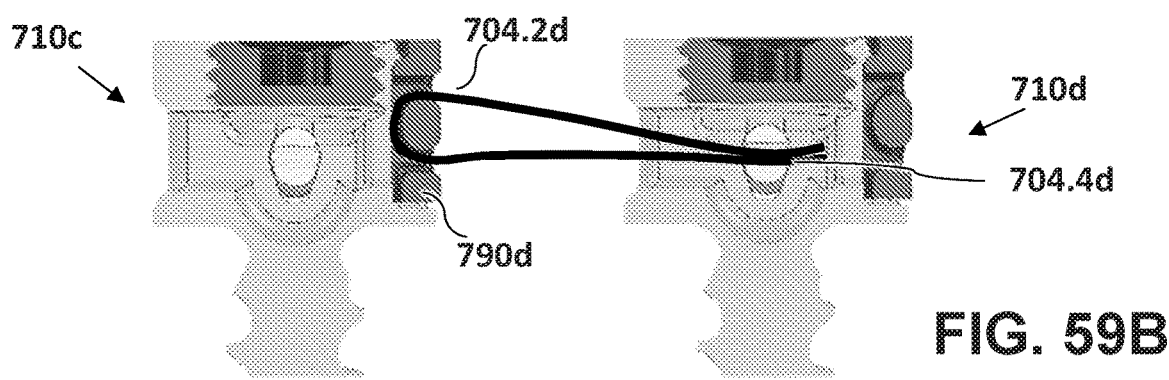
FIG. 59B shows a pair of interconnected anchoring assemblies the same as the anchoring assembly of FIG. 50, except with a tethering connection according to an alternate embodiment of the present invention.

As will be seen in FIG. 59B, yet another alternative includes a double layer of flexible member. The flexible member passes around a post of the receptacle, preferably at a point that is about the midpoint of the length of flexible member. Both free ends of the flexible member are inserted through the slot in the adjacent spool. The free ends can be held in place by crimping the spool onto the tape, stitching the tape, heat welding or acoustically welding the tape, or other methods. In this option, two lengths of flexible member are simultaneously wrapped around the spool. This manner of connection and winding shields the tether connection point from stress, as this connection point gets buried under one or more wrapped layers of flexible member.

Figure 59C:
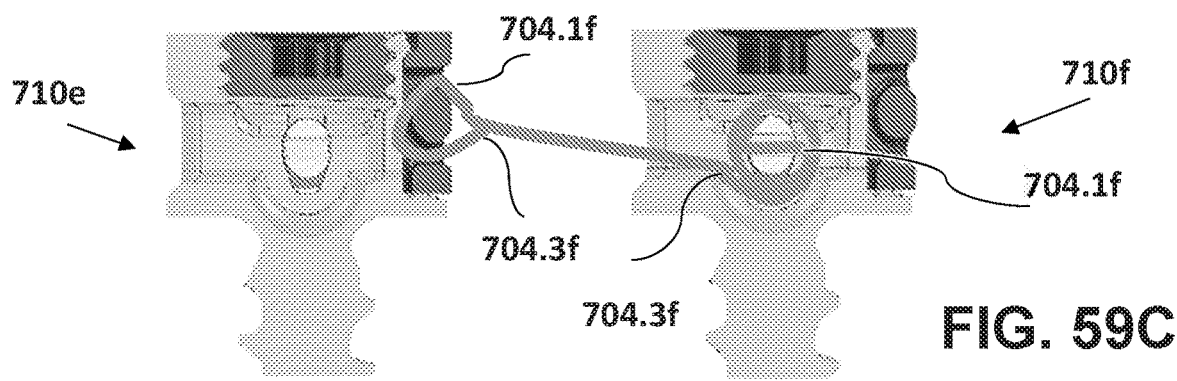
FIG. 59C shows a pair of interconnected anchoring assemblies the same as the anchoring assembly of FIG. 50, except with a tethering connection according to an alternate embodiment of the present invention.

Yet another option is depicted in FIG. 59C. This option includes a double layer of flexible member. This flexible member passes around a post of the end connector, preferably at a midpoint of the length of flexible member. One end of the flexible member is inserted through the slot of a spool, and then stitched, sewn or otherwise bonded to the other free end, preferably in a lap joint configuration. The two lengths of flexible member are simultaneously wrapped around a spool. The interconnection of the free ends is centered about the spool so that the interconnection is shielded from stress after one or more wraps have been completed. Various embodiments of the present invention contemplate any manner of attaching the flexible member to itself, including the use of adhesives, ultrasonically welding or heat welding, or other. Further, any manner of connecting the flexible member to the spool or end connector are contemplated, including the use of adhesives, ultrasonic welding or heat welding, or over-molding the flexible member directly onto a polymer spool or receptacle.

In each of the FIG. 59, a pair of anchoring assemblies are shown, with the end connector from the right anchoring assembly being slidably coupled and interlocked to the head of the left anchoring assembly. FIG. 59A shows an embodiment in which the tether 704$b$ has a loop 704.1$b$ that is wrapped around the central post 792$b$. The other end of flexible member 704$b$ extends through aperture 752. In some embodiments, this end of the flexible member that is internal to anchor 710$b$ may include a stop member attached to the end of the flexible member so as to prevent the pull out of the flexible member from aperture 752.

FIG. 59B shows a tether 704$d$ that has a loop 704.2$d$ extending around the central post 799.2$d$, with both free ends passing through and extending out of aperture 752$d$. These free ends 704.4$d$ can be adhered together, adhered to shaft 760 or aperture 752, or coupled to an end stop, for purposes of preventing pull out through the aperture 752$d$.

Figure 59D:
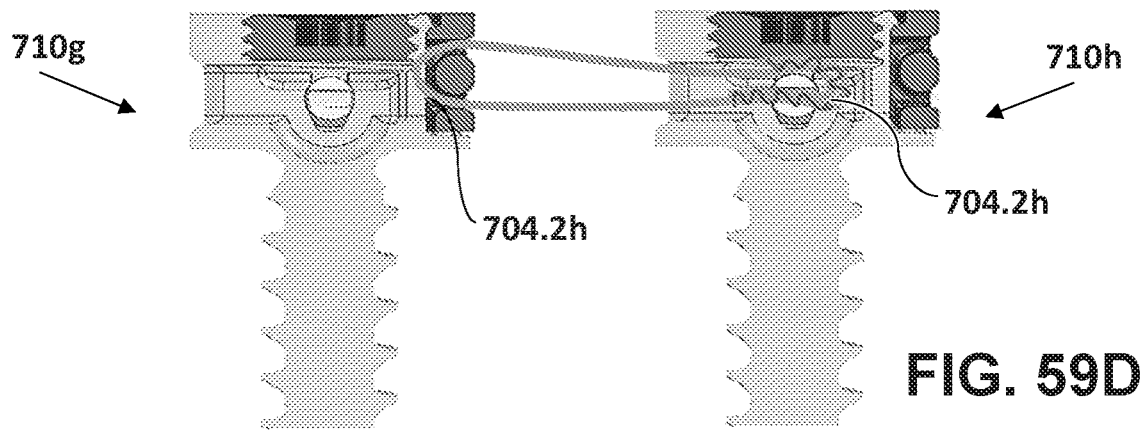
FIG. 59D shows a pair of interconnected anchoring assemblies the same as the anchoring assembly of FIG. 50, except with a tethering connection according to an alternate embodiment of the present invention.

FIG. 59C shows a tether 704$f$ that has a link 704.1$f$ extending around post 792$f$, with the other end likewise having a link 704.1$f$ internal to the head assembly 730$f$. FIG. 59D shows an embodiment in which the flexible member 704$h$ is looped around both central post 792$h$ and aperture 752$h$. In all of the embodiments shown in FIG. 59, the head X31 and set screw X70 are adapted and configured such that tightening of the set screw X70 not only pushes the shaft 760 downward into a tightening pocket 740, but further compresses and frictionally retains the flexible member X04 between the underside of locking member X70 and the outer diameter shaft X60.

Some embodiments of the present invention include a plurality of anchoring assemblies X10 implanted into multiple vertebrae. In a general sense, each anchoring assembly 10 is a substantially similar link in the chain of this construct, with each end connection X90 being attached to the receptacle X36 of its neighbor.

Figure 59E:
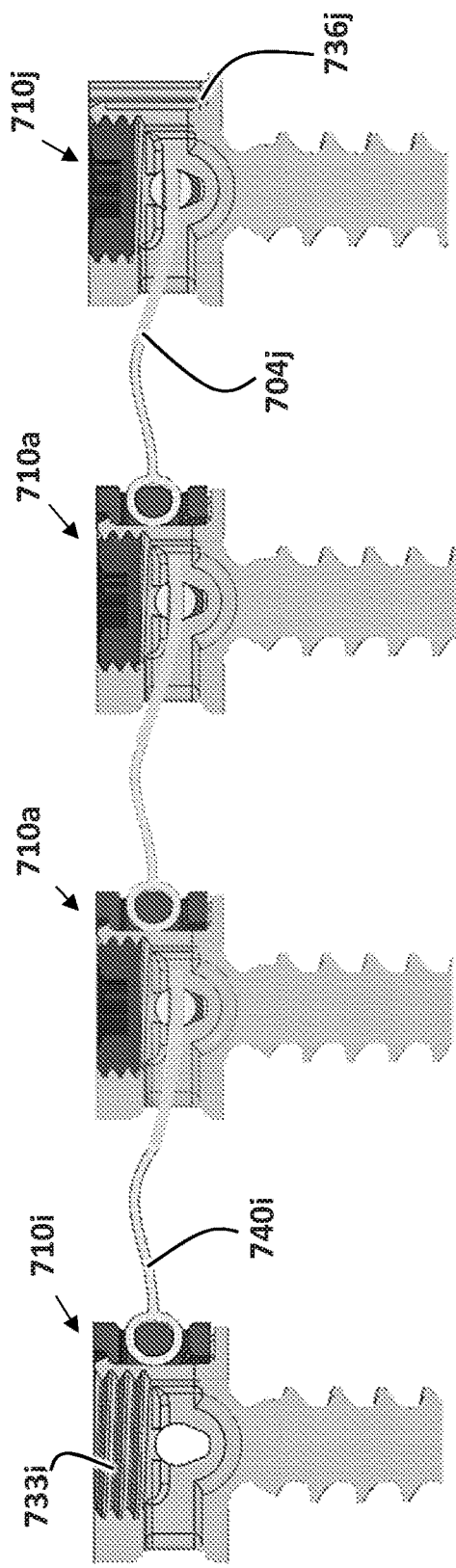
FIG. 59E shows one embodiment of a construct of multiple adjacent anchoring assemblies according to one embodiment of the present invention.

However, there are other constructs possible with variations of an anchoring assembly being used on the ends of the construct. Referring to FIG. 59E, there is shown an implanted construct of 4 adjacent anchoring assemblies. In the middle there are 2 anchoring assemblies 710$a$ as described above. However, on the ends of the construct are anchoring assemblies having fewer or different features. As one example, anchoring assembly 710$i$ is shown without a spool 750$i$ located within pocket 740$i$. Since anchor assembly 710$i$ is on one end of the construct, there is no need for any components associated with extension of the flexible member construct to the left. Further, anchoring assembly 710$i$ does not include a locking member 770$i$ within the thread 733$i$. However, in yet other embodiments a locking member 870 having the overlapping lip may be used. On the right end of the flexible member construct of FIG. 59E there is an anchor 710$j$ that receives an end of flexible member 704$j$ within the aperture of a spool 750$j$. However, since the flexible member construct does not extend to the right of FIG. 59E, there is no end connector 790 within receptacle 736$j$.

Figure 59F:
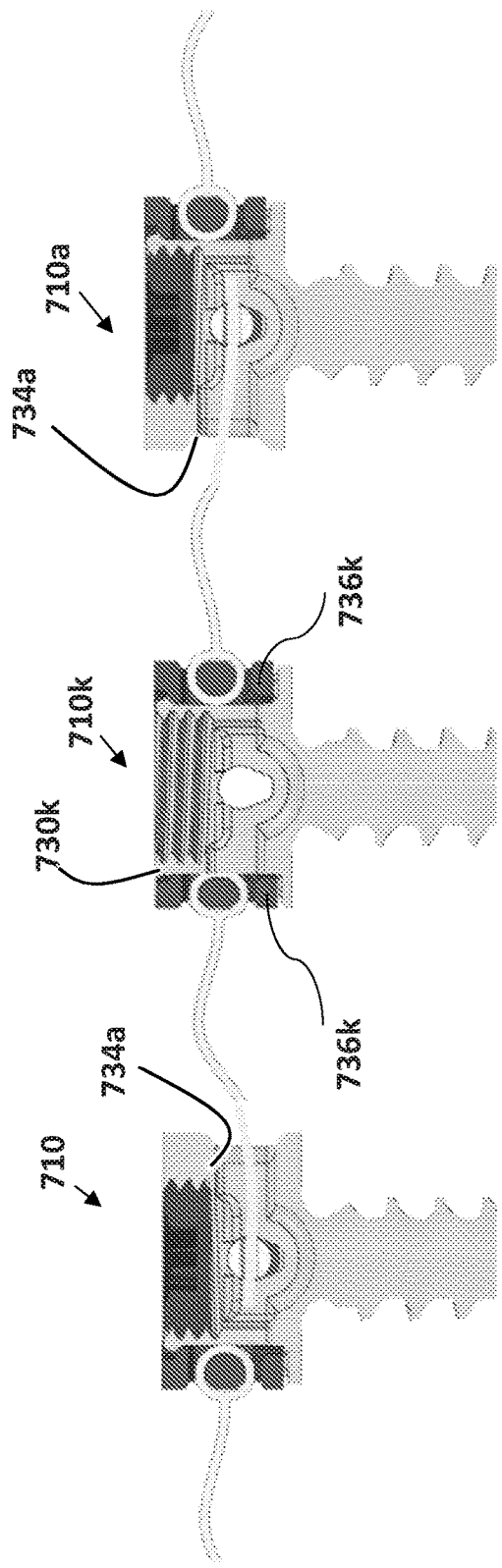
FIG. 59F shows one embodiment of a construct of multiple adjacent anchoring assemblies according to one embodiment of the present invention.

FIG. 59F shows an alternative construct according to yet another embodiment of the present invention. Three anchoring assemblies 710 are shown. On the right and left ends there are anchoring assemblies 710$a$, with each of these assemblies having a tether pathway oriented to point the flexible member 704 toward a central anchoring assembly 710$k$. The head assembly 730$k$ is a modification of head 730, and includes a pair of receptacles 736$k$, each accepting an end connector from the adjacent anchoring assembly. In some embodiments, an anchoring assembly 710$k$ would not require a spool, as shown in FIG. 59F.

Figure 60A:
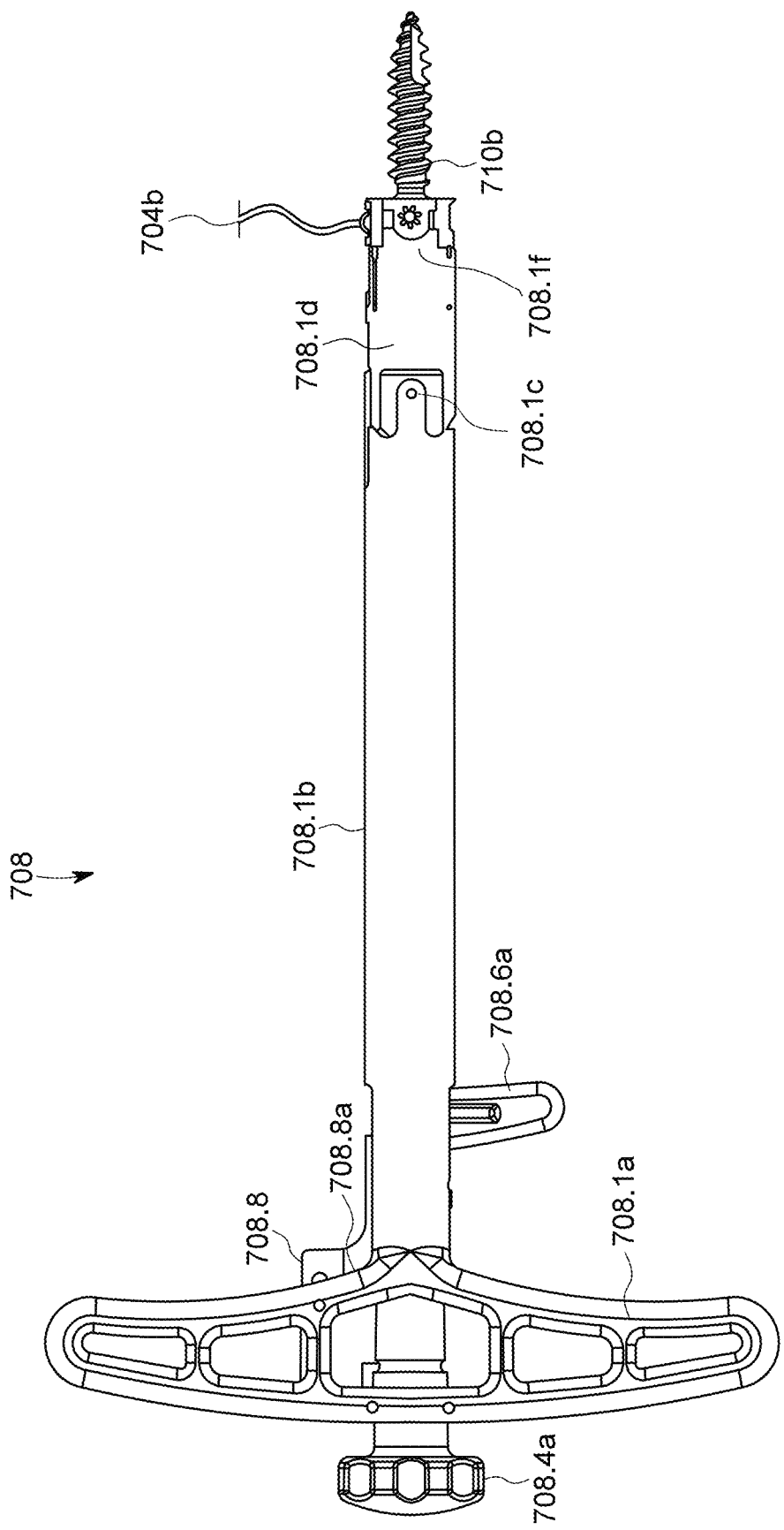
FIG. 60A is a CAD-generated surface depiction of a side elevational view of an assembly of tool or instrument and an anchoring assembly according to one embodiment of the present invention.
Figures 60B, 60C:
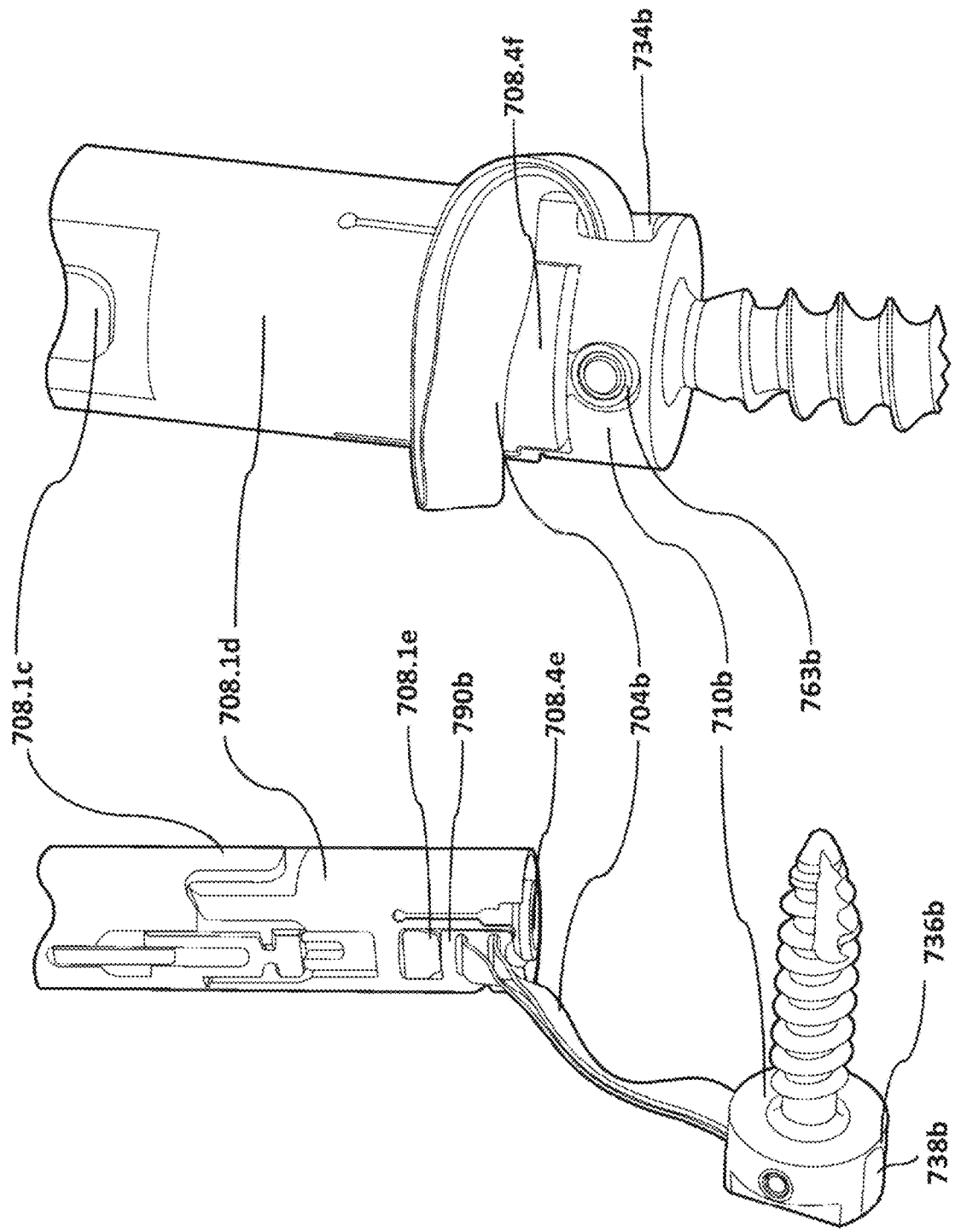
FIG. 60B is a photographic representation of the apparatus of FIG. 60A, with the anchoring assembly shown separated, but with the end connector still attached to the instrument.
FIG. 60C is a photographic representation of the apparatus of FIG. 60B with the anchoring assembly mounted to the distal end of the tool.

FIGS. 60A, 60B, and 60C present different views of an anchor assembly tightening tool 708 that is releasably coupled to an anchor 710$b$. Tool 708 includes an external structure 708.1$a$ attached to a rigid body 708.1$b$. Pivotally located at the end of the rigid body is a pivoting body 708.1$d$. The proximal or rigid body and the distal or pivoting body are coupled together by a pivot joint 708.1$c$. The distal end of the pivoting body is shown coupled to an anchoring assembly 710$b$. Tool 708 includes a finger-actuated lever 708.6$a$ that controls pivoting of distal portion 708.1$d$ relative to body 708.1$b$. Lever 708.6$a$ is preferably actuated between a rigid location (in which body 708.1$b$ and 708.1$d$ are maintained locked in a predetermined angular orientation), and a pivoting location (in which the two bodies are free to pivot about pivot joint 708.1$c$). Further there is an end connector release lever 708.8$a$ that is finger actuated to move a temporarily located end connector from pivoting body 708.1$d$ into an aligned receptacle of an anchoring assembly.

As best seen in FIGS. 60B and 60C, the end connector 790$b$ of anchor assembly 710$b$ is removed from receptacle 736$b$ and temporarily mounted into a receptacle or end connector of holding slot 708.1$e$. As best seen in FIG. 60C, in this temporary configuration the flexible member 704$b$ is partly wrapped around the pivoting body 708.1$d$, extending from the end connector 790$b$ to the tether passageway 734$b$. In the configuration shown in FIG. 60C, a pair of driving features 708.4$f$ extend on either side of body 731$b$, and into the flattened areas 738$b$ that are adapted and configured to receive a driving torque from tool 708. These driven features 738$b$ are also seen in FIG. 54.

In the configuration as shown in FIG. 60C, the surgeon places the bone connection members 720$b$ into a predrilled hole in a vertebrae, and applies torque to tighten anchor assembly 710$b$ into the vertebrae. Once the anchoring assembly 710$b$ has been connected to the vertebrae, the tool 708 is then removed from head assembly 730$b$ (there being an internal connection between threads 733$b$ and instrument threads 708.4$e$), rotated to unwind the tether 704$b$, and then placed over an adjacent anchoring assembly 710 as shown in FIGS. 61, 62, and 63. In a manner that will now be explained, the end connector 790$b$ from the anchoring assembly 710$b$ shown in FIG. 60C is to be transferred into the receptacle 736$a$ of adjacent anchoring assembly 710$a$.

FIGS. 61A, 61B, and 61C show tool 708 after being released from anchor assembly 710$b$ and being coupled to implanted anchoring assembly 710$a$ in preparation for interconnection of the two anchoring assemblies by way of flexible member 704b. The distal end of tool 708 includes a threaded member 708.4e that is adapted and configured to threadably couple preferably to the set screw threads 733a. This inner rotatable member having a threaded end 708.4e is coupled to knob 708.4a, such that rotation of this nob relative to handle 708.1a fastens the tool to the anchor.

As this is accomplished, and the distal end 708.1d is brought into full contact with head 730a, the distal end alignment features 708.1f are received within the corresponding alignment features 798a. FIG. 61C shows the tool distal end in full contact with the anchoring assembly. It can be seen that end connector 790b is positioned immediately above receptacle 736a.

FIGS. 62A and 62B show the transition of end connector 790b onto anchoring assembly 710a. After the threaded interconnection of the tool to the anchoring assembly, the end connector 790b is pushed downward into slot 736a. The end connector is released into the receptacle of the head assembly by actuation of release mechanism 708.8. The surgeon pulls on lever 708.8a, with the result that internal linkages 708.8b, 708.8c, and intermediate pivoting link 708.8d extend distally and push end connector 790b into receptacle 736a, as best seen in FIG. 63A. Referring to FIG. 63B, it can be seen that in this fully nested position, the clips or projections 736.3a of head 731a are located on top of the shelf 799.2b of end connector 790b. From this interlocking position, the end connector is no longer within slot 708.1e. Knob 708.4a can be rotated to unlock and disconnect the threaded connection between threaded member 708.4e and threaded member 733a.

Yet another embodiment of the present invention pertains to a manner of tensioning a flexible member, especially when the flexible member is coupled to a spool that is driven by a gear. As noted herein, the gear may be directly attached to the spool, or may drive the spool by other intermediate needs (such as by another intermediate gear). Preferably, this tensioner X6 includes a gear that is adapted and configured to mate with a gear driving the spool of the implant. The following overall method is shown in FIG. 64.

1. Engage the tensioner to the implant. There are clocking features on the tensioner/implant that align the tensioner properly and allow the tensioner to apply a countertorque for the implant (e.g. when installing the set screw in later steps). As the tensioner becomes fully engaged the bevel gear on the tensioner meshes with the bevel gear connected to the spool on the implant:

2. Rotate the handle of the tensioner. Rotation is preferably transmitted through a series of bevel gears so that the bevel gear meshing with the implant rotates with the handle. This rotation turns the spool, taking up slack in the tether and providing tension. Once desired tension is reached, introduce a set screw through the lumen in the tensioner and use the set screw to compress the spool/tether.

FIG. 64 show various views of a tool for applying tension to a flexible member, and further for securing the flexible member in the tensed state. FIG. 64A shows a combination of a screwdriver 703 that is used in conjunction with a tether tightening tool 706. Tether tightening tool 706 includes an internal lumen 706.1c, and the shaft of the screwdriver 703 is received within that lumen. Referring briefly to FIG. 64C, it can be seen that the end of the screwdriver in one embodiment is magnetically coupled to an outermost locking member 770, such as a set screw. As can be seen in FIG. 64B, the lumen is enclosed for a portion of the length of the body 706.1b, but opens to a partial lumen toward the distal end. As best seen in FIG. 64B, a set screw 770 can be seen in place proximate to the anchoring assembly 710a.

Referring to FIGS. 64D, 64E, and 64F, it can be seen that tightening tool 706 includes a rotatable handle 706.1a that is bearingly supported by body 706.1b. The handle is drivingly engaged with one or more internal drive members 706.2 that are adapted and configured to rotate as the handle is rotated. At the distalmost end of the internal drive members 706.2 is a bevel gear 706.3 that is adapted and configured to engage bevel gear 758. In one embodiment, and as best seen in FIG. 64E, the handle 706.1a is angularly offset from the internal drive 706.2, and the interface between the handle and the internal drive is a pair of bevel gears 706.3. However, yet other embodiments contemplate any manner of transmitting rotation of a handle to rotation of the distalmost gear, including as one example as flexible rod. Further, although an angular offset of about thirty degrees to about seventy degrees has been shown between the centerline of the handle and the internal drive, yet other embodiments contemplate any rate of angles from zero degrees to ninety degrees.

Figures 64G, 64H:
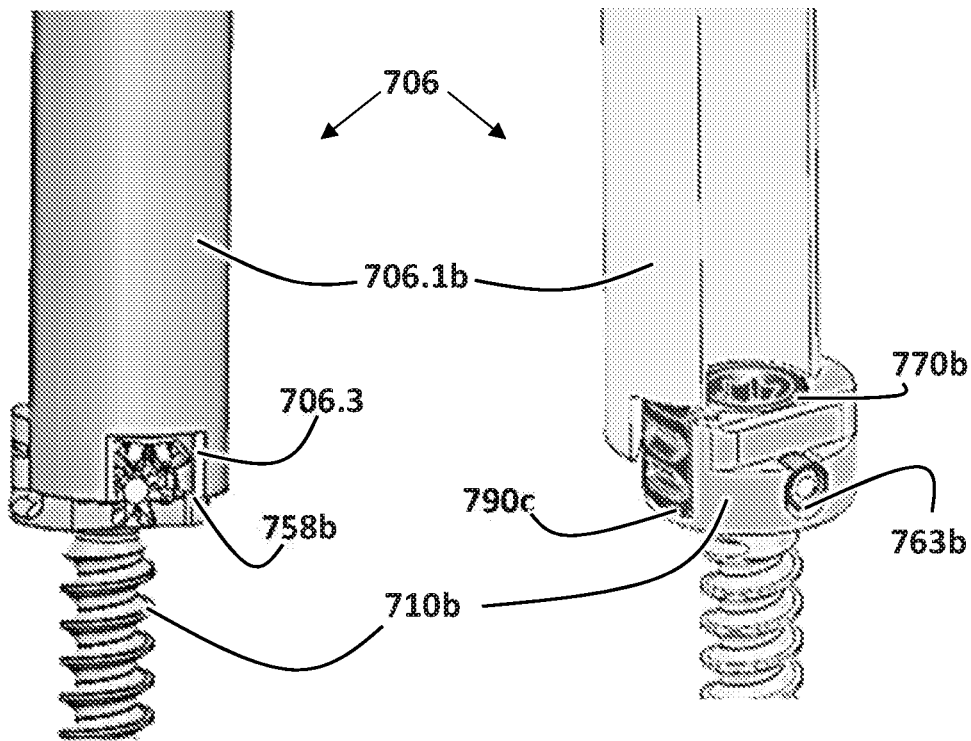
FIG. 64G is a CAD representation of a portion of the apparatus of FIG. 64F, showing the distal end of the instrument and the open lumen, with the set screw shown in place.
FIG. 64H is a CAD representation of the opposite side of FIG. 64G, showing the driving and driven gears in mesh.
Figures 64I, 64J:
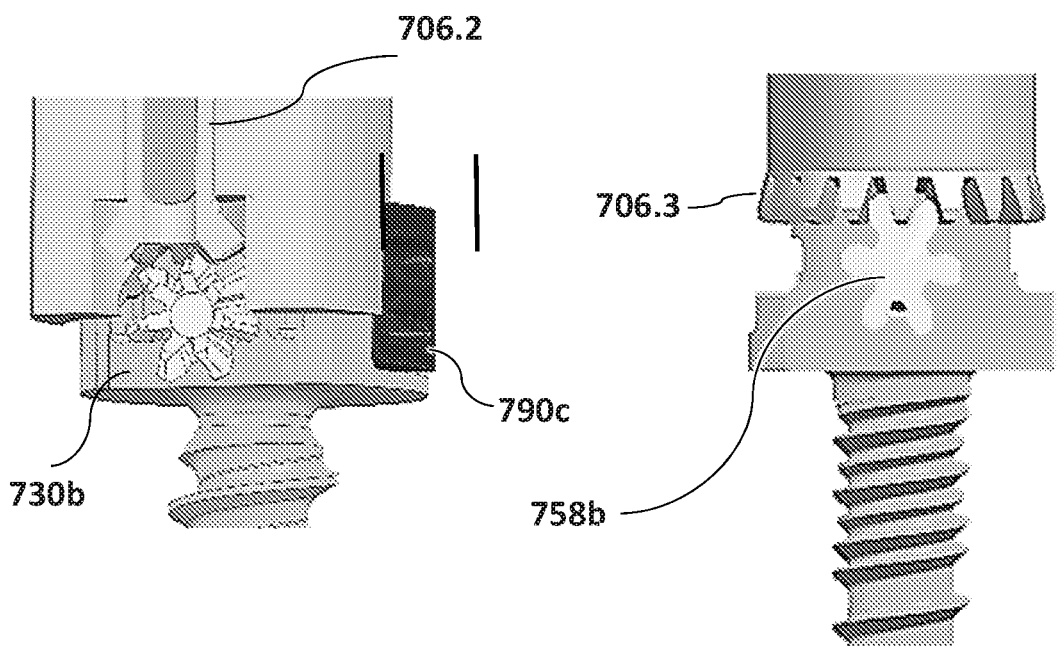
FIG. 64I is a close-up, partial cutaway representation of the apparatus of FIG. 64H.
FIG. 64J is a side elevational CAD representation of the distal end of an alternative tool for tensioning a flexible member.

Referring to FIG. 64G, it can be seen that the distal end of tool 706 includes one or more alignment features on either side of bevel gear 706.3. These alignment features couple with alignment features previously shown for the head of the anchoring assembly, and ensure that gears 706.3 and 758a properly align, and further that the torque applied to bevel gear 758 is reacted against the body 731a (as best seen in FIG. 64i). Referring to FIG. 64H, it can be seen that after the appropriate tension has been achieved, the surgeon uses screwdriver 703 to drive set screw 770a into head assembly 730 while maintaining torque on handle 706.1a. After the set screw is suitably tightened, the instruments 703 and 706 are removed. FIG. 64H further shows that implanted anchoring assembly 710b includes within its receptacle the end connector 790c from an adjacent connector (not shown).

FIG. 64J shows an alternative distal end for a tightening tool. The distal end of the tightening tool as shown in FIG. 64J incorporates a plurality of teeth surrounding the circumference.

Still further embodiments of the present invention contemplate one or more tools for implanting an anchoring assembly 710 or 810. These instruments, implants, and method are shown in FIG. 65.

1. Attach the implant X10 to the Inserter X8. The Inserter houses the clip X90 and tether X4 of the implant that is being inserted. Attachment is accomplished by rotating the threaded tip of the Inserter X8.4e into the mating set screw threads X33 on the implant. Features X8.1f and X8.4f on the tip of the Inserter "clock" the implant to the Inserter so the Inserter can be used to rotate the implant into the bone.

2. Use the Inserter to rotate/drive the anchor 710b into the vertebrae, ensuring the implant has proper alignment to its neighbor.

3. Unthread the tip of the Inserter from the implant to release it.

4. Actuate the Inserter in a manner that allows the tip of the Inserter to articulate (pivot) and move the tip to the adjacent implant. Articulation is helpful so that the tip of the Inserter can be axially aligned with two adjacent implants (that are not usually parallel to one another) while remaining in the same port (see FIG. 65C). Note that a portal 9 (fixed access point) is shown between the ribs.

5. Thread the Inserter back onto the neighboring implant 710a.

6. Actuate the Inserter so that an internal "pusher" ejects the clip 790b into the neighboring implant 710a. The two implants are now connected.

FIG. 65 depict one manner of using the tools 703, 706, and 708 as previously discussed. FIG. 65A shows an anatomical model of a skeleton 701 showing a rib cage and vertebrae. A first anchoring assembly 710a has been attached to a first vertebrae. FIG. 65A shows a second anchoring assembly 710b being implanted in an adjacent vertebrae. A bone connection member tightening tool 708 is shown with anchoring attachment 710b placed on the distal end, with the tether 704b wrapping around the outer diameter (similar to the configuration shown in FIG. 60C).

In FIG. 65B it can be seen that the implantation of anchoring assembly 710b is complete. The tool 708 is then removed from head 730b, with end connector 790b still attached (similar to the configuration shown in FIG. 60B). The surgeon then operates lever 708.6a. The sliding of this button by means of internal shaft 708.6b unlocks the distal pivoting section 708.1d. With the distal end pivoted, the surgeon is able to use the same portal 709 and engage the head 730a of the adjacent anchoring assembly 710a, as seen in FIG. 65C. In a manner as discussed for FIGS. 61, 62, and 63, tool 708 is used to move end connector 790b from the distal end of the tool and into the receptacle 736a.

Figure 65E:
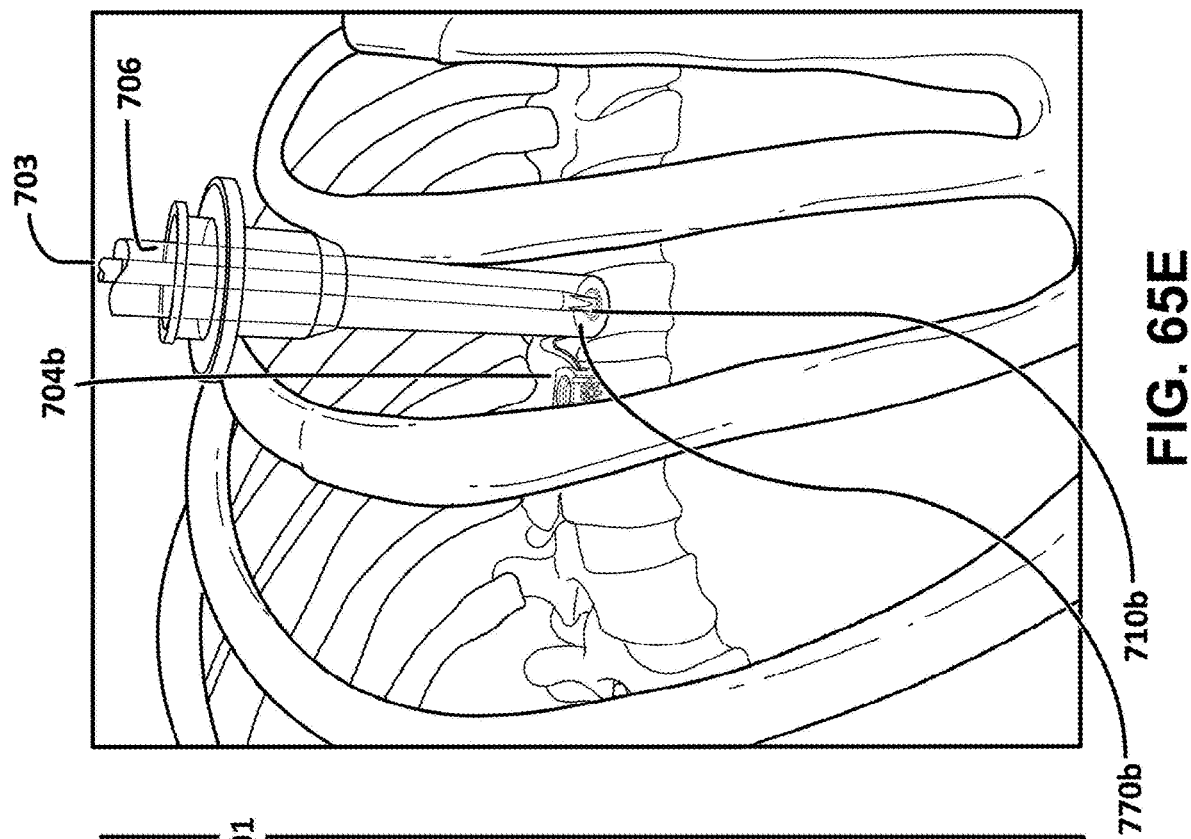
FIG. 65E depicts a following act of implantation, following the act of FIG. 65D.
Figure 65D:
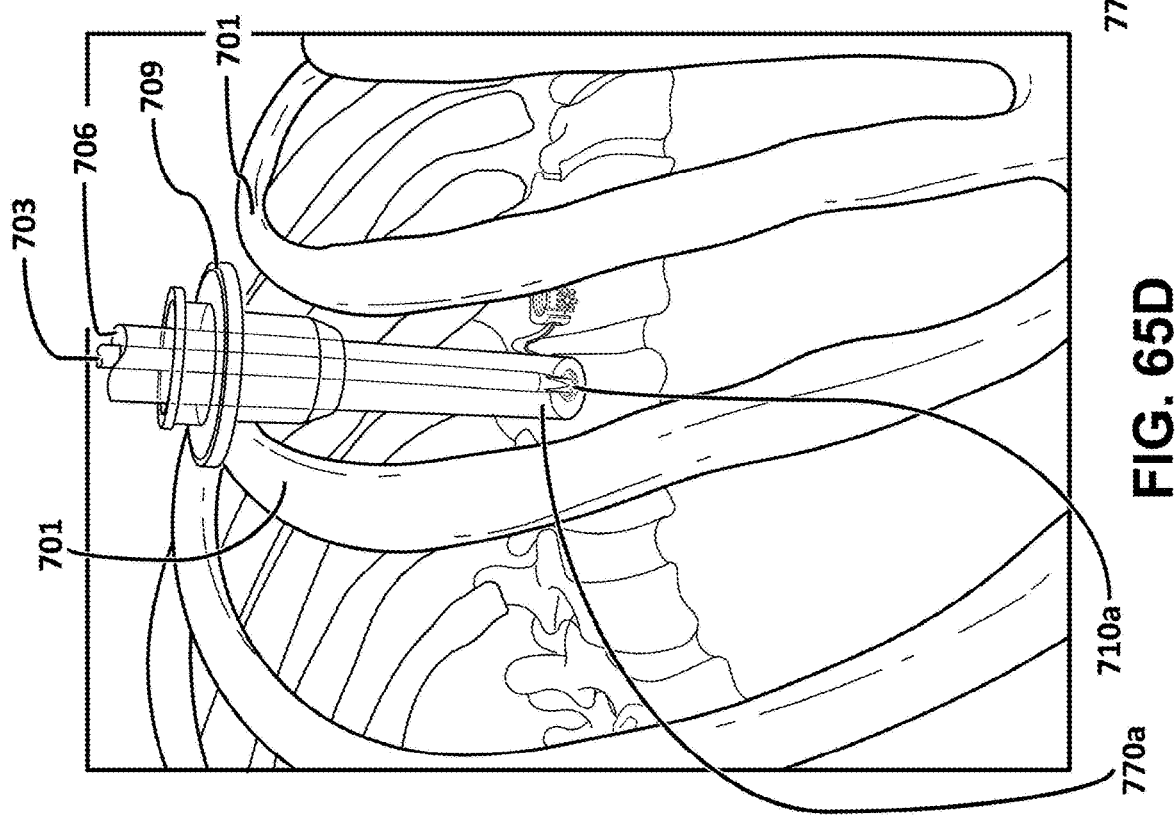
FIG. 65D depicts a following act of implantation, following the act of FIG. 65C.

Referring to FIG. 65D, tool 708 is then removed from anchor 710a. Tools 703 and 706 are inserted through the same portal 709. Screwdriver 703 is used to place a set screw onto head assembly 730a. Referring to FIG. 65E, tool 703 and 706 are then moved to anchoring assembly 710b. The bevel drive gear 706.3 is engaged with bevel gear 758b, and by means of rotation of handle 706.1a, bevel gear 758b and winding post 760 are rotated, resulting in the take up and tensioning of flexible member 704b. After the appropriate tension has been achieved, screwdriver 703 is then used to lock the position of spool 750, and also lock in the appropriate tension between anchors 710a and 710b.

Yet other embodiments of the present invention pertain to a head assembly X30 that is a separate piece or component relative to bone connection members, two examples of which are shown in FIGS. 66-69. In some embodiments, these separate head assemblies and spaced apart from a bone connection member. Still further, a single tethering head can be used between adjacent bone connection members. Bone connection members can include threaded fasteners, especially threaded fasteners fastened to a locking washer, such as a staple platform X26 including projections and locking threads. Implantation of such a spinal tethering system proceeds in some embodiments a follows 1. The locking washers are placed into adjacent vertebrae and locked in place with locking screws.
2. A tethering head X30 is placed between the locking washers. The flexible member has an end connector at either end that keys into the mating geometry on the washer.
3. A locking tab or screw is initially in a retracted or loose state that allows the spool X50 to turn.
4. A counter-torque device is placed around the body X31 to keep it from spinning.
5. A driver is used to wind the spool. As the spool winds, the tether tape winds around it, providing tension between the washers.
6. When the desired tension is reached, the locking tab is squeezed into the body X31, or the locking screw is tightened. This creates a forced interference between the tab/spool/block, preventing the spool from unwinding.

In some embodiments this concept of a tethering head assembly placed between bone anchors utilizes a "turnbuckle" type of mechanism to achieve a desired state of tension. However, the head assemblies shown in FIGS. 66, 67, 68, and 69 allow the tethering unit to be tensioned by turning a vertically oriented driver, overcoming the challenge of how to rotate a turnbuckle inside the chest wall.

Figure 66A:
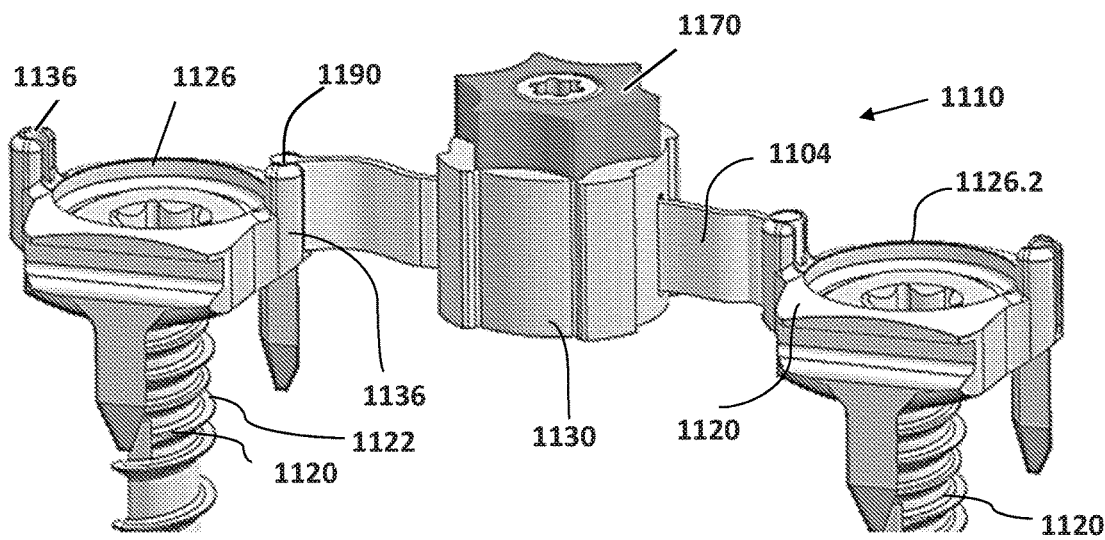
FIG. 66A is a side, top, perspective CAD-surface representation of an anchoring assembly according to another embodiment of the present invention.
Figure 66B:
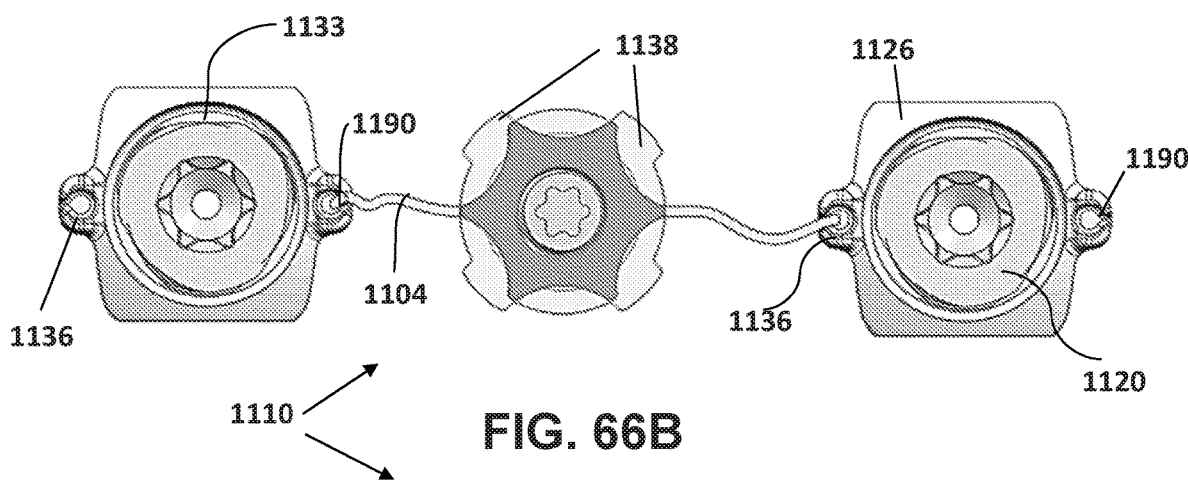
FIG. 66B is a top plan view of the apparatus of FIG. 66A.
Figure 66C:
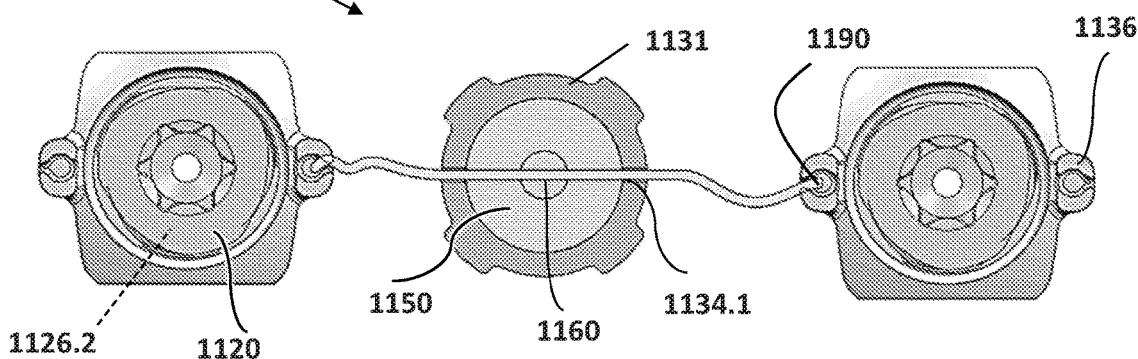
FIG. 66C is a cross sectional view of the apparatus of FIG. 66A, take from a plane situated on the top of the apertures 1126.2.
Figure 67A:
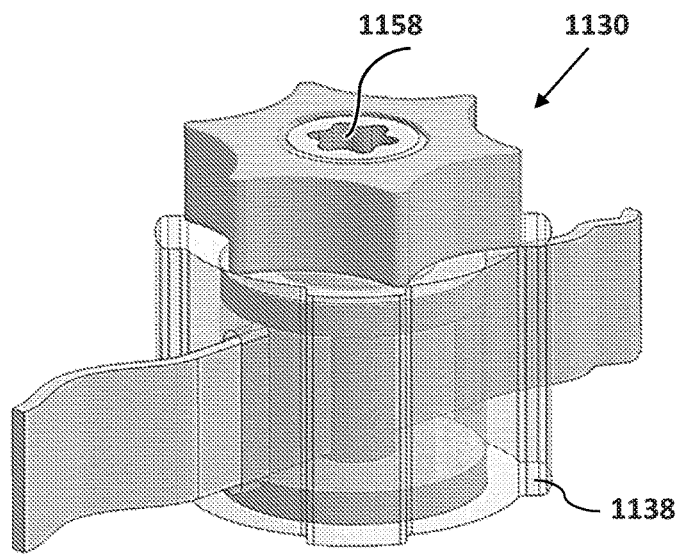
FIG. 67A is a side, perspective semi-transparent representation of the head assembly of the apparatus of FIG. 66A.
Figures 67B, 67C:
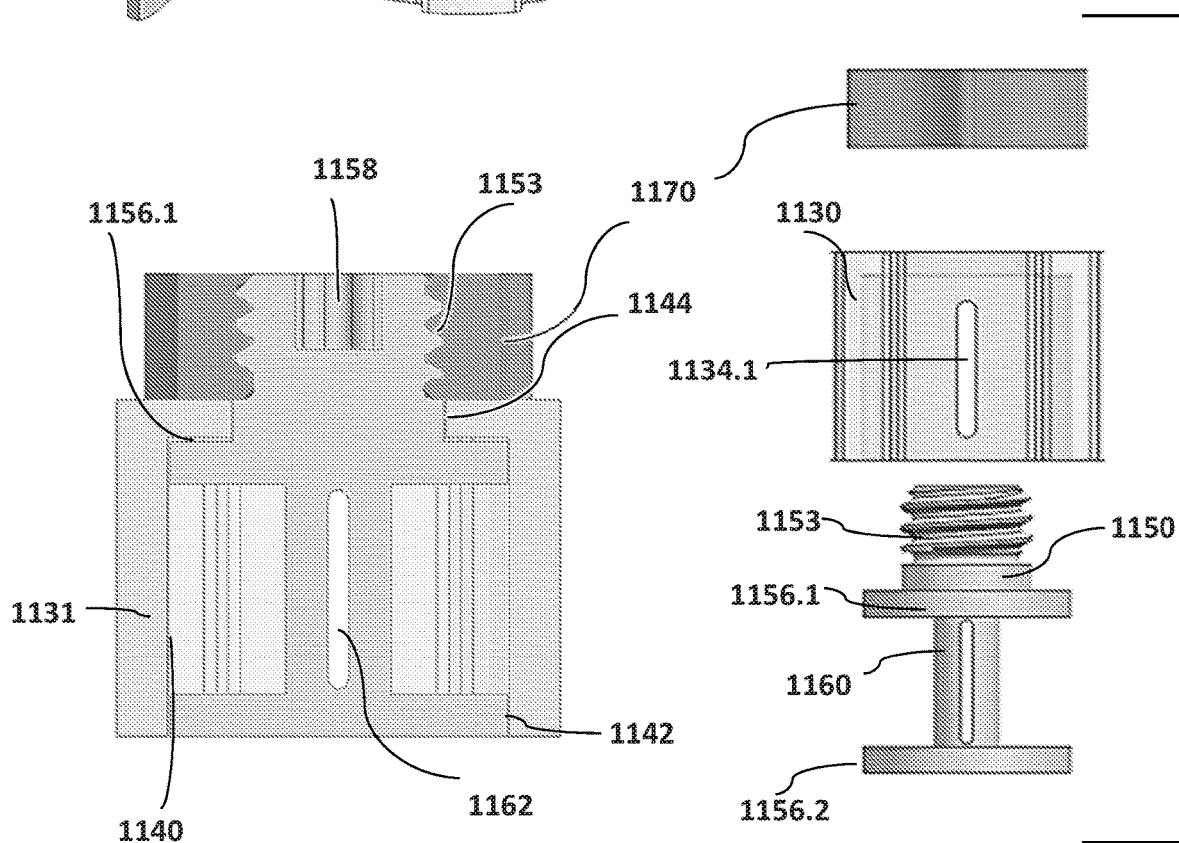
FIG. 67B is side elevational cutaway representation of the apparatus of FIG. 67A, as taken vertically through the centerline, and omitting the flexible connectors.
FIG. 67C is an exploded view of the apparatus of FIG. 67B.

FIGS. 66 and 67 depict various views of an anchoring assembly 1110 according to another embodiment of the present invention. Assembly 1110 is similar in some respects to the anchoring assembly 310, except for the differences which will now be described. These anchoring assemblies have tether tensioning interfaces that are oriented away from the location of the implant, and substantially directly toward the surgery portal.

Anchoring assembly 1110 includes a separate head assembly 1130 that in some embodiments is situated between a pair of bone connection members 1120. In one embodiment, each of the bone connectors includes a bone fastener having a threaded shank 1122, and adapted and configured to be implanted into a bone such as a vertebrae. In some embodiments, each threaded fastener is located within a separate staple platform 1126. Preferably the fastener includes a threaded head, and staple platform 1126 includes a correspondingly threaded pocket to receive the threaded head. The shank 1122 is received within a central aperture 1126.2, and the head of the fastener sits within a pocket of the staple body.

Staple body 1126 preferably includes a plurality of projections or spikes 1126 that are adapted and configured for penetrating connection into the vertebrae. Although what has been shown and described are pairs of fasteners and staples located on either side of a central head assembly, it is understood that the head assembly 1130 can be coupled by flexible members 1104 to staples only, or to threaded fasteners adapted and configured to include receptacles, and further to combinations in which a vertebrae connection on one side of head assembly 1130 is different than then vertebrae connection on the other side of the head assembly.

Referring to FIGS. 66B and 66C, it can be seen that a flexible member 1104 extends laterally from opposite sides of head assembly 1130. Each lateral, exposed length of flexible member 1104 preferably includes an end connector 1190 that is adapted and configured to be received within a corresponding receptacle 1136 of a bone connection member 1120. Preferably, in one embodiment each staple 1126 includes a receptacle on opposite sides of the staple platform. In some embodiments, the end connector 1190 comprises the flexible material formed into a larger external, cylindrical shape, which is received within a corresponding receptacle 1136. It is to be noted that in some embodiments the receptacles 1136 include lengthwise slits through which the flexible member passes, but which are too narrow to pass through the end connector 1190. In still further embodiments, the end connector 1190 can be of any type, including components fabricated from any biocompatible material, and which can be adhered, fastened, sutured, or otherwise attached to the flexible member.

As best seen in 66C, in one embodiment the flexible member 1104 passes from one receptacle to another receptacle, and passes through a pathway 1134.1, and through an aperture 1162 of a spool 1160. However, yet other embodiments contemplate anchoring assemblies 1110 in which two (2) separate portions of flexible material 1104 are each attached separately at one end to spool 1160, and at the other end to the corresponding connection member 1120. It is further to be noted that each of the bone connection member assemblies (i.e., as shown in the embodiments of FIGS. 66-69, the assembly of threaded fastener and staple) include multiple receptacles 1190.

Referring to FIGS. 67, it can be seen that a spool 1150 is located within a bore of a body 1131. Body 1131 includes a spool receiving pocket 1140 having an upper spool interface 1144 that locates and bearingly supports the upper head interface feature 1156.1. A top threaded portion 1153 of spool 1150 extends through the top aperture of body 1131, and is threadably engaged with a locking member 1170. In a manner similar to that of anchoring assembly 310, the spool 1150 and locking member 1170 sandwich the body between them. Spool 1150 is free to rotate within body 1131, until locking member 1170 is tightened. Similar to body 331, body 1131 includes a plurality of tool coupling features 1138 located on the body and used for holding the position of the body during tensioning and locking operations FIGS. 68-69 show various views of an anchoring assembly 1210 according to another embodiment of the present invention. Assembly 1210 is similar to anchoring assembly 1110, but having a head assembly 1230 that uses a different locking method.

Figure 68A:
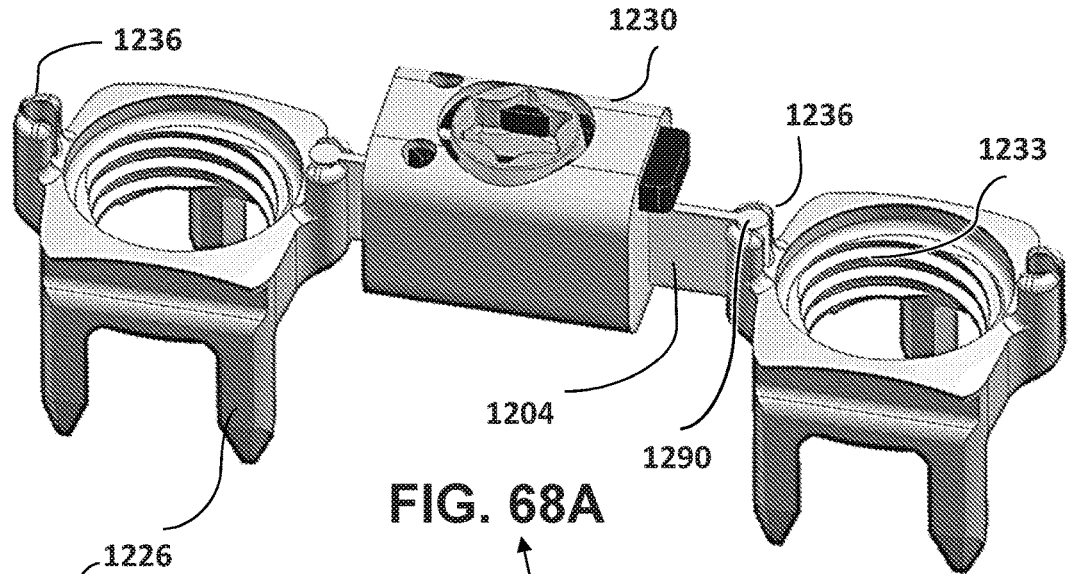
FIG. 68A is a top, side perspective CAD-surface representation of an anchoring assembly according to another embodiment of the present invention.
Figure 68B:
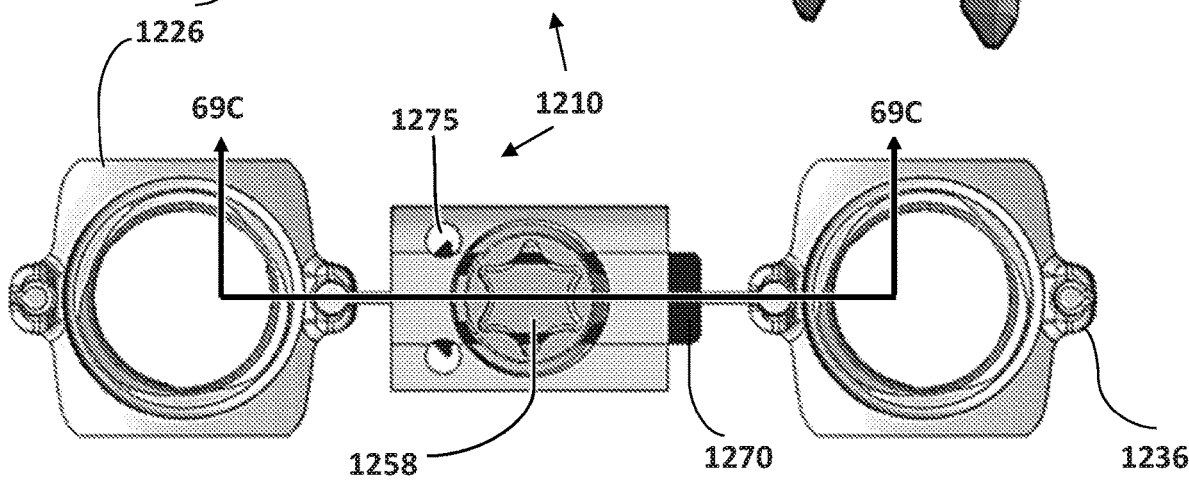
FIG. 68B is a top plan view of the apparatus of FIG. 68A.
Figure 68C:
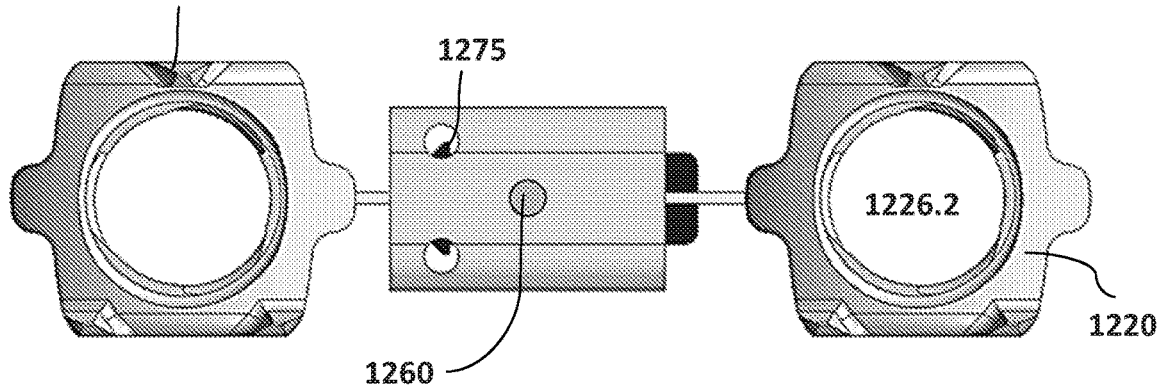
FIG. 68C is a bottom plan view of the apparatus of FIG. 68A.

FIGS. 68A, 68B, and 68C show various views of anchoring assembly 1210. Similar to that shown for anchoring assembly 1110, a centrally located head assembly 1230 is located between a pair of bone connection assemblies 1220. For the sake of simplicity, a central threaded bone fastener is not shown within the staple platform 1226. Each staple platform preferably includes a pair of receptacles 1236 located on opposite sides, each adapted and configured to receive an end connector 1290 of a portion of flexible member 1204.

Figure 69A:
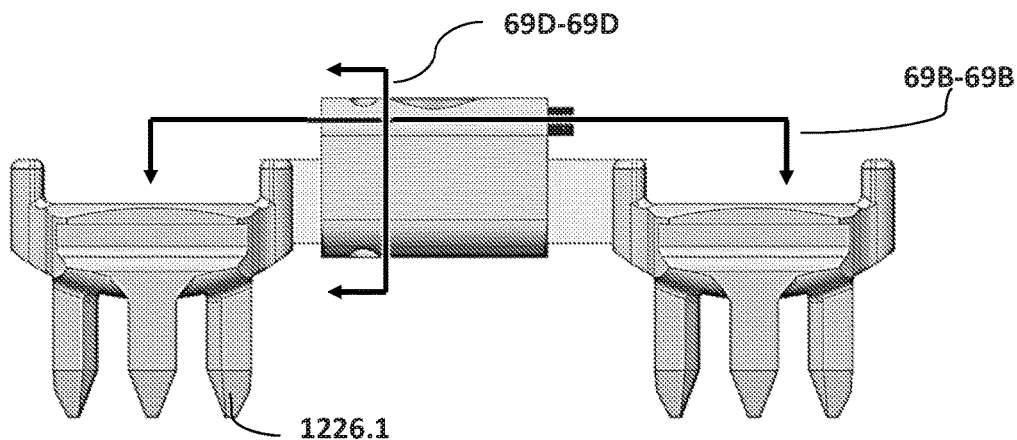
Figure 69B:
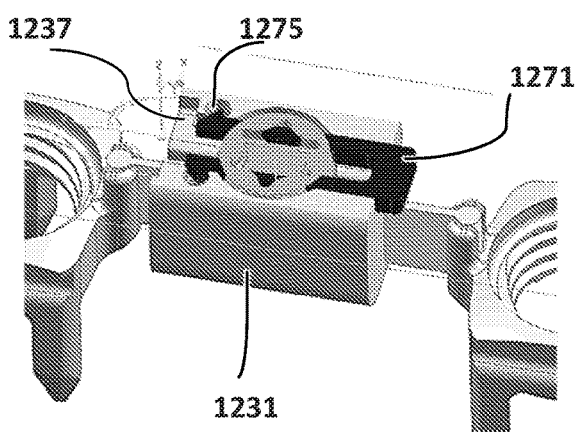
Figure 69C:
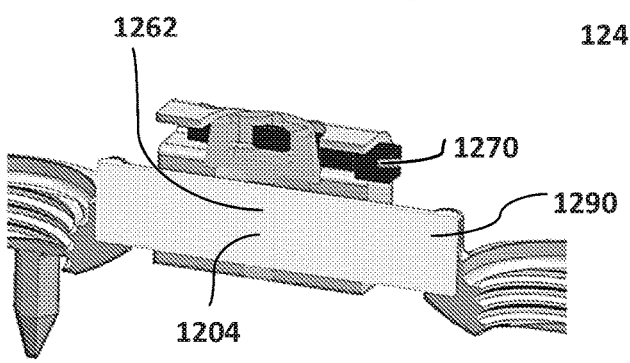
Figure 69D:
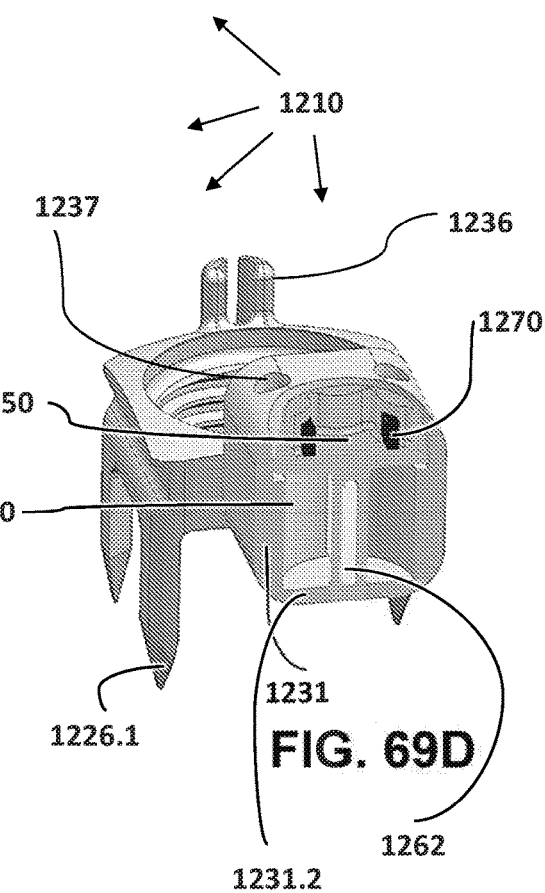

Head assembly 1230 preferably comprises in one embodiment a body 1231 that contains within it a rotatable spool 1250, and a slidable locking mechanism 1270. Referring to FIG. 69C, it can be seen that the flexible member 1204 extends through an aperture 1262 of a vertically oriented winding post 1260 that is placed within a spool receiving pocket 1240.

Referring to FIGS. 69, it can be seen that a slidable locking member 1270 in a general U-shape is received within a pair of channels of body 1231 above the top surface of the flexible member 1204. Each of the ends of the U-shape include an outwardly extending projection 1275, as best seen in FIGS. 69B, 68B, and 68C. In the state as shown, with the bottom of the U-shape extending out of body 1231 (to the right of body 1231 as seen on FIG. 68B), the spool 1250 is unlocked and free to rotate by use of a tool and tool coupling feature 1258. However, when the bottom of the U-shape (button 1271) is pushed inward, the projections at the tips of the U-shape are forced out of the apertures 1237, and forced to slide toward the left. The movement of the projections over the internal channel of the body 1231 cause the legs of the U-shape to bend inward, and thereby frictionally restrain spool 1250.

Various aspects of different embodiments of the present invention are expressed in paragraphs Z1, Z2, Z3, Z4, Z5, Z6, Z7, Z8, Z9, Z10, Z11, Z12, Z13, Z14, Z15, Z16, Z17, Z18, or Z19 as follows:

Z1. One embodiment of the present invention pertains to an implantable assembly for dynamic connection to a bone. Preferably, the embodiment includes a body configured for implantation into an animal, the body rotatably supporting a spool having a surface and a gear, the spool being configured for attachment to a flexible member, the gear being coupled to the spool to rotate the spool. It is further preferable that rotation of the spool results in wrapping of the flexible member around the surface.

Z2. One embodiment of the present invention pertains to an implantable assembly for dynamic connection to a bone. Preferably, the embodiment includes a body configured for implantation into an animal, the body rotatably supporting a spool having an aperture and a rotatable gear, the spool being configured to couple to a flexible member, the gear driving the spool to rotate. It is further preferable that rotation of the spool results in pulling of the flexible member by the aperture.

Z3. One embodiment of the present invention pertains to an assembly for connection of two bones. Preferably, the embodiment includes a head configured for attachment to a bone, the head rotatably supporting a spool and a gear, the spool being configured for attachment to the flexible member, the gear being coupled to the spool to rotate the spool.

Z4. One embodiment of the present invention pertains to an assembly for connection of two bones. Preferably, the embodiment includes a separate connector configured for attachment to a flexible member, the connector having an external shape, the connector having a first surface. Some variations include a head including a receptacle configured to receive therein the connector, the head being configured for attachment to a bone, the head including a first threaded portion. Some variations include a threaded member having a second threaded portion configured to threadably attach to the first threaded portion, the threaded member including a second surface. It is further preferable that the threaded attachment of the threaded member to the head places the second surface proximate to the first surface to interfere with removal of the connector from the receptacle.

Z5. One embodiment of the present invention pertains to a bone anchoring system. Some variations include an implantable spinal anchoring assembly including a body, a flexible member having an end, and a separable end connector attached to the end of the flexible member, the body having a first receptacle configured to receive the end connector, the body having a first alignment feature. Some variations include a tool having a handle and a distal end, the distal end including a second receptacle configured to receive the end connector and a second alignment feature configured to releasably couple to the first alignment feature, wherein coupling of the first and second alignment features permits the sliding passage of the end connector between the second receptacle and the first receptacle.

Z6. One embodiment of the present invention pertains to a bone anchoring system. Some variations include an implantable bone anchoring assembly including a body, a flexible member having an end, and a separable end connector attached to the end of the flexible member, the body having at least one driven feature. Some variations include a tool having a handle and a distal end, the distal end including a driving feature configured to provide a torque to the driven feature, the distal end having a first receptacle configured to receive the end connector.

Z7. One embodiment of the present invention pertains to a bone anchoring system. Some variations include an implantable bone anchoring assembly including a body, a flexible member having a first end, and a separable end connector attached to the first end of the flexible member, the body having a first receptacle configured to receive the end connector. Some variations include a tool having a handle and a distal end, the handle and the distal end including a pivot joint therebetween, the distal end having a second receptacle configured to receive the end connector.

Z8. One embodiment of the present invention pertains to a bone anchoring system. Preferably, the embodiment includes a head rotatably supporting a spool, a flexible member configured to provide tension between two bone, and a first gear, the spool being attached to the flexible member, the first gear being coupled to the spool to rotate the spool. Some variations include a tool having a rotatable handle and a distal end, the distal end including a second gear configured to rotate the first gear. It is further preferable that rotation of the handle rotates the second gear.

Z9. One embodiment of the present invention pertains to a bone anchor for supporting a flexible member. Preferably, the embodiment includes a head configured for attachment to a bone, the head rotatably supporting a spool, the spool being configured for attachment to the flexible member, the head including a recess having a first shape, an end connector having a second shape complementary at least in part to the first shape, the end connector being retained within a recess or receptacle and being readily removable from the recess or receptacle, the end connector including a through aperture to receive therethrough the flexible member.

Z10. One embodiment of the present invention pertains to a method for connecting two bones. Preferably, the embodiment includes providing a first implantable bone anchor having a rotatable spool and a length of a flexible member having two ends with one end attached to the spool and the other end being free, the first anchor including a locking member for locking the rotation of the spool relative to the anchor, and a second anchor including a feature configured for attachment to the free end. Some variations include securing the first anchor in a first bone. Some variations include securing a second anchor in a second bone. Some variations include attaching the free end of the flexible member to the feature of the second anchor. Some variations include adjusting the tension in the flexible member after the attaching by rotating the spool. Some variations include locking the position of the spool by the locking member.

Z11. Some variations include a bone anchor. Preferably, the embodiment includes a length of flexible member having two ends and capable of supporting a tensile load applied to the ends with substantially no elongation, and substantially not capable of supporting a compressive load applied to the ends without flexing. Some variations include a head configured for attachment to a bone, the head rotatably supporting a spool, one end of the flexible member being attached to the spool. An end connector retained by the head and readily removable from the head, the other end of the flexible member being attached to the end connector.

Z12. One embodiment of the present invention pertains to a bone anchor. Preferably, the embodiment includes a head including a pocket rotatably supporting a spool, the spool including an aperture. Some variations include means for connecting the head to a bone configured for attachment to a bone, means for rotating the spool within the pocket, and means for locking the angular orientation of the spool relative to the head.

Z13. One embodiment of the present invention pertains to a bone anchor. Preferably, the embodiment includes a head configured for attachment to a bone, the head rotatably supporting a spool, the head including a groove. Some variations include a length of flexible member having two ends and capable of supporting a tensile load applied to the ends, and substantially not capable of supporting a compressive load applied to the ends, one end of the flexible member being attached to the spool, the other end of the flexible member having a loop configured to fit within the groove.

Z14. One embodiment of the present invention pertains to a bone anchor. Preferably, the embodiment includes a head configured for attachment to a bone, the head rotatably supporting an internal spool, the spool including a through aperture, the head including an external groove. Some variations include means for locking the rotation of the spool relative to the head.

Z15. One embodiment of the present invention pertains to a bone anchor for supporting a flexible member. Preferably, the embodiment includes a bone connection member configured for attachment to a bone and having a platform on the proximal end. Some variations include a spool rotatable about an axis, the spool having an end, the spool having a first through aperture configured for coupling to a flexible member. Some variations include a head having an internal cavity with openings on opposing distal and proximal sides of the head, the distal end the head being fixedly attached to the platform, the head having a second through aperture configured for passage therethrough of a flexible member. It is further preferable that the spool is captured in the internal cavity and rotatable within the head, the end of the spool extending out of the opening on the proximal side.

Z16. One embodiment of the present invention pertains to a bone anchor for supported a flexible member. Preferably, the embodiment includes a set screw having threads. Some variations include a head having a bore including a threaded portion for coupling to the set screw, the head including a first anti-rotation feature, a spool rotatable within the head and having a through aperture configured for passage therethrough of a flexible member, a separable locking member receivable at least in part within the bore and including a second anti-rotation feature that coacts with the first anti-rotation feature to prevent rotation of the locking member relative to the head when the locking member is received within the bore.

Z17. One embodiment of the present invention pertains to a bone anchor for supported a flexible member. Preferably, the embodiment includes a set screw having threads. Some variations include a head having a bore including a threaded portion for coupling to the set screw, a spool rotatable within the head and having a through aperture configured for passage therethrough of a flexible member, the spool including a first locking surface having a plurality of at least one of recesses or protrusions. a separable locking member receivable at least in part within the bore, the locking member including a second locking surface having a plurality of surface features configured to interlock with the at least one of recesses or protrusions of the first locking surface. It is further preferable that the locking member is located between the set screw and the spool, the first locking surface being in contact with the second locking surface, tightening of the set screw in the threaded bore places the first locking surface in compression against the second locking surface.

Z18. Some variations include a bone anchoring system. Preferably, the embodiment includes a first bone connection member, the member including a first receptacle. Some variations include an spinal anchoring assembly including a body having an exterior, a flexible member having a first end extending from the exterior of the body by a first distance, the first end having a first end connector configured to couple to the first receptacle, a spool rotatably supported within the body, the flexible member being coupled to the spool. It is further preferable that rotation of the spool relative to the body changes the distance from the exterior of the body to the first end connector.

Z19. A plurality of bone anchoring assemblies as shown in FIG. 59F

Yet other embodiments pertain to any of the previous statements Z1, Z2, Z3, Z4, Z5, Z6, Z7, Z8, Z9, Z10, Z11, Z12, Z13, Z14, Z15, Z16, Z17, Z18, or Z19, which are combined with one or more of the following other aspects. It is also understood that any of the aforementioned Z paragraphs include listings of individual features that can be combined with individual features of other Z paragraphs.

Wherein said head has an outer surface, and said gear extends externally to the outer surface.

Wherein said spool includes a shaft, and the shaft includes an aperture for attachment to the flexible member.

Wherein said spool includes a shaft, and said gear is integral with said shaft.

Wherein said gear is a pinion gear or a bevel gear.

Wherein bone connection member is adapted and configured to support said head along a first axis, said spool rotates about a second axis, and the first axis and second axis are parallel.

Wherein bone connection member is adapted and configured to support said head along a first axis, said spool rotates about a second axis, and the first axis and second axis are nonparallel.

Wherein bone connection member is adapted and configured to support said head along a first axis, said spool rotates about a second axis, and the first axis and second axis are perpendicular.

Which further comprises a flexible connector and an end connector attached to the flexible member, said head including a receptacle for coupling to said end connector.

Wherein said connector having a peripheral first shape that includes opposite ends and opposite sides, the opposite sides being tapered such that one end is wider than the opposite end.

Wherein said receptacle has a second shape that is complementary to the first shape.

Wherein said connector has a centerline, and the opposite sides are mirror images about the centerline.

Wherein the second threaded portion is an inner diameter and said first threaded portion is an outer diameter or wherein the first threaded portion is an inner diameter and said second threaded portion is an outer diameter.

Wherein said first threaded portion is a post, and said threaded member is a threaded washer.

Wherein said threaded member is a set screw, and the second surface is under a peripheral lip of said set screw.

Wherein said bone connection member and said head are integral or wherein said bone connection member and said head are separate components.

Wherein the handle is pivotal relative to the distal end.

Wherein the first receptacle includes a first interlocking feature, said end connector includes a second interlocking feature, and the first and second interlocking features coact to discourage removal of said end connector from the first receptacle.

Wherein the first interlocking feature is a shelf and the second interlocking feature is a projection.

Wherein a portion of said end connector has a shape, said first receptacle has a first shape that slidingly receives the end connector shape, and said second receptacle has a second shape that slidingly receives said end connector shape.

Wherein said body includes a first alignment feature, the distal end includes a second alignment feature, and the positioning of the first alignment feature in contact with the second alignment feature aligns second receptacle and first receptacle to permit movement of said end connector from said tool to said body.

Which further comprises a bone connection member for implanting said spinal anchoring assembly in a vertebra.

Wherein said first gear is a bevel gear, and/or wherein said second gear is a bevel gear.

Wherein said tool includes a body defining a lumen along a first axis, said handle is rotatable about a second axis, and the first axis and second axis are not parallel.

Wherein the first axis and second axis include an angle from about twenty degrees to about seventy degrees.

Wherein the body has a distal end and the second bevel gear extends around the periphery of the distal end.

Which the lumen is an open lumen with a proximal end and a distal end, said head includes a driven shape, and which further comprises a screw driver having a shaft adapted and configured to extend from the proximal end to the distal end, the distal end of said shaft having a driving shape complementary to the driven shape.

Which further comprises means for locking the rotation of said spool relative to said head.

Wherein said locking means includes a set screw threadably received by said head, said set screw including a face that compresses said spool against said head.

Wherein said spool includes a first tapered surface, said head includes a second tapered surface, and said locking means for locking creates a frictional force between the first tapered surface and the second tapered surface that resists rotation of said spool relative to said head.

Wherein the first tapered surface is an outer surface of said spool, and the second tapered surface is an inner surface of said head, or wherein the first tapered surface is a bottom surface of said spool, and the second tapered surface is a pocket in said head.

Wherein said spool includes a cylindrical section, said head includes a tapered aperture that bearingly receives the cylindrical section, and said locking means for locking creates a frictional force between the cylindrical section and the tapered aperture that resists rotation of said spool relative to said head.

Wherein said locking means includes a set screw threadably received by said head along a first axis, said spool is rotatable about a second axis, and the first axis and the second axis are non-parallel.

Wherein said bone connection member includes a threaded shank, or wherein said bone connection member includes a plurality of spikes adapted and configured to penetrate the vertebra.

Wherein said flexible member includes a cable, a spring, a tether, or a suture.

Wherein said flexible member is fabricated from metal, or from an organic material.

Wherein said end connector includes a ring, and said head captures said ring in a groove.

Wherein said groove extends circumferentially around the exterior of said head.

Wherein said ring is a split ring adapted and configured to be compressed and removed from the groove, or wherein said ring is a split ring adapted and configured to be expanded and removed from the groove.

Wherein said ring includes overlapping ends that are generally parallel to one another.

Wherein the split is generally perpendicular to the rotational axis of said spool.

Wherein one of said ring or said head includes a protrusion for limiting rotation of said ring in the groove.

Wherein said ring is not prevented from rotating in the groove, or wherein said ring is loosely captured in the groove.

Wherein said head has an outer diameter that includes a first flattened sector, said ring has an inner diameter that includes a second flattened sector, the second flattened sector being receivable in the first flattened second to prevent rotation of said ring relative to said head.

Wherein said end connector includes a body having a first shape on a portion of said body, said head defining a pocket having a second shape that accepts therein the portion of the body.

Wherein the first shape and the second shape are dovetail shapes.

Wherein the first shape and the second shape are different, and the second shape of the pocket is larger than the portion of the body.

Wherein said end connector is loosely captured to said head and readily removable from said head.

Wherein said end connector includes a spring having a first relaxed state and capable of movement to a second more highly stressed state, and in the first state the spring biases said end connector to being retained by said head and in the second state the spring permits removal of said end connector from said head.

Wherein the spring is a cantilever.

Wherein the spring includes a first shoulder, the head includes a second shoulder, and in the first state the first shoulder and the second shoulder interfere with each other to prevent removal of said end connector from said head.

Wherein the head includes a slot having a length and that slidably receives said end connector, and sliding of said end connector within the length of the slot requires compression of the cantilever spring.

Wherein the spring is a split ring having a smaller diameter in the first state and a larger diameter in the second state, or wherein the spring is a split ring having a larger diameter in the first state and a smaller diameter in the second state.

Wherein said head defines an internal pocket for rotatably receiving said spool.

Wherein said head defines an internal pathway for the flexible member to extend from said spool to said end connector.

Wherein the pathway is open and extending across opposite sides of said head, or wherein the pathway is blind and extending from said spool to one side of said head.

Wherein the recess is a slot or a circumferential groove.

Wherein said spool includes a post having a through aperture, said post including an aperture for passage therethrough of a flexible member.

Wherein said spool includes a post having a through aperture, and the one end of said flexible member is loop that passes through the aperture and around a portion of the post.

Wherein said head defines an internal pathway for passage therethrough of the flexible member, and said post extends laterally across the internal pathway.

Wherein said bone connection member is a threaded body having a longitudinal axis, and said spool rotates along an axis perpendicular to the longitudinal axis.

Wherein said locking is by frictionally restraining the rotation of the spool.

Wherein said locking is by interlocking the spool to the head of the first anchor.

Wherein the length of tether is prewound around the spool and the set screw locks the prewound spool in a position, and which further comprises unlocking the prewound spool by untightening of the set screw prior to said attaching.

Wherein the first anchor includes a feature identical to the feature of the second anchor, the feature having a first shape, and the free end of the tether is attached to an end connector having a second shape that is complementary to the first shape, and which further comprises removing the end connector from the feature of the first anchor and said attaching is by placing the end connector in the feature of the second anchor.

Wherein the first anchor includes a feature identical to the feature of the second anchor, the feature having a first shape, and the free end of the tether is attached to an end connector having a second shape that is adapted and configure to be securely coupled to the first shape, and which further comprises removing the end connector from the feature of the first anchor and said attaching is by coupling the end connector to the feature of the second anchor.

Wherein said head includes a third through aperture, said head and said spool being adapted and configured to for passage of the flexible member from the first aperture through the second aperture, and from the second aperture through the third aperture.

Wherein said spool includes a platform between the threaded end and the first through aperture, said set screw is threadably received on the threaded end of said spool extending from the proximal opening, and tightening of said set screw to said spool results in compression of a portion of said head between the platform and said set screw.

Wherein the second anti-rotation feature is an arm, and the first anti-rotation feature is a slot; or wherein the second anti-rotation feature is a post, and the first anti-rotation feature is a receptacle.

Wherein the first locking surface includes a first plurality of teeth spaced in a first pattern, and said second locking surface includes a second plurality of teeth spaced in a second pattern adapted and configured to intermesh with the first pattern.

Wherein a plurality of the tips of the teeth of the first pattern are received in corresponding valleys of the teeth of the second pattern; wherein the first pattern is the same as the second pattern; wherein said first plurality of teeth are beveled and said second plurality of teeth are beveled.

Wherein the first locking surface has a plurality of one of grooves or ridges, and the second locking surface has a plurality of the other of grooves or ridges.

Wherein the first locking surface has a plurality of one of protrusions or recesses, and the second locking surface has a plurality of the other of protrusions or recesses.

Wherein said first bone connection member is a staple having a plurality of projections.

Wherein said staple includes an aperture, and said first bone connection member further comprises a threaded bone fastener adapted and configured to pass through the aperture.

Wherein said first bone connection member includes a threaded bone fastener and a washer having an aperture adapted and configured to receive therein said bone fastener, said washer including the first receptacle.

Which further comprises a second bone connection member having a second receptacle, said flexible member having a second end extending from the exterior of said body by a second distance, said second end having a second end connector adapted and configured to couple to said second receptacle, wherein rotation of said spool relative to said body changes the distance from the exterior of said body to said second end connector.

Wherein said spool includes an aperture, and a portion of said flexible member intermediate of said first end connector and said second end connector passes through the aperture.

The invention claimed is:
1. An implantable assembly for dynamic connection to a bone of an animal using at least a first portion of a first flexible tether, the assembly comprising:

a head body adapted and configured for implantation into the animal and defining a pocket;

a bone anchor extending from said head body and adapted and configured for implantation into the animal;

a gear adapted and configured for implantation into the animal and adapted and configured for rotation about an axis of rotation, said gear including a proximal end located on said axis of rotation, said gear including a distal end unenclosed by said head body and located on said axis of rotation farther away from said pocket than said proximal end of said gear; and a shaft adapted and configured for implantation into the animal and coupled to said gear to rotate about said axis of rotation in response to said rotation of said gear about said axis of rotation, said shaft rotatably supported by said head body and extending into said pocket along said axis of rotation, wherein said head body, said gear, and said shaft are adapted and configured to cooperate to wrap the first portion of the first flexible tether around said shaft within said pocket in response to said rotation of said gear about said axis of rotation.

2. The assembly of claim 1, further comprising:
a locking member attachable to said head body,
wherein attachment of said locking member to said head body results in compression of the first portion of the first flexible tether against the shaft.

3. The assembly of claim 1, wherein said shaft defines an aperture therein, wherein said aperture is located within said pocket, wherein said aperture is adapted and configured to receive a second portion of the first flexible tether therein, and wherein said head body, said gear, and said shaft are adapted and configured to cooperate to cause said aperture to pull on the first flexible tether in response to said rotation of said gear about said axis of rotation.

4. The assembly of claim 3, further comprising:
a locking member attachable to said head body,
wherein an attachment of said locking member to said head body results in a frictional locking load to resist rotation of said shaft about said axis of rotation.

5. The assembly of claim 3, further comprising:
a separable end connector adapted and configured to be attached to a second flexible tether,
wherein said head body includes a receptacle for slidable coupling to said end connector.

6. The assembly of claim 5, further comprising:
the first flexible tether; and
the second flexible tether,
wherein said second flexible tether has an end portion attached to said end connector and said first flexible tether has an end portion received within the aperture.

7. The assembly of claim 3, further comprising:
a separable end connector adapted and configured to be attached to a second flexible tether, said head body including a receptacle for slidable coupling to said end connector; and
a means for retaining said end connector in the receptacle.

8. The assembly of claim 1, wherein said gear is a bevel gear.

9. The assembly of claim 1, further comprising:
a set screw including a first threaded portion,
wherein said head body includes a second threaded portion, and
wherein said set screw and said head body are adapted and configured to cooperate to cause a threaded coupling of said first threaded portion and said second threaded portion to result in a resistance of rotation of at least one of said shaft and said gear about said axis of rotation.

10. The assembly of claim 1, wherein the bone anchor is adapted and configured to support said head body along a support axis, and wherein said support axis and said axis of rotation of said gear are nonparallel.

11. The assembly of claim 10, wherein said support axis and said axis of rotation of said gear are perpendicular.

12. The assembly of claim 1, wherein said bone anchor includes threads adapted and configured for connection to a vertebra.

13. The assembly of claim 1, wherein said bone anchor includes at least one projection adapted and configured for penetration into a vertebra.

14. The assembly of claim 1, wherein said bone anchor and said head body are integral.

* * * * *